(12) United States Patent
Moriguchi et al.

(10) Patent No.: US 9,787,954 B2
(45) Date of Patent: *Oct. 10, 2017

(54) PIXEL INTERPOLATION APPARATUS, IMAGING APPARATUS, PIXEL INTERPOLATION PROCESSING METHOD, AND INTEGRATED CIRCUIT

(71) Applicant: MegaChips Corporation, Osaka-shi (JP)

(72) Inventors: Junji Moriguchi, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,954

(22) Filed: May 23, 2016

(65) Prior Publication Data

US 2016/0269693 A1    Sep. 15, 2016

Related U.S. Application Data

(63) Continuation of application No. PCT/JP2014/081119, filed on Nov. 25, 2014.

(30) Foreign Application Priority Data

Dec. 2, 2013   (JP) .................. 2013-249475

(51) Int. Cl.
   *H04N 9/04*  (2006.01)
   *G06T 3/40*  (2006.01)
(52) U.S. Cl.
   CPC ........... *H04N 9/045* (2013.01); *G06T 3/4007* (2013.01); *G06T 3/4015* (2013.01); *H04N 2209/046* (2013.01)

(58) Field of Classification Search
   CPC ........... H04N 9/045; H04N 2209/0045; H04N 2209/046; H04N 2209/047;
   (Continued)

(56) References Cited

U.S. PATENT DOCUMENTS 5,805,217 A * 9/1998 Lu .................. G06T 3/4007
                                            348/266
6,995,796 B2 * 2/2006 Taubman ............... H04N 9/045
                                            348/279

(Continued)

FOREIGN PATENT DOCUMENTS

JP   2006-186965   7/2006
JP   2009-130764   6/2009

(Continued)

OTHER PUBLICATIONS

U.S. Appl. No. 14/556,535, filed Dec. 1, 2014, Moriguchi, et al.

(Continued)

*Primary Examiner* — Lin Ye
*Assistant Examiner* — Chriss Yoder, III
(74) *Attorney, Agent, or Firm* — Oblon, McClelland, Maier & Neustadt, L.L.P.

(57) ABSTRACT

Provided are a pixel interpolation apparatus, imaging apparatus, program, and integrated circuit that appropriately perform pixel interpolation on an image signal obtained by a single-chip image sensor with a four-color array filter whatever array pattern the four-color array filter has. An imaging apparatus includes an imaging circuitry, a signal processing circuitry, and a pixel interpolation processing circuitry. The apparatus calculates a degree of correlation for pairs in two orthogonal directions for an image signal obtained by the imaging circuitry including a single-chip image sensor having a four-color array filter using pixel data in an area around a target pixel, and performs pixel inter- (Continued)

polation using the correlation degree as a determination criterion. When a color component pixel with a color identical to a color of a color component pixel subjected to pixel interpolation is not located in the direction having the high correlation, the pixel interpolation apparatus obtains a change ratio in a direction orthogonal to the direction having the high correlation by using a pixel value resulting from color space conversion in the direction orthogonal to the direction having the high correlation, and performs pixel interpolation processing based on the change ratio.

16 Claims, 40 Drawing Sheets

(58) Field of Classification Search
CPC ........ H04N 2209/045; H01L 27/14621; G06T 3/4007; G06T 3/4015
See application file for complete search history.

(56) References Cited

U.S. PATENT DOCUMENTS

| | | | |
|---|---|---|---|
| 7,492,396 B2* | 2/2009 | Kim | H04N 9/045 348/234 |
| 7,551,214 B2 | 6/2009 | Hasegawa | |
| 9,294,743 B2* | 3/2016 | Moriguchi | H04N 9/045 |
| 2005/0058361 A1* | 3/2005 | Tajima | G06T 3/4007 382/254 |
| 2006/0050956 A1* | 3/2006 | Tanaka | H04N 9/045 382/162 |
| 2006/0114526 A1 | 6/2006 | Hasegawa | |
| 2009/0136153 A1 | 5/2009 | Hasegawa | |
| 2009/0295950 A1 | 12/2009 | Abe | |
| 2010/0104183 A1 | 4/2010 | Hasegawa | |
| 2011/0050918 A1 | 3/2011 | Tachi | |

FOREIGN PATENT DOCUMENTS

| | | |
|---|---|---|
| JP | 2009-290607 | 12/2009 |
| JP | 2010-103736 | 5/2010 |
| JP | 2011-055038 | 3/2011 |

OTHER PUBLICATIONS

U.S. Appl. No. 14/427,835, filed Mar. 12, 2015, Hasegawa.
U.S. Appl. No. 14/429,909, filed Mar. 20, 2015, Hasegawa.
U.S. Appl. No. 11/288,118, filed Nov. 29, 2005, Hasegawa.

* cited by examiner

PIXEL INTERPOLATION APPARATUS, IMAGING APPARATUS, PIXEL INTERPOLATION PROCESSING METHOD, AND INTEGRATED CIRCUIT

The present invention relates to signal processing performed by an imaging apparatus such as a digital camera, and more particularly, to a pixel interpolation technique.

BACKGROUND ART

Image sensors, such as charge-coupled device (CCD) image sensors or complementary metal oxide semiconductor (CMOS) image sensors, incorporated in imaging apparatuses including digital cameras convert light received through a color filter to electrical signals by photoelectric conversion, and output the electrical signals as pixel signals. Such a color filters include a RGB color filter, on which red, green, and blue patterns are formed, or a YMCK color filter, on which yellow, magenta, cyan, and black patterns are formed. A single-chip image sensor outputs a pixel signal of one color for one pixel. When using the RGB color filter, the image sensor outputs a pixel signal representing one of red (R), green (G), and blue (B) color components for one pixel.

Each pixel signal output from the single-chip color image sensor needs interpolation to generate pixel signals representing the other color components. Such interpolation may be performed using various algorithms. For example, one interpolation method calculates the degree of correlation in the horizontal direction and the degree of correlation in the vertical direction, and uses a pixel located in the direction with a higher correlation to perform pixel interpolation. Another interpolation method may perform weighting in accordance with the distance between a target pixel and its neighboring pixel before such pixel interpolation.

A technique described in Patent Literature 1 (Patent Literature 1: Japanese Unexamined Patent Publication No 2006-186965) differentiates a grayscale area and a color area in an image obtained by an image sensor with a Bayer array (RGB color filter), and performs pixel interpolation in accordance with the characteristics of the image areas. In particular, the technique in Patent Literature 1 reduces false colors in an area of a border between a grayscale area and a color area. For the area of the border between the grayscale area and the color area, the technique in Patent Literature 1 determines the direction of correlation with a method intended for a grayscale image area, and performs pixel interpolation with an interpolation method intended for a color image area, thus reducing false colors caused by pixel interpolation.

DISCLOSURE OF INVENTION

Technical Problem

An imaging apparatus may include a four-color filter, such as a Ye-Cy-G-Mg array (Yellow-Cyan-Green-Magenta array) and RGBYe array (Red-Green-Blue-Yellow array). An imaging apparatus including a single-chip image sensor with such a four-color filter outputs a pixel signal representing one of the four color components for one pixel.

The technique described in Patent Literature 1 is assumed to be used for an image sensor with a Bayer array (RGB color filter), and is not directly applicable to a single-chip image sensor with a four-color filter whose array pattern is different from that of the Bayer array filter. Moreover, it is difficult to adequately perform pixel interpolation with respect to any four-color filter regardless of its array pattern.

In view of the above problems, it is an object of the present invention to provide a pixel interpolation apparatus, an imaging apparatus, a program, and an integrated circuit that appropriately perform pixel interpolation on an image signal obtained by a single-chip image sensor with a four-color filter whatever array pattern the four-color filter has.

Solution to Problem

To solve the above problem, a first aspect of the invention provides a pixel interpolation apparatus for performing pixel interpolation on an image signal obtained by an imaging unit including a color filter having a first color filter, a second color filter, a third color filter, and a fourth color filter arranged in a predetermined pattern, the image signal including a first-color pixel signal obtained via the first color filter, a second-color pixel signal obtained via the second color filter, a third-color pixel signal obtained via the third color filter, and a fourth-color pixel signal obtained via the fourth color filter.

The pixel interpolation apparatus includes a signal correction unit, a saturation evaluation value calculation unit, a grayscale correlation value calculation unit, a color correlation value calculation unit, a pixel interpolation method determination unit, an interpolation unit, and a correction processing unit.

The signal correction unit corrects a signal level of each of the first-color pixel signal, the second-color pixel signal, the third-color pixel signal, and the fourth-color pixel signal in accordance with its corresponding color filter and outputs an image signal including the first-color pixel signal, the second-color pixel signal, the third-color pixel signal, and the fourth-color pixel signal which have been corrected, as a first image signal.

The saturation evaluation value calculation unit evaluates saturation of an image area in an image formed by the first image signal, based on the first image signal output from the signal correction unit, and to obtain a saturation evaluation value of the image area.

The grayscale correlation value calculation unit obtains correlation degrees of a plurality of pairs of two directions orthogonal to each other in the image formed by the first image signal, using data of those pixels that are located in an image area including and surrounding a target pixel which is being processed, as a grayscale correlation degree.

The color correlation value calculation unit obtains, as a color correlation degree, correlation degrees of a plurality of pairs of two directions orthogonal to each other in the image formed by the image signal including the first-color pixel signal, the second-color pixel signal, the third-color pixel signal, and the fourth-color pixel signal, using data of pixels that are located in an image area including and surrounding the target pixel and that have the same color.

The pixel interpolation method determination unit determines a pixel interpolation method for the target pixel, based on the saturation evaluation value obtained by the saturation evaluation value calculation unit, the grayscale correlation degree obtained by the grayscale correlation value calculation unit, and the color correlation degree obtained by the color correlation value calculation unit.

The interpolation unit performs pixel interpolation on the target pixel by the pixel interpolation method determined by the pixel interpolation method determination unit to obtain a second image signal that is a signal provided after the pixel interpolation.

The correction processing unit performs color space conversion on the second image signal obtained by the interpolation unit in accordance with an arrangement pattern of the color filter to obtain an output image signal.

In the pixel interpolation apparatus, the signal correction unit, in accordance with the arrangement of four-color filter of the imaging unit, corrects the signal level, and then performs processing for calculating the saturation evaluation value and processing for calculating the grayscale correlation value using the image signal after the signal level correction. Thus, the pixel interpolation processing apparatus determines the pixel interpolation method based on the result obtained by the accurate processing for calculating the saturation evaluation value and accurate processing for calculating the grayscale correlation value, and then performs highly accurate pixel interpolation processing using the determined pixel interpolation method, regardless of the array pattern of the four-color filter. Furthermore, the pixel interpolation processing apparatus obtains an output image signal by performing color space conversion on the second image signal obtained by the interpolation unit in accordance with the array pattern of the color filter.

A second aspect of the invention provides the pixel interpolation apparatus of the first aspect of the invention in which the interpolation unit includes a color-image interpolation unit, a grayscale-image interpolation unit, a signal inverse correction unit, and a selection unit.

The color-image interpolation unit performs color-image pixel interpolation processing on the image formed by the image signal including the first-color pixel signal, the second-color pixel signal, the third-color pixel signal and the fourth-color pixel signal when the pixel interpolation method determination unit determines to perform pixel interpolation by a color-image pixel interpolation method.

The grayscale-image interpolation unit performs grayscale-image pixel interpolation processing on the image formed by the first image signal output from the signal correction unit when the pixel interpolation method determination unit determines to perform pixel interpolation by a grayscale-image pixel interpolation method.

The signal inverse correction unit performs inverse correction of signal level on the image signal on which the grayscale-image interpolation unit has performed the grayscale-image pixel interpolation processing such that a signal level which is corrected by the signal correction unit is substantially equal to a signal level provided before being corrected.

The selection unit (1) obtains an image signal which has been processed by the color-image interpolation unit as the second image signal when the pixel interpolation method determination unit determines to perform pixel interpolation processing by the color-image pixel interpolation method, (2) obtains an image signal which has been processed by the signal inverse correction unit as the second image signal when the pixel interpolation method determination unit determines to perform pixel interpolation processing by the grayscale-image pixel interpolation method, and (3) outputs the obtained second image signal to the correction processing unit.

In the pixel interpolation apparatus, the signal correction unit, in accordance with the arrangement of four-color filter of the imaging unit, corrects the signal level, and then performs processing for calculating the saturation evaluation value, processing for calculating the grayscale correlation value, and interpolation for a grayscale image using the image signal after the signal level correction. Further, the pixel interpolation processing apparatus performs interpolation for a color image without the signal level correction, and subjects the signal after interpolation for a grayscale image to inverse correction in which the signal level of the signal after interpolation for a grayscale image is corrected to the original signal level, thus enabling the signal level of the signal after pixel interpolation, which is output from the interpolation unit, to be the substantially same level. In other words, the pixel interpolation processing apparatus prevents the significant difference between the signal level of the signal after interpolation for a color image and the signal level of the signal after interpolation for a grayscale image from occurring. This easily enhances the accuracy of the subsequent processing on the image signal after the pixel interpolation.

A third aspect of the invention provides the pixel interpolation apparatus of one of the first to second aspects of the invention in which the correction processing unit includes a first matrix transformation unit, a color-space processing unit, a saturation obtaining unit, a color difference correction unit, and a second matrix transformation unit.

The first matrix transformation unit performs color space conversion on the second image signal obtained by the interpolation unit in accordance with an arrangement pattern of the color filter to obtain an image signal in an RGB color space.

The color-space processing unit converts the image signal in an RGB color space, which is obtained by the first matrix transformation unit, into an image signal in a YCbCr color space.

The saturation obtaining unit obtains a saturation signal from the image signal in an RGB color space, which is obtained by the first matrix transformation unit.

The color difference correction unit performs correction processing on a Cb-color component signal and a Cr-color component signal in the image signal in a YCbCr color space, which is obtained by the color-space processing unit, based on the saturation signal obtained by the saturation obtaining unit.

The second matrix transformation unit performs color space conversion on a Y component signal in the image signal in a YCbCr color space, which is obtained by the color-space processing unit, and on the Cb-color component signal and the Cr-color component signal, which are corrected by the color difference correction unit, to obtain an image signal in an RGB color space.

The pixel interpolation apparatus obtains an image signal in the RGB color space from the image signal processed through highly accurate pixel interpolation, and furthermore obtains a saturation signal through processing, such as RGB-HSV conversion. The pixel interpolation processing unit performs correction on the Cb-component signal and the Cr-component signal, which are the obtained color difference signals by the color space processing unit, based on the obtained saturation signal. In other words, the pixel interpolation processing unit can determine, based on the highly accurate saturation signal, whether the target pixel is included in a grayscale image area or in a color image area, and correct the Cb-component signal and the Cr-component signal based on the saturation signal, thereby reducing side effects, such as false color occurrence, appropriately.

A fourth aspect of the invention provides the pixel interpolation apparatus of one of the first to third aspects of the invention further including a border detection unit configured to detect a border between a color-image area and a grayscale-image area in the image formed by the image signal including the first-color pixel signal, the second-color pixel signal, the third-color pixel signal, and the fourth-color pixel signal.

When the border between the color-image area and the grayscale-image area, which is detected by the border detection unit, is included in an image area for grayscale correlation degree calculation, the grayscale correlation value calculation unit assigns greater weights upon pixels, which are disposed on a line parallel to a correlation direction in which the grayscale correlation degree calculation is to be performed and are included in a central area of the image area for the grayscale correlation degree calculation, to obtain the grayscale correlation degree while enhancing effectiveness of the pixels in the grayscale correlation degree calculation.

This ensures sufficient accuracy in calculating the correlation around the border between the color image area and the grayscale image area in the pixel interpolation processing apparatus, thus preventing false color phenomena, which often occur in the border region between the color image area and the grayscale image area, from occurring.

A fifth aspect of the invention provides the pixel interpolation apparatus of one of the first to fourth aspects of the invention in which in a case where a direction having a high correlation has been detected based on the degree of correlation, the interpolation unit (1) obtains, when a color component pixel with a color identical to a color of a first-color component pixel targeted for pixel interpolation and a second-color component pixel are located in the direction having the high correlation in the image, a change ratio in the direction having the high correlation as a first change ratio by using a pixel value of the second-color component pixel, obtains a pixel value of a first-color component pixel of the target pixel based on a first-color component pixel located in the direction having the high correlation and the obtained first change ratio, and performs pixel interpolation processing on the target pixel, and (2) obtains, when a color component pixel with a color identical to a color of a color component pixel targeted for pixel interpolation is not located in the direction having the high correlation in the image, a color component pixel value with the identical color by performing color space conversion in the direction orthogonal to the direction having the high correlation, obtains, as a second change ratio, a change ratio in a direction orthogonal to the direction having the high correlation of the obtained color component pixel resulting from the color space conversion, and performs pixel interpolation processing on the target pixel based on the obtained second change ratio.

The pixel interpolation processing apparatus obtains, when a color component pixel with a color identical to a color of a first-color component pixel targeted for pixel interpolation and a second-color component pixel are located in the direction having the high correlation in the image, a change ratio in the direction having the high correlation as a first change ratio by using a pixel value of the second-color component pixel, obtains a pixel value of a first-color component pixel of the target pixel based on a first-color component pixel located in the direction having the high correlation and the obtained first change ratio, and performs pixel interpolation processing on the target pixel. In other words, the pixel interpolation processing apparatus performs interpolation processing in consideration of the change ratio in the direction having the high correlation that is calculated using color component pixels different from color component pixels targeted for the pixel interpolation.

Thus, the pixel interpolation processing apparatus performs highly accurate pixel interpolation as compared with the case of performing pixel interpolation using an average value of the pixel values of the same color component pixels located in the correlation direction (the direction having high correlation).

Further, the pixel interpolation processing apparatus obtains, when a color component pixel with a color identical to a color of a color component pixel targeted for pixel interpolation is not located in the direction having the high correlation in the image, a color component pixel value with the identical color by performing color space conversion in the direction orthogonal to the direction having the high correlation, obtains, as a second change ratio, a change ratio in a direction orthogonal to the direction having the high correlation of the obtained color component pixel resulting from the color space conversion, and performs pixel interpolation processing on the target pixel based on the obtained second change ratio. In other words, the pixel interpolation processing apparatus obtains the second change ratio in the direction orthogonal to the direction having high correlation by performing color space conversion, and performs pixel interpolation using the obtained second change ratio. Thus, the pixel interpolation processing apparatus performs highly accurate pixel interpolation even when color component pixels whose color component are the same as that of the pixel targeted for the pixel interpolation does not exist in the direction having high correlation.

Note that assuming a three dimensional color space is defined and its basis vectors are defined, "a color component pixel value with the identical color" refers to a pixel with a color component pixel value whose corresponding point in the three dimensional color space is located in a straight line extended from a basis vector defined in the three dimensional color space. Examples of "a color component pixel value with the identical color" include R+2G+B color component pixel value and R−G color component pixel value; they includes W−R color component pixel value, W−G color component pixel value, and W−B color component pixel value, which are defined in the additive color space; they also includes W−Ye color component pixel value, W−M color component pixel value, and W−Cy color component pixel value, which are defined in the subtractive color space. Note that "Ye" denotes a yellow color component value, "M" denotes a magenta color component value, and "Cy" denotes a cyan color component value.

A W−Ye color component pixel value, a W−M color component pixel value and a W−Cy color component pixel value is derived from the formulas below:

$$W=Y=R\text{gain}\times R+G\text{gain}\times G+B\text{gain}\times B$$

Rgain=0.299
Ggain=0.587
Bgain=0.114

$$Ye\text{gain}\times Ye=R\text{gain}\times R+G\text{gain}\times G$$

$$M\text{gain}\times M=R\text{gain}\times R+B\text{gain}\times B$$

$$Cy\text{gain}\times Cy=G\text{gain}\times G+B\text{gain}\times B$$

where R is a R-component pixel value, G is a G-component pixel value, and B is a B-component pixel value. For example, the W−Ye color component pixel value is equal to the B-color component pixel value. In other words, the W−Ye color component pixel value is calculated by W−Yegain×Ye; the B-color component pixel value is calculated by BgainxB. Moreover, the same applies to the W–M-color component pixel value and the W–Cy color component pixel values.

A sixth aspect of the invention provides the pixel interpolation apparatus of the fifth aspect of the invention in which the interpolation unit calculates the second change ratio of the color component pixel value having the identical hue obtained by performing color space conversion based on a Laplacian component value of the color component pixel value.

This allows the pixel interpolation processing apparatus to calculate the second change ratio of the color component pixel value having the identical hue obtained by performing color space conversion based on a Laplacian component value of the color component pixel value.

A seventh aspect of the invention provides the pixel interpolation apparatus of the sixth aspect of the invention in which when a color component pixel with a color identical to a color of a color component pixel targeted for pixel interpolation is not located in the direction having the high correlation, the interpolation unit obtains a first color component value Pout of the target pixel by using the formula below:

$$Pout=(P1+P2)/2-Lap \times gain,$$

where, in the direction orthogonal to the correlation direction, pos1 is a position of the target pixel, pos0 and pos2 are positions across the target pixel, P1 is a first-color component pixel value at the position pos0, P2 is a first-color component pixel value at the position pos2, Lap is a Laplacian component value calculated from a pixel value of a color component pixel other than a first-color component pixel calculated from the positions pos0, pos1, and pos2, and gain is a gain for adjusting the Laplacian component value.

This allows the pixel interpolation processing apparatus to obtain the pixel value of the target pixel (the first color component pixel value of the pixel targeted for the pixel interpolation) by subtracting gain-adjusted Laplacian component value from the average value of pixels located at positions (pos0 and pos2) that sandwich the target pixel. The pixel interpolation processing apparatus, for example, adjusts a gain for adjusting the Laplacian component value in accordance with optical characteristics of the imaging unit (the optical characteristics of an image sensor, or the optical characteristics of an optical filter), thereby achieving highly accurate pixel interpolation.

Note that a first color component pixel may not exist at the position pos0. When a first color component pixel does not exist at the position pos0, the first color component pixel value at the position pos0 may be obtained by performing processing, such as interior division processing, using the pixels (the first color component pixels) located in the correlation direction.

In addition, a first color component pixel may not exist at the position pos2. When a first color component pixel does not exist at the position pos2, the first color component pixel value at the position pos2 may be obtained by performing processing, such as interior division processing, using the pixels (the first color component pixels) located in the correlation direction.

A eighth aspect of the invention provides the pixel interpolation apparatus of one of the first to seventh aspects of the invention in which the interpolation unit interpolates a pixel value with the first color component of the target pixel by subtracting a Laplacian component value calculated from pixel values of a plurality of pixels with the second color component arranged in a correlation direction having a high degree of correlation determined by the pixel interpolation method determination unit from an average of pixel values of two pixels with the first color component that are adjacent across the target pixel in the correlation direction.

This allows the pixel interpolation processing apparatus to perform pixel interpolation in consideration of the change ratio in units of one pixel in the correlation direction. Thus, the pixel interpolation processing apparatus performs highly accurate pixel interpolation.

Note that "first color component" may be one of W, R, G, B color components; "second color component" is a color component other than the first color component. Also, "second color component" may be one of W, R, G, B color components and Ye, Cy, G, Mg color components; furthermore it may be any other color component, such as W–R color component, B+G color component, W–G color component, and W–B color component.

A ninth aspect of the invention provides the pixel interpolation apparatus of the eighth aspect of the invention in which the interpolation unit interpolates the pixel value with the first color component of the target pixel by subjecting the Laplacian component value to gain adjustment, and subtracting the Laplacian component value that has undergone the gain adjustment from the average of the pixel values of the two pixels with the first color component that are adjacent across the target pixel.

The pixel interpolation processing apparatus performs pixel interpolation with the Laplacian component adjusted, and thus achieves highly accurate pixel interpolation by adjusting the Laplacian component in accordance with the optical characteristics of the imaging unit (optical characteristics of an image sensor and/or a optical filter), for example.

A tenth aspect of the invention provides the pixel interpolation apparatus of one of the first to ninth aspects of the invention in which the grayscale correlation value calculation unit obtains a correlation degree in a horizontal direction, a correlation degree in a vertical direction, a correlation degree in a first diagonal direction, and a correlation degree in a second diagonal direction orthogonal to the first diagonal direction in the image.

The color correlation value calculation unit obtains a correlation degree in a horizontal direction, a correlation degree in a vertical direction, a correlation degree in a first diagonal direction, and a correlation degree in a second diagonal direction orthogonal to the first diagonal direction in the image.

This allows the pixel interpolation processing apparatus to perform pixel interpolation using the correlation degree in the horizontal direction, the correlation degree in the vertical direction, the correlation degree in the first diagonal direction, and the correlation degree in the second diagonal direction.

Note that the first diagonal direction is preferably a direction whose angle is 45 degrees with respect to the horizontal direction or the vertical direction.

An eleventh aspect of the invention provides the pixel interpolation apparatus of one of the first to the tenth aspects of the invention in which the saturation evaluation value calculation unit evaluates saturation of an image area of five pixels by five pixels, which includes the target pixel at its center, to obtain a saturation evaluation value of the image area.

The grayscale correlation value calculation unit obtains the grayscale correlation degree in an image area of five pixels by five pixels, which includes the target pixel at its center.

The color correlation value calculation unit obtains the color correlation degree in an image area of five pixels by five pixels, which includes the target pixel at its center.

This allows the pixel interpolation processing apparatus to evaluate saturation and obtain the degree of correlation using the image area of five pixels by five pixels.

A twelfth aspect of the invention provides the pixel interpolation apparatus of the eleventh aspect of the invention in which the saturation evaluation value calculation unit performs processing corresponding to a formula below to obtain two color component difference values color_diff0 and color_diff1

Formula 1

$$\begin{pmatrix} color\_diff0 \\ color\_diff1 \end{pmatrix} = \begin{pmatrix} k01 & k02 & k03 & k04 \\ k11 & k12 & k13 & k14 \end{pmatrix} \begin{pmatrix} p00\_color1 \\ p01\_color2 \\ p10\_color3 \\ p11\_color4 \end{pmatrix} + \begin{pmatrix} offset0 \\ offset1 \end{pmatrix} \quad (1)$$

where p00_color1 is an average of pixel values of first-color component pixels included in the image area of five pixels by five pixels, which includes the target pixel at its center,
p01_color2 is an average of pixel values of second-color component pixels included in the image area of five pixels by five pixels, which includes the target pixel at its center,
p10_color3 is an average of pixel values of third-color component pixels included in the image area of five pixels by five pixels, which includes the target pixel at its center,
p11_color4 is an average of pixel values of fourth-color component pixels included in the image area of five pixels by five pixels, which includes the target pixel at its center,
k01, k02, k03, k04, k11, k12, k13, and k14 are coefficients for obtaining a predetermined color_difference value, and color_diff0 and color_diff1 are offset values.

The saturation evaluation value calculation unit performs processing corresponding to a formula of "diff_ave_color=abs(color_diff0)+abs(color_diff1)" where abs(x) is a function that returns an absolute value of "x", thereby obtaining an average color component difference evaluation value diff_ave_color. The saturation evaluation value calculation unit obtains the saturation evaluation value of the image area using the obtained average color component difference evaluation value diff_ave_color.

This allows the pixel interpolation processing apparatus to obtain the saturation evaluation value of the image area based on the average color component difference evaluation value diff_ave_color obtained using the image area of five pixels by five pixels.

The pixel interpolation processing apparatus sets the above coefficients k01 to k04, and k11 to k14 based on the color of the color filter and the difference component to be obtained, and performs the above-described processing corresponding to color space conversion (color component difference obtaining processing), thereby obtaining a desired color difference value.

A thirteenth aspect of the invention provides the pixel interpolation apparatus of the twelfth aspect of the invention in which the saturation evaluation value calculation unit performs processing below.
(1) The saturation evaluation value calculation unit obtains an overall evaluation value g1_color based on a difference between the target pixel and each of eight pixels adjacently located in the vertical direction, horizontal direction, and the diagonal direction to the target pixel in an image area of five pixels by five pixels, which includes the target pixel at its center.
(2) The saturation evaluation value calculation unit selects a plurality of pairs of two pixels vertically adjacent to each other in an image area of five pixels by five pixels, which includes the target pixel at its center, calculates a difference between two pixel values of the selected pixels for each of the plurality of pairs of two pixels, and obtains a vertical direction evaluation value v_color based on the calculated differences using the selected pixels for each of the plurality of pairs of two pixels.
(3) The saturation evaluation value calculation unit selects a plurality of pairs of two pixels horizontally adjacent to each other in an image area of five pixels by five pixels, which includes the target pixel at its center, calculates a difference between two pixel values of the selected pixels for each of the plurality of pairs of two pixels, and obtains a horizontal direction evaluation value h_color based on the calculated differences using the selected pixels for each of the plurality of pairs of two pixels.
(4) The saturation evaluation value calculation unit selects a plurality of pairs of two pixels adjacent to each other in the first diagonal direction in an image area of five pixels by five pixels, which includes the target pixel at its center, calculates a difference between two pixel values of the selected pixels for each of the plurality of pairs of two pixels, and obtains a first diagonal direction evaluation value d1_color based on the calculated differences using the selected pixels for each of the plurality of pairs of two pixels.
(5) The saturation evaluation value calculation unit selects a plurality of pairs of two pixels adjacent to each other in the second diagonal direction in an image area of five pixels by five pixels, which includes the target pixel at its center, calculates a difference between two pixel values of the selected pixels for each of the plurality of pairs of two pixels, and obtains a second diagonal direction evaluation value d2_color based on the calculated differences using the selected pixels for each of the plurality of pairs of two pixels.

The saturation evaluation value calculation unit obtains the saturation evaluation value of the image area based on at least one of the average color component difference evaluation value diff_ave_color, the overall evaluation value g1_color, the vertical direction evaluation value v_color, the horizontal direction evaluation value h_color, the first diagonal direction evaluation value d1_color, and the second diagonal direction evaluation value d2_color.

This allows the pixel interpolation processing apparatus to obtain the saturation evaluation value based on at least one of (1) the average color component difference evaluation value diff_ave_color, (2) the overall evaluation value g1_color, (3) the vertical direction evaluation value v_color, (4) the horizontal direction evaluation value h_color, (5) the first diagonal direction evaluation value d1_color, and (6) the second diagonal direction evaluation value d2_color, which are obtained using the image area of five pixels by five pixels.

A fourteenth aspect of the invention provides an imaging apparatus including an imaging unit having a color filters with four different colors arranged in a predetermined pattern, the imaging unit being configured to obtain an image signal from subject light, and the pixel interpolation apparatus according to one of the first to thirteenth aspects to perform pixel interpolation processing on the image signal. This achieves an imaging apparatus including the pixel interpolation processing apparatus according to one of the first to thirteenth aspects.

A fifteenth aspect of the invention provides a pixel interpolation processing method for performing pixel interpolation on an image signal obtained by an imaging unit including a color filter having a first color filter, a second color filter, a third color filter, and a fourth color filter arranged in a predetermined pattern, the image signal including a first-color pixel signal obtained via the first color filter, a second-color pixel signal obtained via the second color filter, a third-color pixel signal obtained via the third color filter, and a fourth-color pixel signal obtained via the fourth color filter.

The pixel interpolation processing method including a signal correction step, a saturation evaluation value calculation step, a grayscale correlation value calculation step, a color correlation value calculation step, a pixel interpolation method determination step, an interpolation step, and a correction step.

The signal correction step corrects a signal level of each of the first-color pixel signal, the second-color pixel signal, the third-color pixel signal, and the fourth-color pixel signal in accordance with its corresponding color filter and to output an image signal including the first-color pixel signal, the second-color pixel signal, the third-color pixel signal, and the fourth-color pixel signal which have been corrected, as a first image signal.

The saturation evaluation value calculation step evaluates saturation of an image area in an image formed by the first image signal, based on the first image signal output by the signal correction step, and obtains a saturation evaluation value of the image area.

The grayscale correlation value calculation step obtains correlation degrees of a plurality of pairs of two directions orthogonal to each other in the image formed by the first image signal, using data of those pixels that are located in an image area including and surrounding a target pixel which is being processed, as a grayscale correlation degree.

The color correlation value calculation step obtains, as a color correlation degree, correlation degrees of a plurality of pairs of two directions orthogonal to each other in the image formed by the image signal including the first-color pixel signal, the second-color pixel signal, the third-color pixel signal, and the fourth-color pixel signal, using data of pixels that are located in an image area including and surrounding the target pixel and that have the same color.

The pixel interpolation method determination step determines a pixel interpolation method for the target pixel, based on the saturation evaluation value obtained by the saturation evaluation value calculation step, the grayscale correlation degree obtained by the grayscale correlation value calculation step, and the color correlation degree obtained by the color correlation value calculation step.

The interpolation step performs pixel interpolation on the target pixel by the pixel interpolation method determined by the pixel interpolation method determination step to obtain a second image signal that is a signal provided after the pixel interpolation.

The correction step performs color space conversion on the second image signal obtained by the interpolation step in accordance with an arrangement pattern of the color filter to obtain an output image signal.

This achieves the program having the same advantageous effects as the pixel interpolation processing apparatus of the first aspect of the present invention.

A sixteenth aspect of the invention provides a pixel interpolation apparatus for performing pixel interpolation on an image signal obtained by an imaging unit including a color filter having a first color filter, a second color filter, a third color filter, and a fourth color filter arranged in a predetermined pattern, the image signal including a first-color pixel signal obtained via the first color filter, a second-color pixel signal obtained via the second color filter, a third-color pixel signal obtained via the third color filter, and a fourth-color pixel signal obtained via the fourth color filter.

The integrated circuit includes a signal correction unit, a saturation evaluation value calculation unit, a grayscale correlation value calculation unit, a color correlation value calculation unit, a pixel interpolation method determination unit, an interpolation unit, and a correction processing unit.

The signal correction unit corrects a signal level of each of the first-color pixel signal, the second-color pixel signal, the third-color pixel signal, and the fourth-color pixel signal in accordance with its corresponding color filter and outputs an image signal including the first-color pixel signal, the second-color pixel signal, the third-color pixel signal, and the fourth-color pixel signal which have been corrected, as a first image signal.

The saturation evaluation value calculation unit evaluates saturation of an image area in an image formed by the first image signal, based on the first image signal output from the signal correction unit, and to obtain a saturation evaluation value of the image area. The grayscale correlation value calculation unit obtains correlation degrees of a plurality of pairs of two directions orthogonal to each other in the image formed by the first image signal, using data of those pixels that are located in an image area including and surrounding a target pixel which is being processed, as a grayscale correlation degree.

The color correlation value calculation unit obtains, as a color correlation degree, correlation degrees of a plurality of pairs of two directions orthogonal to each other in the image formed by the image signal including the first-color pixel signal, the second-color pixel signal, the third-color pixel signal, and the fourth-color pixel signal, using data of pixels that are located in an image area including and surrounding the target pixel and that have the same color.

The pixel interpolation method determination unit determines a pixel interpolation method for the target pixel, based on the saturation evaluation value obtained by the saturation evaluation value calculation unit, the grayscale correlation degree obtained by the grayscale correlation value calculation unit, and the color correlation degree obtained by the color correlation value calculation unit.

The interpolation unit performs pixel interpolation on the target pixel by the pixel interpolation method determined by the pixel interpolation method determination unit to obtain a second image signal that is a signal provided after the pixel interpolation.

The correction processing unit performs color space conversion on the second image signal obtained by the interpolation unit in accordance with an arrangement pattern of the color filter to obtain an output image signal.

This achieves the integrated circuit having the same advantageous effects as the pixel interpolation processing apparatus of the first aspect of the present invention.

Advantageous Effects

The present invention provides a pixel interpolation apparatus, an imaging apparatus, a program, and an integrated circuit that appropriately perform pixel interpolation on an image signal obtained by a single-chip image sensor with a four-color filter whatever array pattern the four-color filter has.

EMBODIMENTS OF THE INVENTION

First Embodiment

Figure 1:
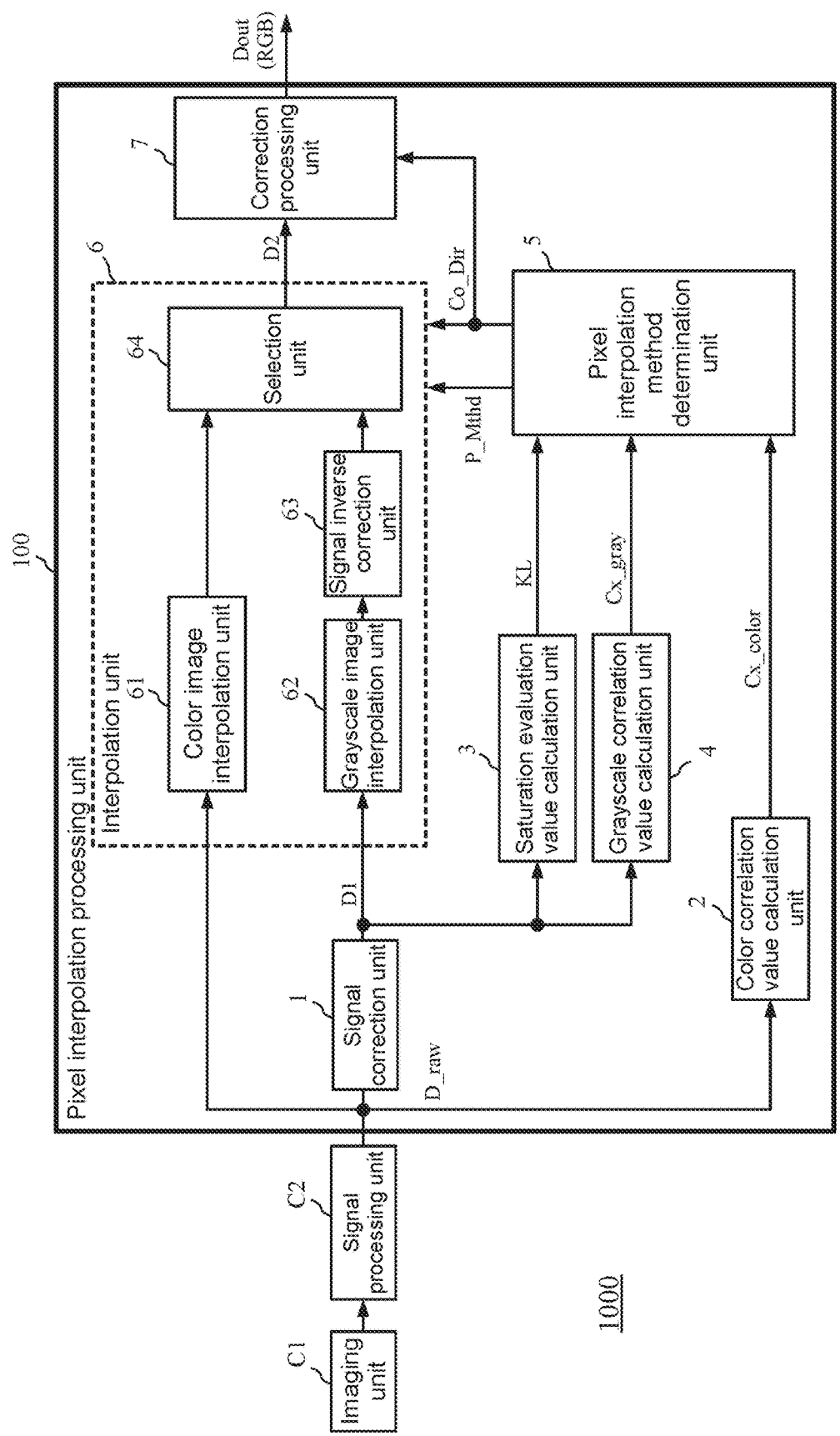
FIG. 1 is a schematic diagram of an imaging apparatus 1000 according to a first embodiment.

A first embodiment will now be described with reference to the drawings 1.1 Structure of Imaging Apparatus FIG. 1 is a schematic diagram of an imaging apparatus 1000 according to the first embodiment.

As shown in FIG. 1, the imaging apparatus 1000 includes an imaging unit C1, a signal processing unit C2, and a pixel interpolation processing unit 100.

The imaging unit C1 converts light from a subject through photoelectric conversion to obtain image signals. The signal processing unit C2 performs predetermined signal processing on the image signals obtained by the imaging unit C1.

The pixel interpolation processing unit 100 (pixel interpolation apparatus) performs pixel interpolation processing on the image signals that have undergone the predetermined signal processing performed by the signal processing unit C2.

The imaging unit C1 includes an optical system, a four-color array filter, and an image sensor.

For ease of explanation, a case in which "a four-color array filter" is a Ye(Yellow)-Cy(Cyan)-G(Green)-Mg(Magenta) array filter will now be described below as one example.

The optical system, including one or more lenses, collects light from a subject, and focuses the subject light onto the surface of the image sensor.

The optical system may be capable of exposure adjustment and focus adjustment.

The Ye-Cy-G-Mg array of color filter includes four color filters, or the color filters for a Ye-component, an Cy-component, a G-component, and a Mg-component. The Ye-Cy-G-Mg array has a predetermined pattern. The color filters in the Ye-Cy-G-Mg array are arranged on the imaging surface of the image sensor.

The image sensor has a plurality of pixels. The image sensor converts subject light, which has been collected by the optical system and focused onto the imaging surface through the Ye-Cy-G-Mg array of color filters, by photoelectric conversion to generate image signals (electrical signals). The image sensor generates a Ye-component pixel signal through a pixel for obtaining a Ye-component, and generates an Cy-component pixel signal through a pixel for obtaining an Cy-component. The image sensor also generates a G-component pixel signal through a pixel for obtaining a G-component, and generates a Mg-component pixel signal through a pixel for obtaining a Mg-component. The image sensor outputs the pixel signals generated through those pixels (the Ye-component pixel signal, Cy-component pixel signal, G-component pixel signal, and Mg-component pixel signal) to the signal processing unit C2 as image signals.

The signal processing unit C2 receives the image signals output from the imaging unit C1, and subjects the input image signals to predetermined signal processing (e.g., gain adjustment, white balance adjustment, and gamma correction). The signal processing unit C2 outputs the image signals that have undergone the predetermined signal processing to the pixel interpolation processing unit 100 as an image signal D_raw.

As shown in FIG. 1, the pixel interpolation processing unit 100 includes a signal correction unit 1, a color correlation value calculation unit 2, a saturation evaluation value calculation unit 3, a grayscale correlation value calculation unit 4, a pixel interpolation method determination unit 5, an interpolation unit 6, and a correction processing unit 7.

The signal correction unit 1 receives the image signal D_raw from the signal processing unit C2 and then performs correction processing on the received image signal D_raw. At that time, the signal correction unit 1 corrects the signal level of each of the color component pixel signals of the image signal D_raw in accordance with the type of the color filter. The signal correction unit 1 then outputs the image signal, on which the correction processing has been performed, to the saturation evaluation value calculation unit 3, the grayscale correlation value calculation unit 4, and a grayscale image interpolation unit 62 of the interpolation unit 6, as an image signal D1.

The color correlation value calculation unit 2 receives the image signal D_raw output from the signal processing unit C2 (a single image, or a one-frame image formed using the image signal D_raw, hereafter expressed as an image D_raw). The color correlation value calculation unit 2 calculates the following four color correlation values for a target pixel (a pixel to be processed) in the image D_raw (Details thereof will be described later).

(A1) a vertical direction correlation value Cv_color for a color image area (A2) a horizontal direction correlation value Ch_color for a color image area (A3) a first diagonal direction correlation value Cd1_color for a color image area (A4) a second diagonal direction correlation value Cd2_color for a color image area The color correlation value calculation unit 2 outputs the four color correlation values calculated for each pixel in the image D_raw to the pixel interpolation method determination unit 5. Note that the above-described four color correlation values are collectively referred to Cx_color.

The saturation evaluation value calculation unit 3 receives the image signal D1 output from the signal correction unit 1. The saturation evaluation value calculation unit 3 calculates a saturation evaluation value L for a target pixel (processing target pixel) in an image D1, and further normalizes the saturation evaluation value L using a predetermined function to obtain a saturation evaluation coefficient KL ($0 \leq KL \leq 1$) (described in detail later). The saturation evaluation value calculation unit 3 then outputs the saturation evaluation coefficient KL obtained for each pixel included in the image D1 to the pixel interpolation method determination unit 5.

The grayscale correlation value calculation unit 4 receives the image signal D1 output from the signal correction unit 1. The grayscale correlation value calculation unit 4 calculates the following four grayscale correlation values for a target pixel (a pixel to be processed) in the image D1 (Details thereof will be described later).

(B1) a vertical direction correlation value Cv_gray for a grayscale image area (B2) a horizontal direction correlation value Ch_gray for a grayscale image area (B3) a first diagonal direction correlation value Cd1_gray for a grayscale image area (B4) a second diagonal direction correlation value Cd2_gray for a grayscale image area The grayscale correlation value calculation unit 4 outputs the four color correlation values calculated for each pixel in the image D1 to the pixel interpolation method determination unit 5.

The pixel interpolation method determination unit 5 receives the saturation evaluation coefficient KL for each pixel output from the saturation evaluation value calculation unit 3, the color correlation value Cx_color for each pixel output from the color correlation value calculation unit 2, and the grayscale correlation value Cx_gray for each pixel output from the grayscale correlation value calculation unit 4. The pixel interpolation method determination unit 5 determines the correlation direction and the pixel interpolation method for each pixel based on the saturation evaluation coefficient KL and the correlation value Cx_color (described in detail later). The pixel interpolation method determination unit 5 outputs information Co_Dir about the correlation direction and information P_Mthd about the pixel interpolation method determined for each pixel to the interpolation unit 6. The pixel interpolation method determination unit 5 outputs information about the correlation direction determined for each pixel to the correction processing unit 7.

The interpolation unit 6 receives the image signal D_raw output from the signal processing unit C2, the image signal D1 output from the signal correction unit 1, and information about the correlation direction and the pixel interpolation method determined for each pixel output from the pixel interpolation method determination unit 5. The interpolation unit 6 performs pixel interpolation processing for each pixel in the image D_raw to allow each of al the pixels to have the four color components (for this embodiment, the Ye-component, the Cy-component, the G-component, and the Mg-component) using the correlation direction and the pixel interpolation method determined by the pixel interpolation method determination unit 5 (described in detail later). The interpolation unit 6 outputs image signals resulting from the pixel interpolation processing (image signals in which each of all the pixels included in an image formed by the image signals has the Ye-component, the Cy-component, the G-component, and the Mg-component) to the correction processing unit 7 as an image signal D2.

As shown in FIG. 1, the interpolation unit 6 includes a color image interpolation unit 61, a grayscale image interpolation unit 62, a signal inverse correction unit 63, and a selection unit 64. Note that for simplicity of illustration, some inputs and/or outputs of functional units included in the interpolation unit 6 are not shown in FIG. 1.

The color image interpolation unit 61 receives the image signal D_raw output from the signal processing unit C2. The color image interpolation unit 61 performs interpolation for a color image on the image signal D_raw based on information Co_Dir about the correlation direction and information P_Mthd about the pixel interpolation method, which are output from the pixel interpolation method determination unit 5, and then outputs the image signal processed through the interpolation for a color image to the selection unit 64.

The grayscale image interpolation unit 62 receives the image signal D1 output from the signal correction unit 1. The grayscale image interpolation unit 62 performs interpolation for a grayscale image on the image signal D1 based on information Co_Dir about the correlation direction and information P_Mthd about the pixel interpolation method, which are output from the pixel interpolation method determination unit 5, and then outputs the image signal processed through the interpolation for a grayscale image to the signal inverse correction unit 63.

The signal inverse correction unit 63 receives the image signal output from the grayscale image interpolation unit 62. The signal inverse correction unit 63 subjects the image signal output from the grayscale image interpolation unit 62 to processing inverse to the correction processing that the signal correction unit 1 has performed. More specifically, the signal inverse correction unit 63 performs processing inverse to the correction processing that the signal correction unit 1 has performed such that the signal level of the image signal output from the grayscale image interpolation unit 62 approximately equals the signal level to be input to the signal correction unit 1. The signal inverse correction unit 63 then outputs the image signal after the inverse correction processing to the selection unit 64.

The selection unit 64 receives the image signal output from the color image interpolation unit 61 and the image signal output from the signal inverse correction unit 63. The selection unit 64 selects either the image signal output from the color image interpolation unit 61 or the image signal output from the signal inverse correction unit 63 based on information Co_Dir about the correlation direction and information P_Mthd about the pixel interpolation method, which are output from the pixel interpolation method determination unit 5. The selection unit 64 then outputs the selected signal as the image signal D2 to the correction processing unit 7.

The correction processing unit 7 receives the image signal D2 output from the interpolation unit 6 and information Co_Dir about the correlation direction, which is output from the pixel interpolation method determination unit 5. The correction processing unit 7 performs processing, such as correction processing and conversion processing, on the image signal D2 to obtain an image signal Dout, which is a signal in the RGB color space.

Figure 2:
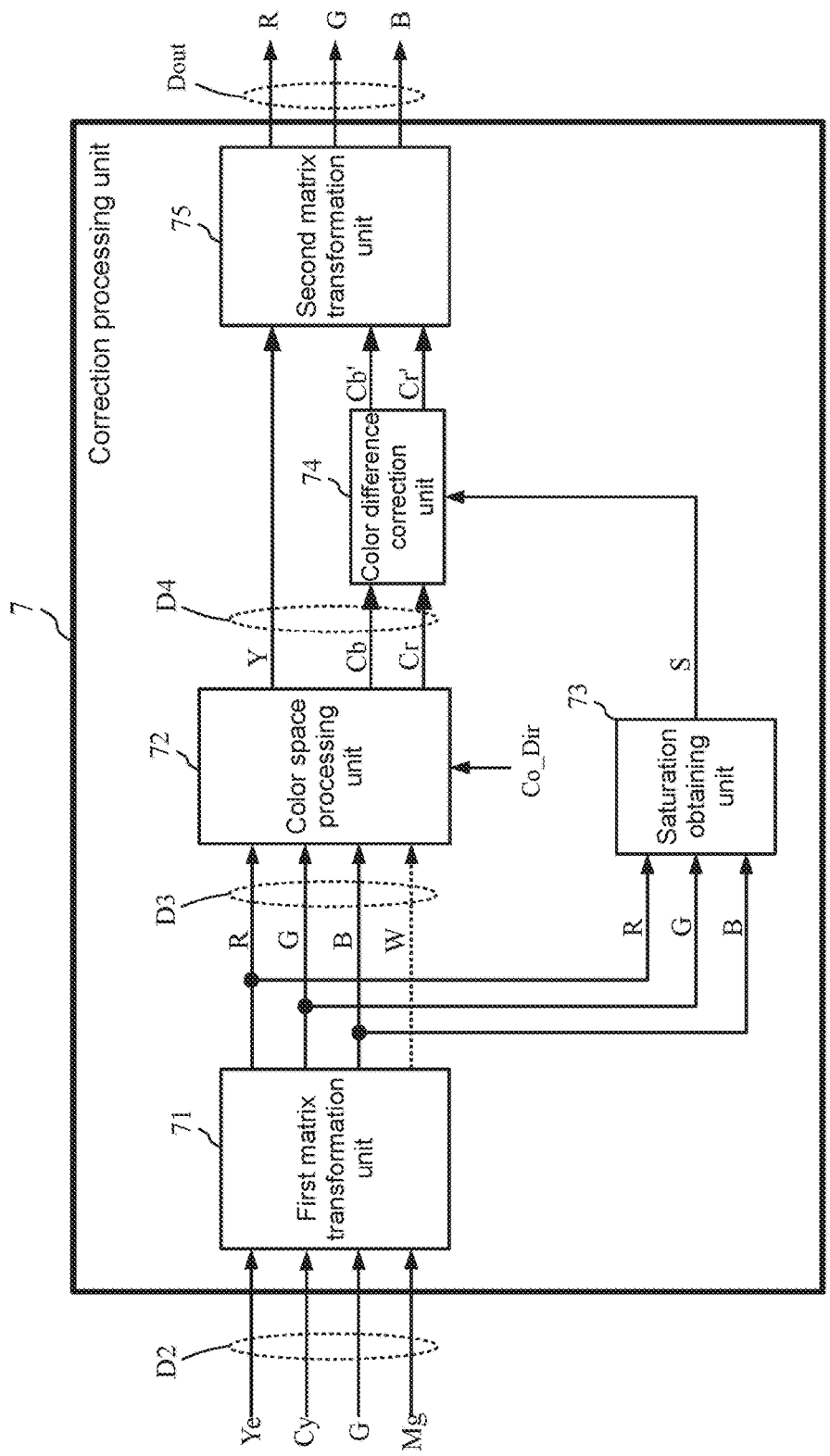
FIG. 2 is a schematic diagram of a correction processing unit 7 according to the first embodiment.

The correction processing unit 7 includes, for example, as shown in FIG. 2, a first matrix transformation unit 71, a color space processing unit 72, a saturation obtaining unit 73, a color difference correction unit 74, and a second matrix transformation unit 75.

The first matrix transformation unit 71 receives the image signal Dout output from the selection unit 64 of the interpolation unit 6. The first matrix transformation unit 71 performs matrix transformation on the image signal D2 to obtain an image signal D3, which is a signal in the RGB color space. The first matrix transformation unit 71 outputs the obtained image signal D3 to the color space processing unit 72. Note that when the image signal D2 includes a W component pixel signal, the first matrix transformation unit 71 outputs the image signal D3 containing the W component pixel signal.

The first matrix transformation unit 71 outputs an R component pixel signal, a G component pixel signal, and a B component pixel signal, which are included in the image signal D3, to the saturation obtaining unit 73.

The color space processing unit 72 receives the image signal D3 output from the first matrix transformation unit 71, and information Co_Dir about the correlation direction, which is output from the pixel interpolation method determination unit 5. The color space processing unit 72, based on information Co_Dir about the correlation direction, obtains a Y component pixel signal (luminance signal) from the image signal D3. The color space processing unit 72 also obtains a Cb component pixel signal and a Cr component pixel signal from the R component pixel signal, the G component pixel signal, and the B component pixel signal, which are included in the image signal D3, and the Y component pixel signal. The color space processing unit 72 outputs, as an image signal D4, an image signal (signal in the YCbCr color space) composed of the obtained Y component pixel signal, the obtained Cb component pixel signal, and the obtained Cr component pixel signal.

Figure 3A:
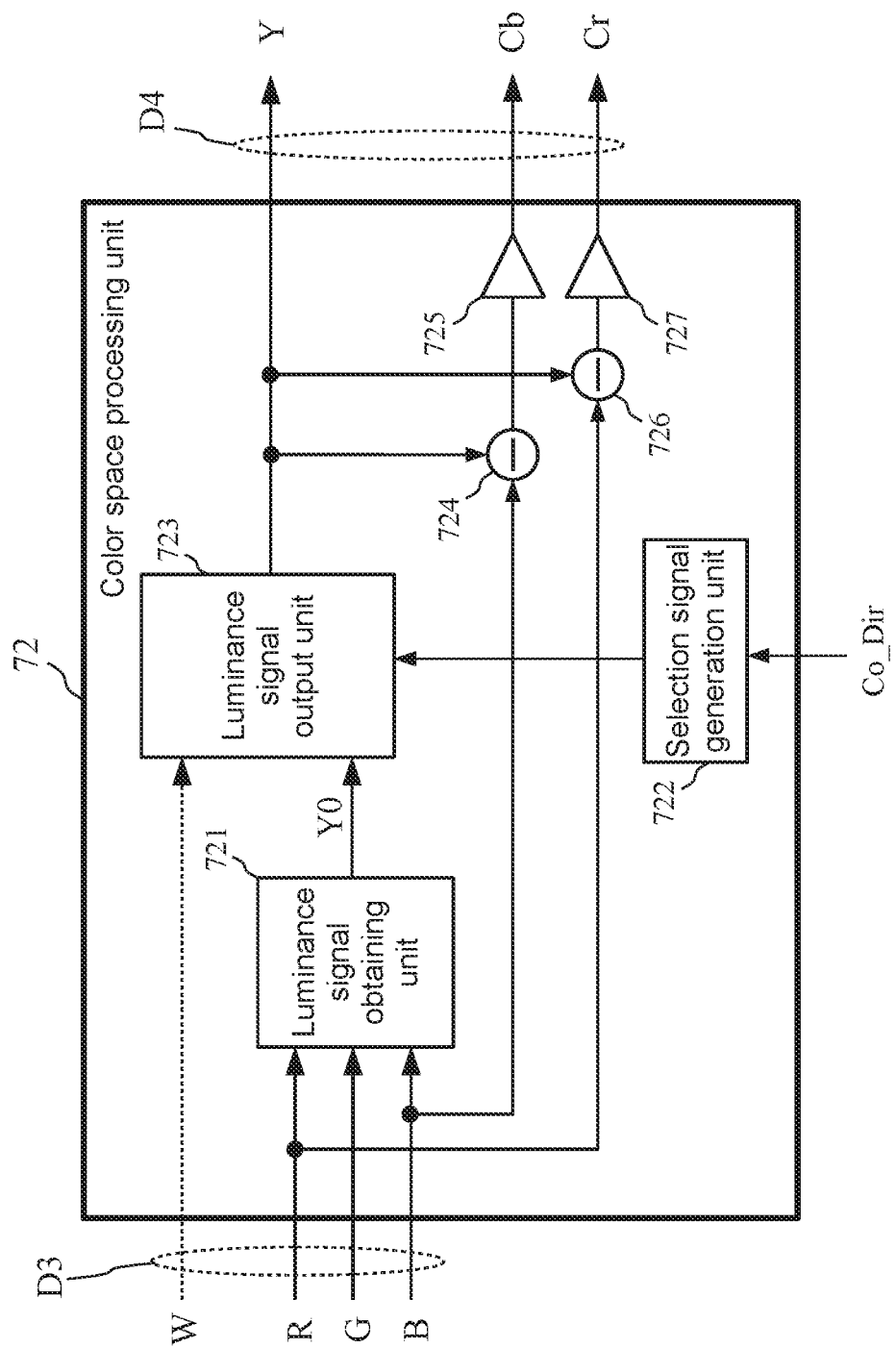
FIG. 3A is a schematic diagram of a color space processing unit 72 according to the first embodiment.

The color space processing unit 72, for example, as shown in FIG. 3A, includes a luminance signal obtaining unit 721, a selection signal generation unit 722, a luminance signal output unit 723, subtracters 724 and 726, and gain adjusters 725 and 727.

The luminance signal obtaining unit 721 receives the R component pixel signal, the G component pixel signal, and the B component pixel signal, which are output from the first matrix transformation unit 71. The luminance signal obtaining unit 721 obtains a luminance component pixel signal Y0 from the input R component pixel signal, the input G component pixel signal, and the input B component pixel signal, and then outputs the obtained signal to the luminance signal output unit 723.

The selection signal generation unit 722 receives information Co_Dir about the correlation direction, for each pixel, output from the pixel interpolation method determination unit 5, and then generates a selection signal based on the information Co_Dir about the correlation direction. The selection signal generation unit 722 then outputs the generated selection signal to the luminance signal output unit 723.

The luminance signal output unit 723 receives the luminance component pixel signals Y0 output from the luminance signal obtaining unit 721, the W component pixel signal W output from the first matrix transformation unit 71, and the selection signal output from the selection signal generation unit 722. The luminance signal output unit 723 generates a luminance component pixel signal Y (Y component pixel signal) from the luminance component pixel signal Y0 and the W component pixel signal W, and outputs the generated signal.

The subtracter 724 receives the luminance signal output from the luminance signal output unit 723 and the B component pixel signal output from the first matrix transformation unit 71, performs subtraction to obtain a B−Y signal (=B-component signal−luminance-component signal Y), and then outputs the obtained B−Y signal to the gain adjuster 725.

The gain adjuster 725 performs adjustment, with a gain, on the B−Y signal output from the subtracter 724 to obtain a Cb component pixel signal, and then outputs the obtained Cb signal.

The subtracter 726 receives the luminance component pixel signal Y (Y-component signal) output from the luminance signal output unit 723 and R-component signal output from the first matrix transformation unit 71, performs subtraction to obtain an R−Y signal (=R component pixel signal−Luminance component pixel signal Yout), and then output the obtained R−Y signal to the gain adjuster 727.

The gain adjuster 727 adjusts, with a gain, the R−Y signal output from the subtracter 726 to obtain a Cr component pixel signal, and outputs the obtained Cr component pixel signal.

In other words, the color space processing unit 72 outputs, as an image signal D4, an image signal (signal in the YCbCr color space) composed of the obtained Y component pixel signal, the obtained Cb component pixel signal, and the obtained Cr component pixel signal. Note that the color space processing unit 72 outputs the Y component pixel signal included in the image signal D4 to the second matrix transformation unit 75 and outputs the Cb component pixel signal and the Cr component pixel signal, which are included in the image signal D4, to the color_difference correction unit 74.

Figure 3B:
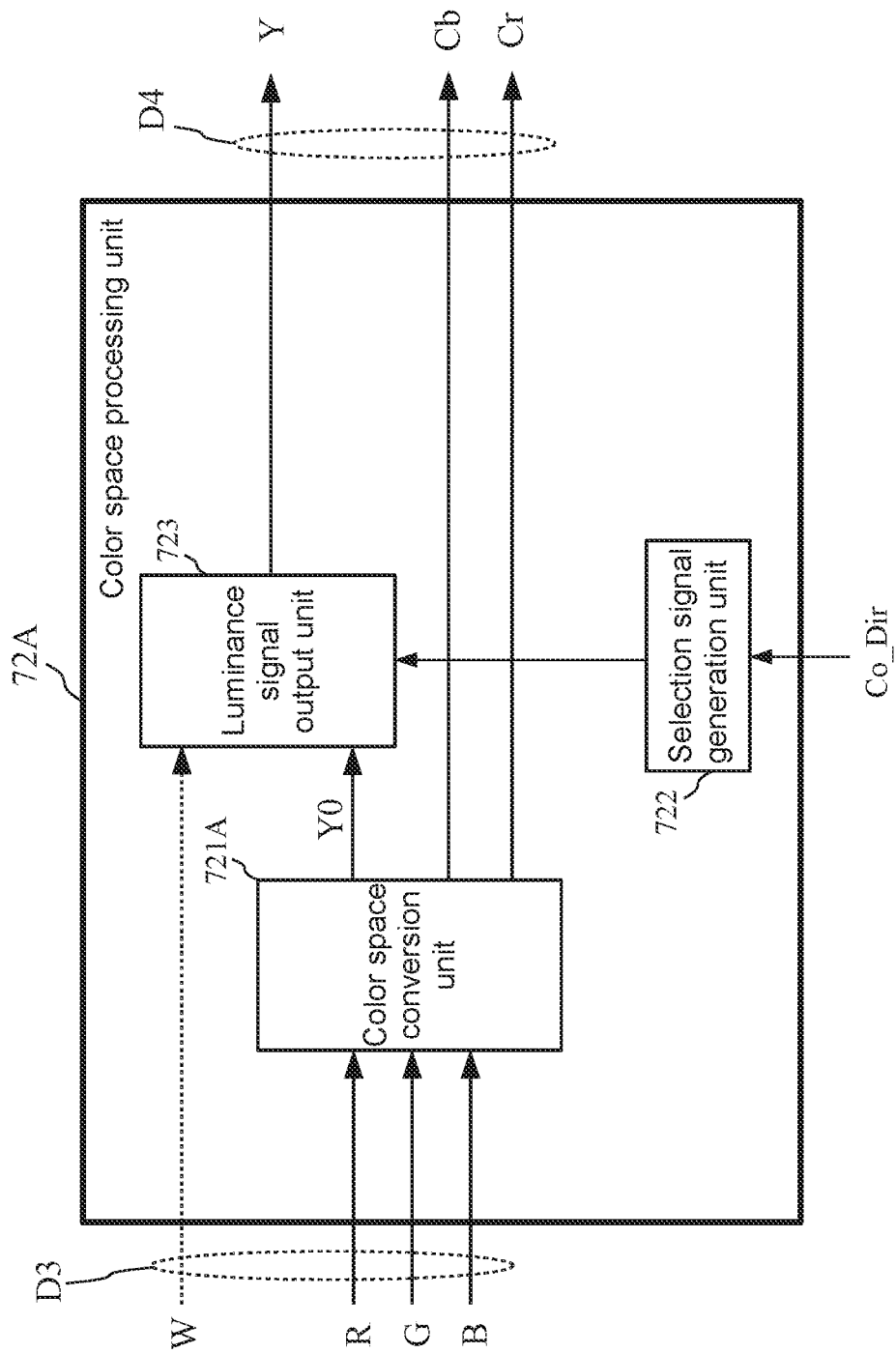
FIG. 3B is a schematic diagram of a color space processing unit 72A according to the first embodiment.

As shown in FIG. 3B, the color space processing unit 72, for example, may include a color space conversion unit 721A, a selection signal generation unit 722, and a luminance signal output unit 723.

The color space conversion unit 721A receives the R, G, and B component pixel signals, which are output from first matrix transformation unit 71. The color space conversion unit 721A performs RGB−YCbCr color space conversion on the R, G, and B component pixel signals, which are input to the color space conversion unit 721A, to obtain a luminance component pixel signal Y0, a Cb component pixel signal, and a Cr component pixel signal. The color space conversion unit 721A then outputs the luminance component pixel signals Y0 to the luminance signal output unit 723, and outputs the Cb component pixel signal and the Cr component pixel signal to the color difference correction unit 74.

The selection signal generation unit 722 and the luminance signal output unit 723 are the same as those described above.

The color space processing unit 72 outputs, as an image signal D4, an image signal (signal in the YCbCr color space) composed of the obtained Y component pixel signals, the obtained Cb component pixel signal and the obtained Cr component pixel signal. Note that the color space processing unit 72 outputs the Y component pixel signal included in the image signal D4 to the second matrix transformation unit 75, and outputs the Cb component pixel signal and the Cr component pixel signal to the color difference correction unit 74.

The saturation obtaining unit 73 receives the R component pixel signal, G component pixel signal and B component pixel signal, which are included in the image signal D3 output from the first matrix transformation unit 71. The saturation obtaining unit 73 obtains a saturation value S from the R-component pixel signal, the G-component pixel signal and the B-component pixel signal. The saturation obtaining unit 73 then outputs the obtained saturation value S (saturation signal S) to the color difference correction unit 74. The color difference correction unit 74 receives the Cb component pixel signal and the Cr component pixel signal, which are output from the color space processing unit 72, and the saturation value S (saturation signal S) output from the saturation obtaining unit 73. The color difference correction unit 74, based on the saturation value S, performs color difference correction processing on the Cb component pixel signal and the Cr component pixel signal output from the color space processing unit 72, and then outputs the Cb component pixel signal and the Cr component pixel signal after the color difference correction processing to the second matrix transformation unit 75.

The second matrix transformation unit 75 receives the Y component pixel signal output from the color space processing unit 72 and the Cb component pixel signal and the Cr component pixel signal after the color difference correction processing, which are output from the color difference correction unit 74. The second matrix transformation unit 75 performs conversion of the YCbCr color space to the RGB color space on the input image signal to obtain an R component pixel signal, a G component pixel signal and B component pixel signal. The second matrix transformation unit 75 outputs, as an image signal Dout, the obtained R component pixel signal, the obtained G component pixel signal and the obtained B component pixel signal.

1.2 Operation of Imaging Apparatus

The imaging apparatus 1000 with the above structure will now be described.

Figure 4:
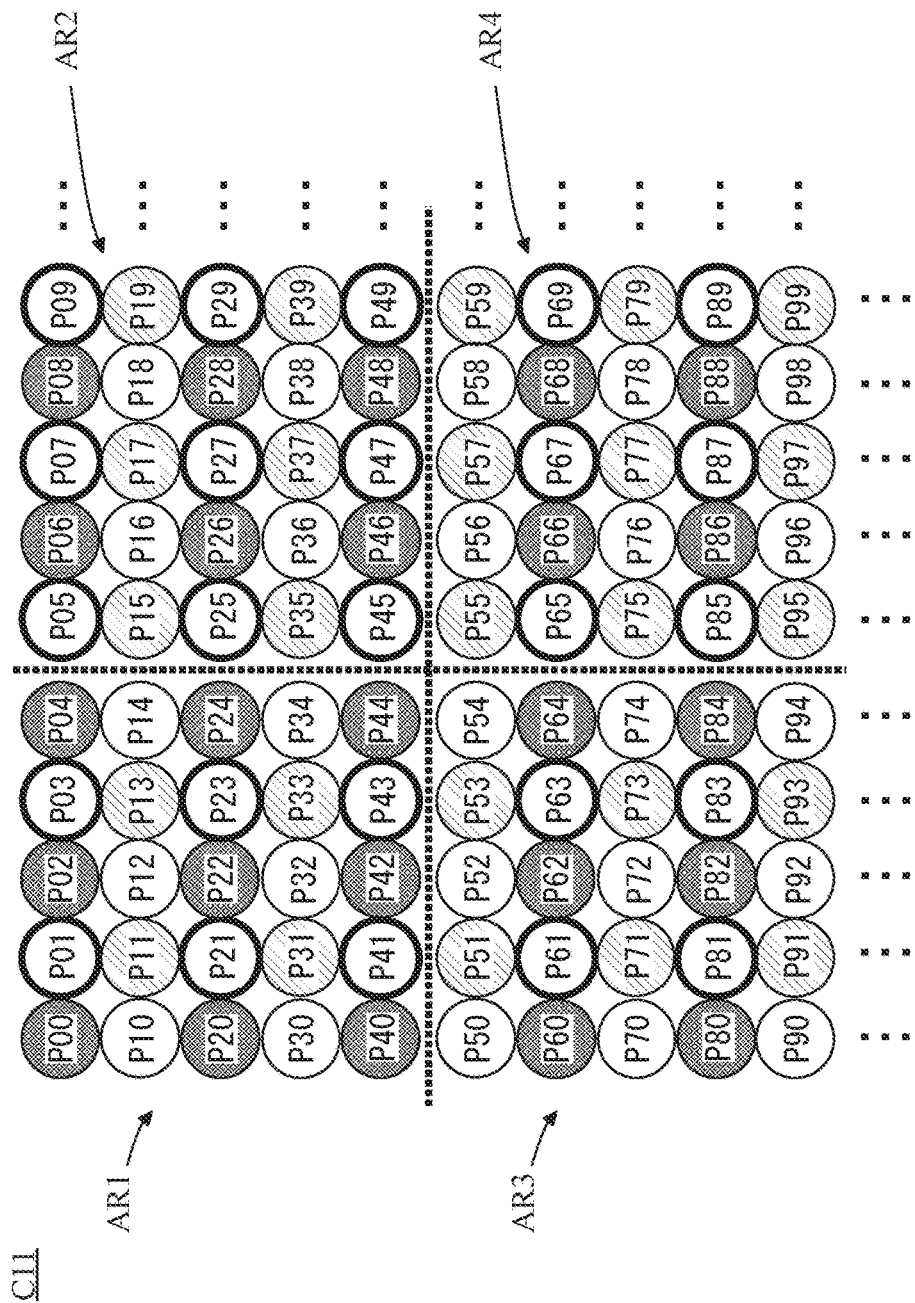
FIG. 4 is a diagram showing an example of the array pattern formed by a first color component filter, a second color component filter, a third color component filter and a fourth color component filter in a four-color array filter disposed in an imaging unit C1.

FIG. 4 shows an example of an array pattern of first color component filters, second color component filters, third color component filters and fourth color component filters. As shown in FIG. 4, the four-color array filter includes one row in which first color component filters and second color component filters are arranged alternately in the order of the first color component filter, the second color component filter, the first color component filter, the second color component filter, . . . , and the next row in which the third color component filters and the fourth color component filters (or no filters) are arranged alternately in the order of the third color component filter, the fourth color component filter, the third color component filter, the fourth color component filter, . . . .

Notation for Pixels in Four-Color Pixel Array

The notation for pixels in the four-color pixel array will now be described. The upper left area AR1 in FIG. 4 shows a matrix area of 5×5 pixels. In the upper left area AR1 in FIG. 4, P represents a pixel without showing its color component (This is applied to the areas AR2 to AR4 in FIG. 4). Conversely, in distinguishing color components of pixels, each pixel is labeled with its color component by describing an alphabet representing its color in a circle corresponding to the pixel. For example, in a Ye(Yellow)-Cy(Cyan)-G(Green)-Mg(Magenta) pixel array, which is a four-color pixel array, a yellow component pixel is denoted with a letter "Y" and a two-digit number; a cyan component pixel is denoted with a letter "C" and a two-digit number; a green component pixel is denoted with a letter "G" and a two-digit number; and a magenta component pixel is denoted with a letter "M" and a two-digit number. The symbols P, Y, C, G, and M are numbered with their first digit indicating the row number of the pixel in the matrix area, and their second digit indicating the column number of the pixel in the matrix area. The other figures also show the pixel arrays in the same manner as described above. The symbols P, Y, C, G, and M in the embodiment and in the formulae therein may each represent the pixel value. For example, P11 represents the pixel at the first row and the first column, and also indicates the pixel value of the pixel at the first row and the first column.

Light from a subject is collected by the optical system (not shown) included in the imaging unit C1, and then enters the image sensor (not shown) included in the imaging unit C1 through the Ye-Cy-G-Mg color array filter C11 arranged on the imaging surface. Hereafter, the Ye-Cy-G-Mg color array filter C11 has the array pattern shown in FIG. 4.

The image sensor in the imaging unit C1 converts the entering subject light for each pixel into an electrical signal (pixel signal) through photoelectric conversion. More specifically, the image sensor obtains a Ye-component pixel value at a Ye-component pixel, an Cy-component pixel value at an Cy-component pixel, a G-component pixel value at a G-component pixel, and a Mg-component pixel value at a Mg-component pixel. The image signal obtained through the above processing (image signal in which each pixel included in an image formed by the image signal has one of the Ye-component pixel value, the Cy-component pixel value, the G-component pixel value, and the Mg-component pixel value) is output from the imaging unit C1 to the signal processing unit C2.

The signal processing unit C2 subjects the image signal obtained by the imaging unit C1 to predetermined signal processing (e.g., gain adjustment, white balance adjustment, and gamma correction). The image signal (image signal D_raw) resulting from the predetermined signal processing is output to the signal correction unit 1, the color correlation value calculation unit 2, and the interpolation unit 6, which are included in the pixel interpolation processing unit 100.

1.2.1 Signal Correction Processing

The signal correction unit 1 subjects the input image signal D_raw to correction of signal levels in accordance with types of color filters for each color component pixel signal. More specifically, the signal correction unit performs processing corresponding to formulas below:

$Yeout = Yein \times Gain\_sig\_Ye$ $Cyout = Cyin \times Gain\_sig\_Cy$ $Gout = Gin \times Gain\_sig\_G$ $Mgout = Mgin \times Gain\_sig\_Mg$ where Yein is a Ye-component pixel signal, Cyin is a Cy-component pixel signal, Gin is a G-component pixel signal, Mgin is a Mg-component pixel signal, Gain_sig_Ye is a gain of correction for the Ye-color filter, Gain_sig_Cy is a gain of correction for the Cy-color filter, Gain_sig_G is a gain of correction for the G-color filter, and Gain_sig_Mg is a gain of correction for the Mg-color filter.

Note that each gain of correction for a color (In the above case, Gain_sig_Ye, Gain_sig_Cy, Gain_sig_G, and Gain_sig_Mg) is a gain in accordance with types of color filters disposed in the imaging unit C1. For example, if achromatic light, which corresponds to W100%, is received by the image sensor of the imaging unit C1, the achromatic light corresponding to W100% may not be converted to an electrical signal (pixel signal) with the same level by traveling through a different type of color filter. This is caused by the fact that the degree of energy loss and the sensitivity of the image sensor to light containing a large quantity of a specific color component vary depending on types of color filters. To reduce the difference in signal levels after photoelectric conversion, which is caused when such light passes through a color filter, a gain for each color filter (in the above case, Gain_sig_Ye, Gain_sig_Cy, Gain_sig_G, and Gain_sig_Mg) is set.

In other words, the above-described signal correction processing enables the difference in signal levels after photoelectric conversion, which is caused when light passes through a color filter, to be reduced, thus allowing each pixel signal after the signal correction processing to be a signal with an appropriate luminance information. Thus, using each pixel signal after the signal correction processing enables the interpolation for a grayscale image, calculation of a saturation evaluation value and calculation of a saturation evaluation value to be performed with higher accuracy.

As described above, through the above processing, the signal correction unit 1 obtains the image signal D1 composed of the Ye-component pixel signal Yeout after the signal correction processing, the Cy-component pixel signal Cyout after the signal correction processing, the G-component pixel signal Gout after the signal correction processing, and the Mg-component pixel signal Mgout after the signal correction processing.

The image signal D1 obtained by the signal correction unit 1 is output to the grayscale image interpolation unit 62 of the interpolation unit 6, the saturation evaluation value calculation unit 3, and the grayscale correlation value calculation unit 4.

The saturation evaluation value calculation unit 3 calculates a saturation evaluation value for each pixel based on the image signal D_raw (image D_raw) output from the signal correction processing unit 1, and normalizes the saturation evaluation value L using a predetermined function to obtain a saturation evaluation coefficient KL (0≤KL≤1). This process will now be described in detail below.

1.2.2 Calculating Saturation Evaluation Value

The saturation evaluation value calculation unit 3 sets an image area of 5×5 pixels including a target pixel as the center (hereafter referred to as a matrix area) in the input image D1. The saturation evaluation value calculation unit 3 analyzes the distribution of color components in the set matrix area to calculate the saturation evaluation value for the matrix area (the saturation evaluation value for the target pixel).

More specifically, the saturation evaluation value calculation unit 3 calculates six evaluation values (1) to (6) below for the matrix area including the target pixel, and sets the smallest one of the six evaluation values as the saturation evaluation value L.

(1) an average color component difference evaluation value diff_ave_color (2) an overall evaluation value g1_color (3) a vertical direction evaluation value v_color (4) a horizontal direction evaluation value h_color (5) a first diagonal direction evaluation value d1_color
(6) a second diagonal direction evaluation value d2_color The process for calculating the evaluation values (1) to (6) will be described below.

(1) Average Color-Component Difference Evaluation Value diff_Ave_Color

The process for calculating the average color component difference evaluation value diff_ave_color will now be described with reference to FIG. 4.

The saturation evaluation value calculation unit 3 classifies the matrix area into four patterns. More specifically, the saturation evaluation value calculation unit 3 classifies the matrix area into the four patterns: a matrix area in which the central pixel is a first color component pixel, a matrix area in which the central pixel is a second component pixel, a matrix area in which the central pixel is a third component pixel, and a matrix area in which the central pixel is a fourth component pixel.

In FIG. 4, the areas AR1 to AR4, each of which is an area of 5×5 pixels, are classified as below when the pixel P00 is a first color component pixel, the pixel P01 is a second color component pixel, the pixel P10 is a third color component pixel, and the pixel P11 is a fourth color component pixel.
(A) The matrix area AR1 of 5 pixels×5 pixels in FIG. 4 is classified as a matrix area in which the central pixel is a first color component pixel (pixel P22 whose color is identical to that of the pixel P00).
(B) The matrix area AR2 of 5 pixels×5 pixels in FIG. 4 is classified as a matrix area in which the central pixel is a second color component pixel (pixel P27 whose color is identical to that of the pixel P01).
(C) The matrix area AR3 of 5 pixels×5 pixels in FIG. 4 is classified as a matrix area in which the central pixel is a third color component pixel (pixel P72 whose color is identical to that of the pixel P10).
(D) The matrix area AR4 of 5×5 pixels in FIG. 4 is classified as a matrix area in which the central pixel is a fourth color component pixel (pixel P77 whose color is identical to that of the pixel P11).

The saturation evaluation value calculation unit 3 subjects the above-classified matrix area of 5×5 pixels to the following processing, thereby calculating an average value p00_color1 of the first color component pixels, an average value p01_color2 of the second color component pixels, an average value p10_color3 of the third color component pixels, and an average value p11_color1 of the fourth color component pixels.

(A) when the Central Pixel of the Area of 5×5 Pixels is a First Color Component Pixel $$p00\_color1 = P22$$

$$p01\_color2 = (P21+P23)/2$$

$$p10\_color3 = (P12+P32)/2$$

$$p11\_color4 = (P11+P13+P31+P33)/4$$

(B) When the central pixel of the area of 5×5 pixels is a second color component pixel $$p00\_color1 = (P21+P23)/2$$

$$p01\_color2 = P22$$

$$p10\_color3 = (P11+P13+P31+P33)/4$$

$$p11\_color4 = (P12+P32)/2$$

(C) When the central pixel of the area of 5×5 pixels is a third color component pixel $$p00\_color1 = (P12+P32)/2$$

$$p01\_color2 = (P11+P13+P31+P33)/4$$

$$p10\_color3 = P22$$

$$p11\_color4 = (P21+P23)/2$$

(D) When the central pixel of the area of 5×5 pixels is a fourth color component pixel $$p00\_color1 = (P11+P13+P31+P33)/4$$

$$p01\_color2 = (P12+P32)/2$$

$$p10\_color3 = (P21+P23)/2$$

$$p11\_color4 = P22$$

The saturation evaluation value calculation unit 3 then performs processing corresponding to the below formula to obtain two color component difference values color_diff0 and color_diff1.

Formula 2

$$\begin{pmatrix} \text{color\_diff0} \\ \text{color\_diff1} \end{pmatrix} = \begin{pmatrix} k01 & k02 & k03 & k04 \\ k11 & k12 & k13 & k14 \end{pmatrix} \begin{pmatrix} p00\_color1 \\ p01\_color2 \\ p10\_color3 \\ p11\_color4 \end{pmatrix} + \begin{pmatrix} offset0 \\ offset1 \end{pmatrix} \quad (2)$$

Note that the coefficients k01, k02, k03, k04, k11, k12, k13, and, k14 in the above formula are set so as to be adjusted in accordance with a color component difference value to be obtained. The variables offset0 and offset1 are numerical values for setting an offset (offset value).

The saturation evaluation value calculation unit 3 sets the above coefficients k01 to k04, and k11 to k14 based on the color of the color filter and the difference component to be obtained, and performs the above-described processing corresponding to color space conversion (color component difference obtaining processing), thereby obtaining a desired color_difference value.

For example, when a four-color filter is a WRGB array color filter, the first color pixel is a pixel for the G component, the second color pixel is a pixel for the R component, the third color pixel is a pixel for the B component, and the fourth color pixel is a pixel for the W component, the coefficients are set as follows:

$$k01 = 1$$

$$k02 = -1$$

$$k03 = 0$$

$$k04 = 0$$

$$k11 = 1$$

$$k12 = 0$$

$$k13 = -1$$

$$k14 = 0$$

$$offset0 = offset1 = 0.$$

The processing corresponding to the above formula with the above coefficients is written as follows:

color_diff0=$p00\_color1-p01\_color2$ color_diff1=$p00\_color1-p10\_color3$.

In this case, the saturation evaluation value calculation unit 3 performs the above processing to obtain the G–R component color_diff0 and the G–B component color_diff1.

Using the color component difference values through the above processing, the saturation evaluation value calculation unit 3 performs processing corresponding to the below formulas to calculate an average color component difference evaluation value diff_ave_color.

diff_ave_color=abs(color_diff0)+abs(color_diff1)

abs(x): a function that returns the absolute value of x.

(2) Overall Evaluation Value g1_Color

The process for calculating the overall evaluation value g1_color will now be described.

The saturation evaluation value calculation unit 3 calculates the overall evaluation value g1_color through the processing corresponding to the formula below for an area including the central pixel of any color component (or for any color filter arranged on the central pixel).

g1_color=(abs($P11-P22$)+abs($P12-P22$)+abs($P13-P22$)+abs($P21-P22$)+abs($P23-P22$)+abs($P31-P22$)+abs($P32-P22$)+abs($P33-P22$))/8

(3) Vertical Direction Evaluation Value v_Color

Figure 5:
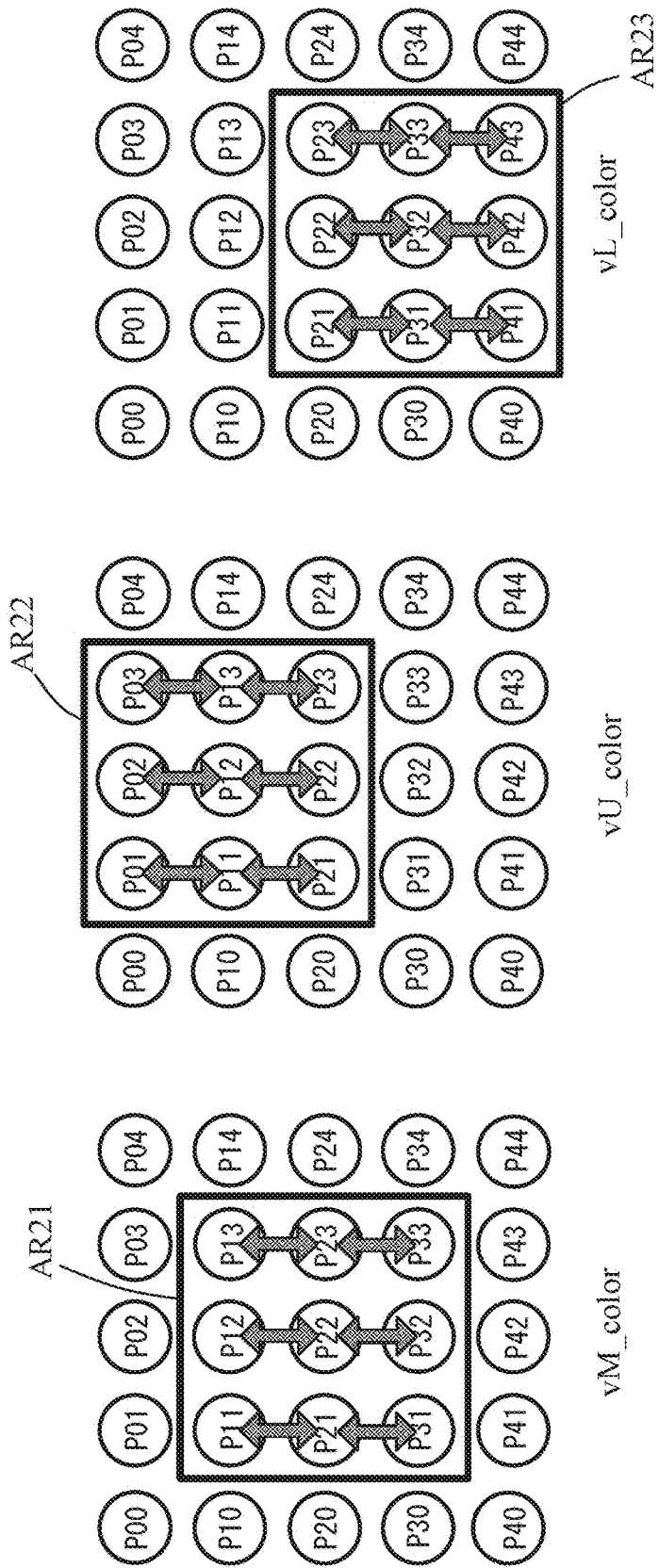
FIGS. 5A to 5C are diagrams describing a process for obtaining an evaluation value in a vertical direction.

The process for calculating the vertical direction evaluation value v_color with reference to FIGS. 5A to 5C.

As shown in FIG. 5A, the saturation evaluation value calculation unit 3 calculates a first vertical direction evaluation value vM_color in an area AR21 of 3×3 pixels including a pixel P22 as the central pixel through the processing corresponding to the formula below.

vM_color=(abs($P11-P21$)+abs($P21-P31$)+(abs($P12-P22$)+abs($P22-P32$))×2+abs($P13-P23$)+abs($P23-P33$))/8

The above formula includes a term multiplied by a coefficient of 2 to smooth the cumulative ratio of differences between pixels. The four pixels P11, P31, P13, and P33 are pixels with the first color component. The two pixels P21 and P23 are pixels with the second color component. The two pixels P12 and P32 are pixels with the third color component. The pixel P22 alone is a pixel with the fourth color component. The term (the first color component pixel–the second color component pixel) includes four operations. The term (the third color component pixel–the fourth color component pixel) includes two operations. Thus, the term (abs(P12–P22)+abs(P22–P32)) is multiplied by 2. The coefficient used for the multiplication should not be limited to 2, and may be another value.

As shown in FIG. 5B, the saturation evaluation value calculation unit 3 calculates a second vertical direction evaluation value vU_color in an area AR22 of 3×3 pixels including a pixel P12 as the central pixel through the processing corresponding to the formula below.

vU_color=(abs($P01-P11$)+abs($P11-P21$)+(abs($P02-P12$)+abs($P12-P22$))×2+abs($P03-P13$)+abs($P13-P23$))/8

The above formula includes a term multiplied by a coefficient of 2 for the same reason as described for the processing for calculating the first vertical direction evaluation value vM_color.

As shown in FIG. 5C, the saturation evaluation value calculation unit 3 calculates a third vertical direction evaluation value vL_color in an area AR23 of 3×3 pixels including a pixel P32 as the central pixel through the processing corresponding to the formula below.

vL_color=(abs($P21-P31$)+abs($P31-P41$)+(abs($P22-P32$)+abs($P32-P42$))×2+abs($P23-P33$)+abs($P33-P43$))/8

The above formula includes a term multiplied by a coefficient of 2 for the same reason as described for the processing for calculating the first vertical direction evaluation value vM_color.

The saturation evaluation value calculation unit 3 calculates a vertical direction evaluation value v_color by subjecting the first to third vertical direction evaluation values obtained through the above processing to the processing corresponding to the formula below.

v_color=min(vM_color,vU_color,vL_color)

In this formula, min( ) is a function that returns a minimum value of the elements.

(4) Horizontal Direction Evaluation Value h_Color

The process for calculating the horizontal direction evaluation value h_color will now be described with reference to FIGS. 6A to 6C.

Figure 6:
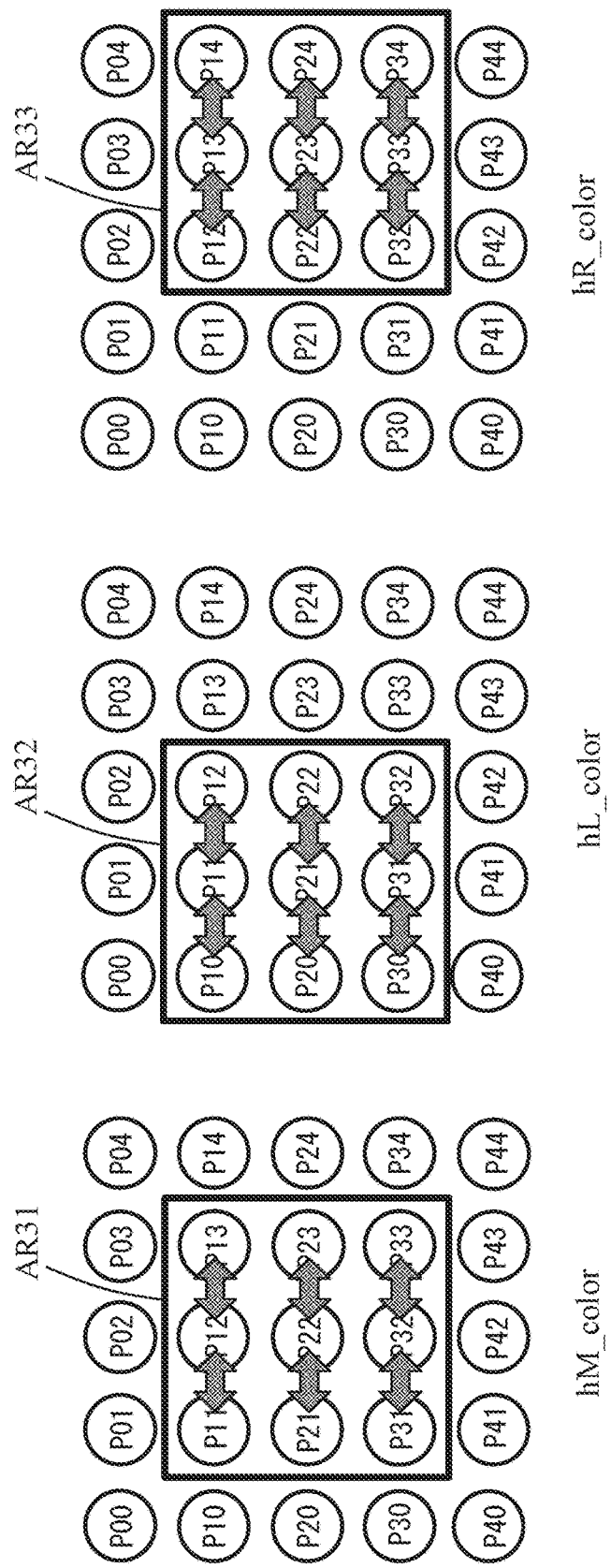
FIGS. 6A to 6C are diagrams describing a process for obtaining an evaluation value in a horizontal direction.

As shown in FIG. 6A, the saturation evaluation value calculation unit 3 calculates a first horizontal direction evaluation value hM_color in an area AR31 of 3×3 pixels including a pixel P22 as the central pixel through the processing corresponding to the formula below.

hM_color=(abs($P11-P12$)+abs($P12-P13$)+(abs($P21-P22$)+abs($P22-P23$))×2+abs($P31-P32$)+abs($P32-P33$))/8

The above formula includes a term multiplied by a coefficient of 2 to smooth the cumulative ratio of differences between pixels. The four pixels P11, P31, P13, and P33 are pixels with the first color component. The two pixels P21 and P23 are pixels with the second color component. The two pixels P12 and P32 are pixels with the third color component. The pixel P22 alone is a pixel with the fourth color component.

The term (the first color component pixel–the third color component pixel) includes four operations. The term (the second color component pixel–the fourth color component pixel) includes two operations. Thus, the term (abs(P21–P22)+abs(P22–P23)) is multiplied by 2. The coefficient used for the multiplication should not be limited to 2, and may be another value.

As shown in FIG. 6B, the saturation evaluation value calculation unit 3 calculates a second horizontal direction evaluation value hL_color in an area AR32 of 3×3 pixels including a pixel P21 as the central pixel through the processing corresponding to the formula below.

hL_color=(abs($P10-P11$)+abs($P11-P12$)+(abs($P20-P21$)+abs($P21-P22$))×2+abs($P30-P31$)+abs($P31-P32$))/8

The above formula includes a term multiplied by a coefficient of 2 for the same reason as described for the processing for calculating the first horizontal direction evaluation value hM_color.

As shown in FIG. 6C, the saturation evaluation value calculation unit 3 calculates a third horizontal direction evaluation value hR_color in an area AR33 of 3×3 pixels including a pixel P23 as the central pixel through the processing corresponding to the formula below.

$$hR\_color=(abs(P12-P13)+abs(P13-P14)+(abs(P22-P23)+abs(P23-P24))\times 2+abs(P32-P33)+abs(P33-P34))/8$$

The above formula includes a term multiplied by a coefficient of 2 for the same reason as described for the processing for calculating the first horizontal direction evaluation value hM_color.

The saturation evaluation value calculation unit 3 calculates a horizontal evaluation value h_color by subjecting the first to third horizontal direction evaluation values obtained through the above processing corresponding to the formula below.

$$h\_color=min(hM\_color,hL\_color,hR\_color)$$

In this formula, min( ) is a function that returns a minimum value of the elements.

(5) First Diagonal Direction Evaluation Value d1_Color

The process for calculating the first diagonal direction evaluation value d1_color will now be described with reference to FIG. 7.

Figure 7:
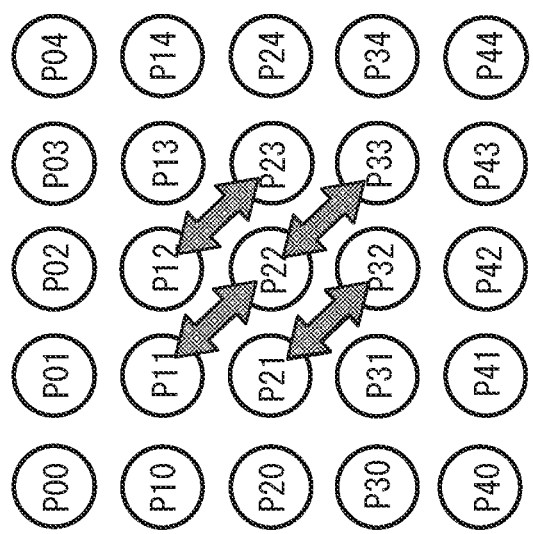
FIG. 7 is a diagram describing a process for obtaining an evaluation value in a first diagonal direction.

As shown in FIG. 7, the saturation evaluation value calculation unit 3 calculates the first diagonal direction evaluation value d1_color through the processing corresponding to the formula below in an area consisting of seven pixels P11, P12, P21, P22, P23, P32, and P33 surrounding a central pixel P22.

$$d1\_color=(abs(P12-P23)+abs(P11-P22)+abs(P22-P33)+abs(P21-P32))/4$$

(6) Second Diagonal Direction Evaluation Value d2_Color

The process for calculating the second diagonal direction evaluation value d2_color will now be described with reference to FIG. 8.

Figure 8:
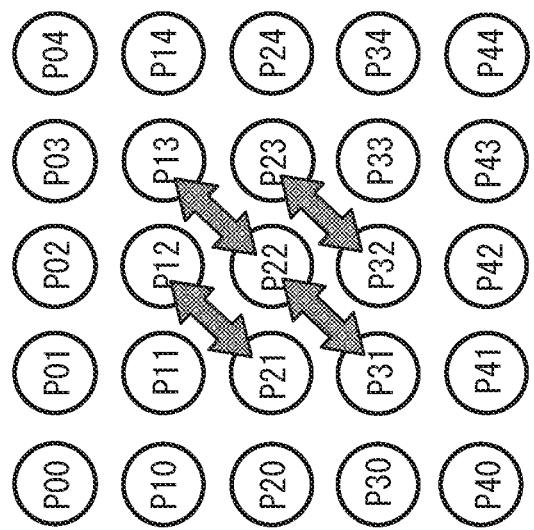
FIG. 8 is a diagram describing a process for obtaining an evaluation value in a second diagonal direction.

As shown in FIG. 8, the saturation evaluation value calculation unit 3 calculates the second diagonal direction evaluation value d2_color through the processing corresponding to the formula below in an area consisting of seven pixels P12, P13, P21, P22, P23, P31, and P32 surrounding a central pixel P22.

$$d2\_color=(abs(P12-P21)+abs(P13-P22)+abs(P22-P31)+abs(P23-P32))/4$$

After the processing described above, the saturation evaluation value calculation unit 3 calculates a saturation evaluation value L through the processing corresponding to the formula below.

$$L=min(diff\_ave\_color,g1\_color,v\_color,h\_color,d1\_color,d2\_color)$$

In this formula, min( ) is a function that returns a minimum value of the elements.

The saturation evaluation value calculation unit 3 uses, as the saturation evaluation value L, the smallest one of the six evaluation values: (1) the average color component difference evaluation value diff_ave_color, (2) the overall evaluation value g1_color, (3) the vertical direction evaluation value v_color, (4) the horizontal direction evaluation value h_color, (5) the first diagonal direction evaluation value d1_color, and (6) the second diagonal direction evaluation value d2_color.

Figure 9:
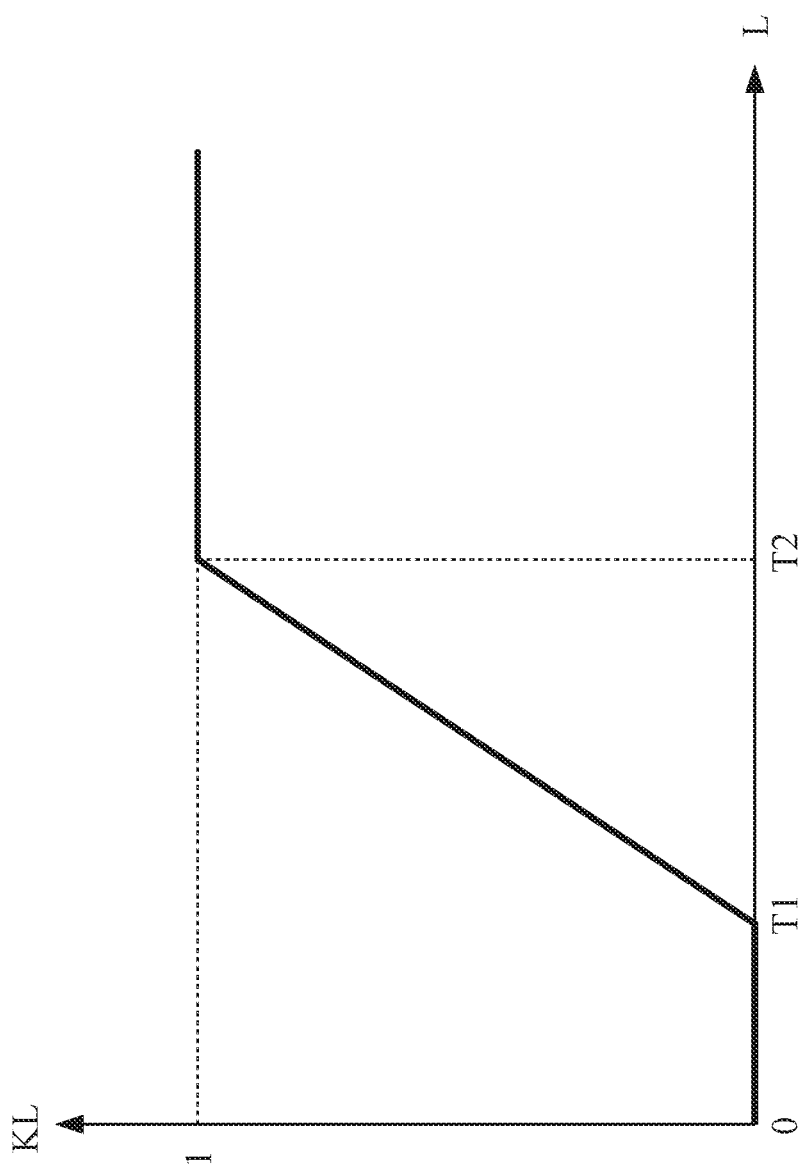
FIG. 9 is a diagram showing the relationship between a saturation evaluation value L and a saturation evaluation coefficient KL.

The saturation evaluation value calculation unit 3 calculates a saturation evaluation coefficient KL by normalizing the saturation evaluation value L for the target pixel obtained through the above processing. FIG. 9 is a diagram showing the input and output characteristics of an example function to calculate the saturation evaluation coefficient KL by normalizing the saturation evaluation value L for the target pixel. The saturation evaluation value calculation unit 3 calculates the saturation evaluation coefficient KL using, for example, two thresholds T1 and T2 through the processing corresponding to the formula below.

$$KL=f(L)$$

The function f(x) is set in the manner below.

When $x \leq T1, f(x)=0$.

When $T1 \leq x \leq T2, f(x)=(x-T1)/(T2-T1)$.

When $x \geq T2, f(x)=1$.

The function f(x) should not be limited to the above function, but may be another function that converts the saturation evaluation value L into a value in a range of 0 to 1 (e.g., a function to cause the saturation evaluation coefficient to substantially increase monotonically with respect to the saturation evaluation value L).

The above processing converts the saturation evaluation value L to the saturation evaluation coefficient KL satisfying $0 \leq KL \leq 1$.

The two thresholds T1 and T2 are set as values around the border between a grayscale image area (an image area with low saturation) and a color image area (an image area with high saturation). Although the thresholds T1 and T2 can be set to optimum values based on experimental results or experience, it is preferred that the thresholds are variable parameters determined in accordance with the characteristics of an input image. The characteristics of the input image are determined by the imaging conditions of the imaging apparatus 1000 including the exposure time and the aperture value. The characteristics of the input image may include the characteristics of the image sensors (the CCD image sensor or the CMOS image sensor) or the optical characteristics of the lens.

The saturation evaluation coefficient KL calculated by the saturation evaluation value calculation unit 3 as described above is output to the pixel interpolation method determination unit 5.

1.2.3 Calculating Color Correlation Value

The process for calculating the color correlation values will now be described.

The color correlation value calculation unit 2 calculates correlation values intended for a color image area (correlation values for an image area with high saturation) for each pixel based on the image signal D_raw (image D_raw) output from the signal processing unit C2. The processing will be described below.

For a target pixel in an image D_raw (processing target pixel) output from the signal processing unit C2, the color correlation value calculation unit 2 calculates the four correlation values intended for a color image area described below.

(A1) a vertical direction correlation value Cv_color for a color image area (A2) a horizontal direction correlation value Ch_color for a color image area (A3) a first diagonal direction correlation value Cd1_color for a color image area (A4) a second diagonal direction correlation value Cd2_color for a color image area The process for calculating the correlation values (A1) to (A4) for a color image area will now be described.

(A1) Vertical Direction Correlation Value Cv_Color for Color Image Area

First, the process for calculating the vertical direction correlation value Cv_color for a color image area will now be described with reference to FIG. 10.

Figure 10:
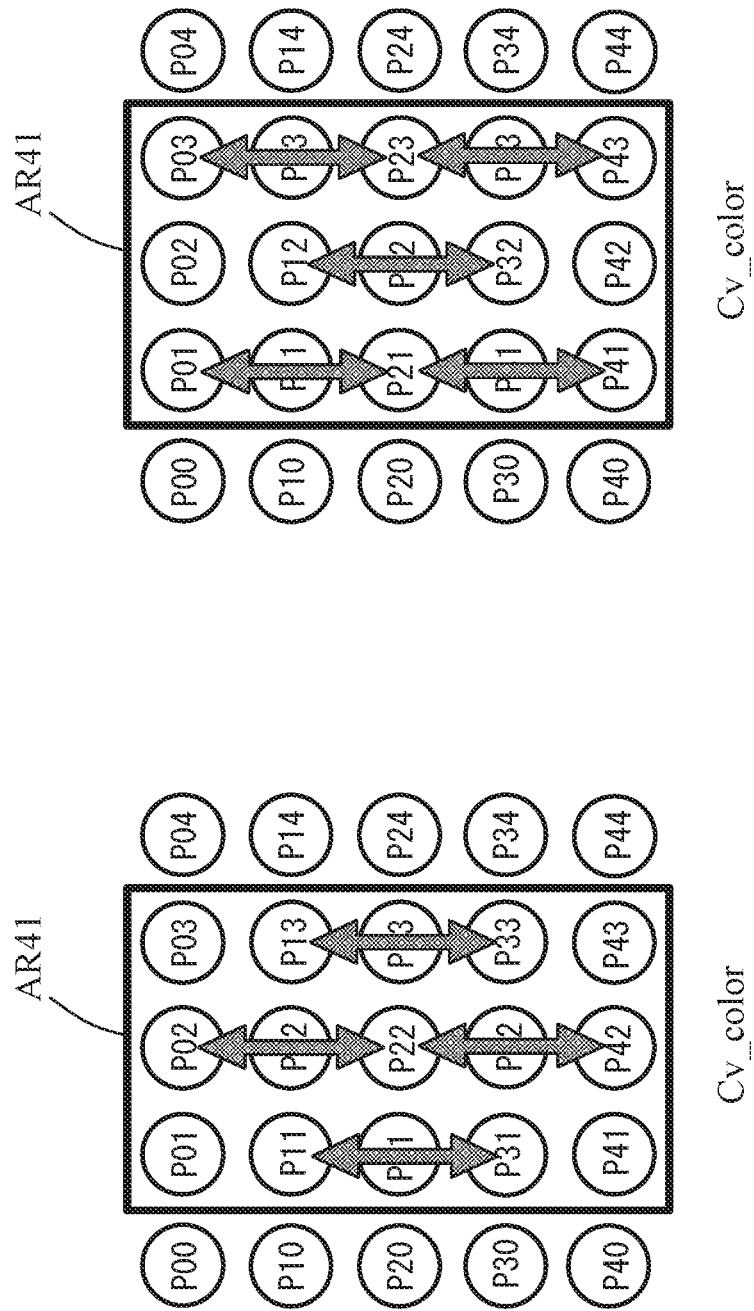
FIG. 10 is a diagram describing a process for calculating a vertical direction correlation value Cv_color intended for a color image area.

FIG. 10 is a diagram describing the process for calculating the vertical direction correlation value Cv_color for a color image area. FIG. 10 shows a matrix area of 5×5 pixels including a central pixel P22 as the center. In the figure, two pixels pointed by each of the two-headed arrows are pixels to be used for subtraction.

As shown in FIG. 10, the color correlation value calculation unit 2 calculates a difference in absolute value between the pixel values of vertically adjacent pixels with the same color included in an area AR41 consisting of pixels P01 to P03, P11 to P13, P21 to P23, P31 to P33, and P41 to P43. The color correlation value calculation unit 2 calculates the average (weighted average) of the calculated absolute value differences. More specifically, the color correlation value calculation unit 2 calculates the vertical direction correlation value Cv_color for a color image area through the processing corresponding to the formulae below.

sum=abs(P02−P22)+abs(P22−P42)+abs(P11−P31)+
abs(P13−P33)+abs(P12−P32)×2+(abs(P01−
P21)+abs(P21−P41)+abs(P03−P23)+abs(P23−
P43))/2

Cv_color=sum/8

In the above formula, abs(P12−P32) is multiplied by a coefficient of 2, and (abs(P01−P21)+abs(P21−P41)+abs(P03−P23)+abs(P23−P43)) is multiplied by a coefficient of ½. This multiplication is for weighting in accordance with the distance from the central pixel (the distance on the image). The coefficient for the multiplication (weighting coefficient) should not be limited to the above value, but may be another value.

(A2) Horizontal Direction Correlation Value Ch_Color for Color Image Area

The process for calculating the horizontal direction correlation value Ch_color for a color image area will now be described with reference to FIG. 11.

Figure 11:
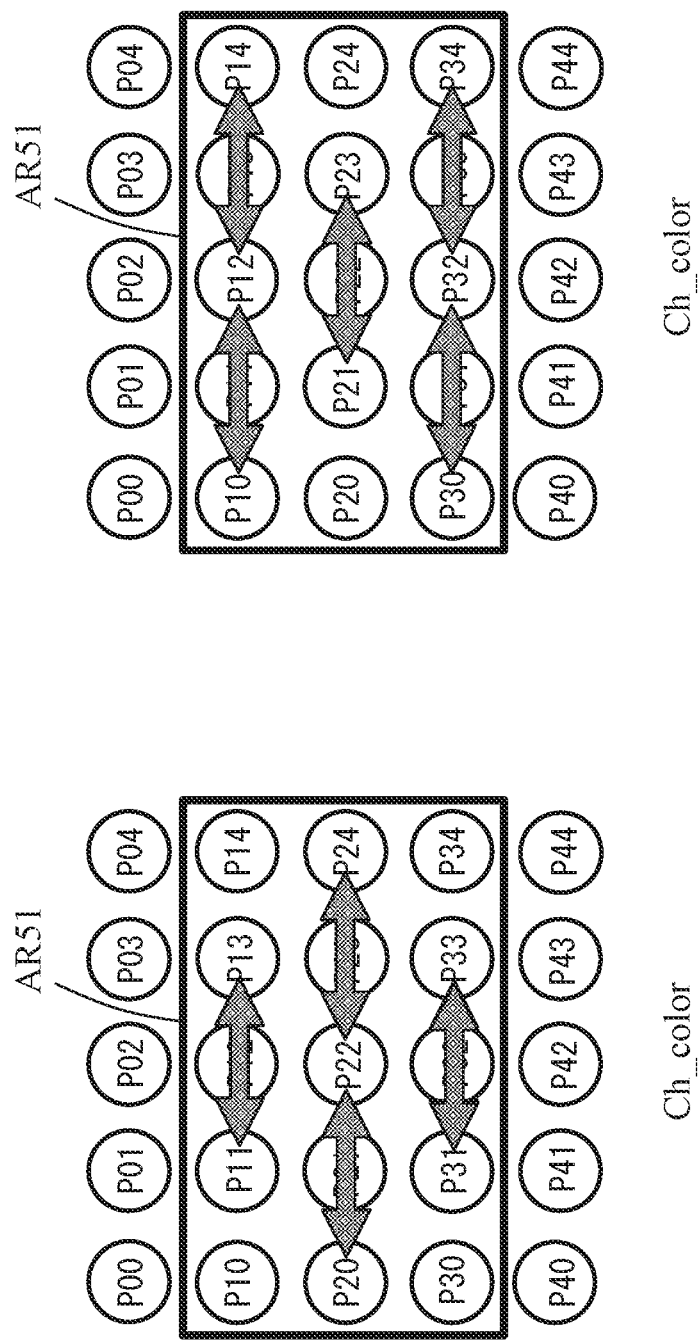
FIG. 11 is a diagram describing a process for calculating a horizontal direction correlation value Ch_color intended for a color image area and a process for obtaining an evaluation value in the horizontal direction.

FIG. 11 is a diagram describing the process for calculating the horizontal direction correlation value Ch_color for a color image area. FIG. 11 shows a matrix area of 5×5 pixels including a central pixel P22 as the center. In the figure, two pixels pointed by each of the two-headed arrows are pixels to be used for subtraction.

As shown in FIG. 11, the color correlation value calculation unit 2 calculates a difference in absolute value between the pixel values of horizontally adjacent pixels with the same color included in an area AR51 consisting of pixels P10 to P14, P20 to P24, and P30 to P34. The color correlation value calculation unit 2 calculates the average (weighted average) of the calculated absolute value differences. More specifically, the color correlation value calculation unit 2 calculates the horizontal correlation value Ch_color for a color image area through the processing corresponding to the formulae below.

sum=abs(P20−P22)+abs(P22−P24)+abs(P11−P13)+
abs(P31−P33)+(abs(P10−P12)+abs(P12−P14)+
abs(P30−P32)+abs(P32−P34))/2+abs(P21−
P23)×2

Ch_color=sum/8

In the above formula, abs(P21−P23) is multiplied by a coefficient of 2, and (abs(P10−P12)+abs(P12−P14)+abs(P30−P32)+abs(P32−P34)) is multiplied by a coefficient of ½. This multiplication is for weighting in accordance with the distance from the central pixel (the distance on the image). The coefficient for the multiplication (weighting coefficient) should not be limited to the above value, but may be another value.

(A3) First Diagonal Direction Correlation Value Cd1_Color for Color Image Area

The process for calculating the first diagonal direction correlation value Cd1_color for a color image area will now be described with reference to FIG. 12.

Figure 12:
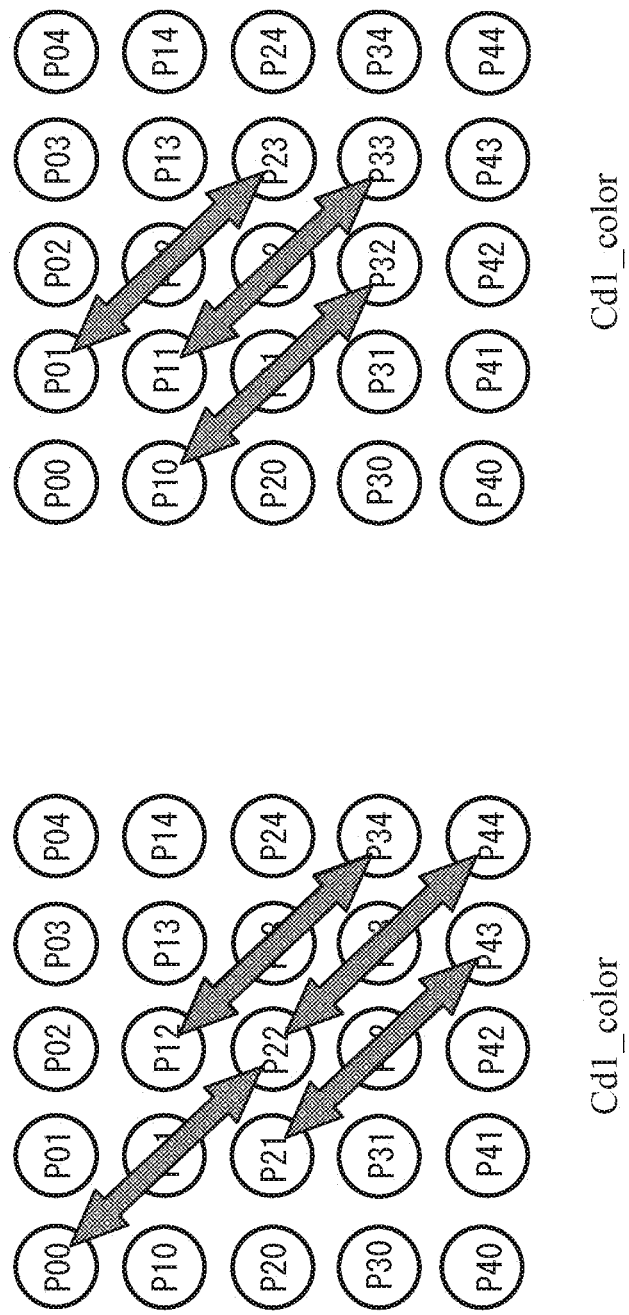
FIG. 12 is a diagram describing a process for calculating a first diagonal direction correlation value Cd1_color intended for a color image area.

FIG. 12 is a diagram describing the process for calculating the first diagonal direction correlation value Cd1_color for a color image area. FIG. 12 shows a matrix area of 5×5 pixels including a central pixel P22 as the center. In the figure, two pixels pointed by each of the two-headed arrows are pixels to be used for subtraction.

As shown in FIG. 12, the color correlation value calculation unit 2 calculates a difference in absolute value between the pixel values of adjacent pixels with the same color in the first diagonal direction, and calculates the average (weighted average) of the calculated absolute value differences. More specifically, the color correlation value calculation unit 2 calculates the first diagonal direction correlation value Cd1_color for a color image area through the processing corresponding to the formulae below.

sum=abs(P00−P22)+abs(P22−P44)+abs(P11−P33)×
2+abs(P12−P34)+abs(P10−P32)+abs(P01−
P23)+abs(P21−P43))

Cd1_color=sum/8

In the above formula, abs(P11−P33) is multiplied by a coefficient of 2. This multiplication is for weighting in accordance with the distance from the central pixel (the distance on the image). The coefficient for the multiplication (weighting coefficient) should not be limited to the above value, but may be another value.

(A4) Second Diagonal Direction Correlation Value Cd2_Color for Color Image Area

The process for calculating the second diagonal direction correlation value Cd2_color for a color image area will now be described with reference to FIG. 13.

Figure 13:
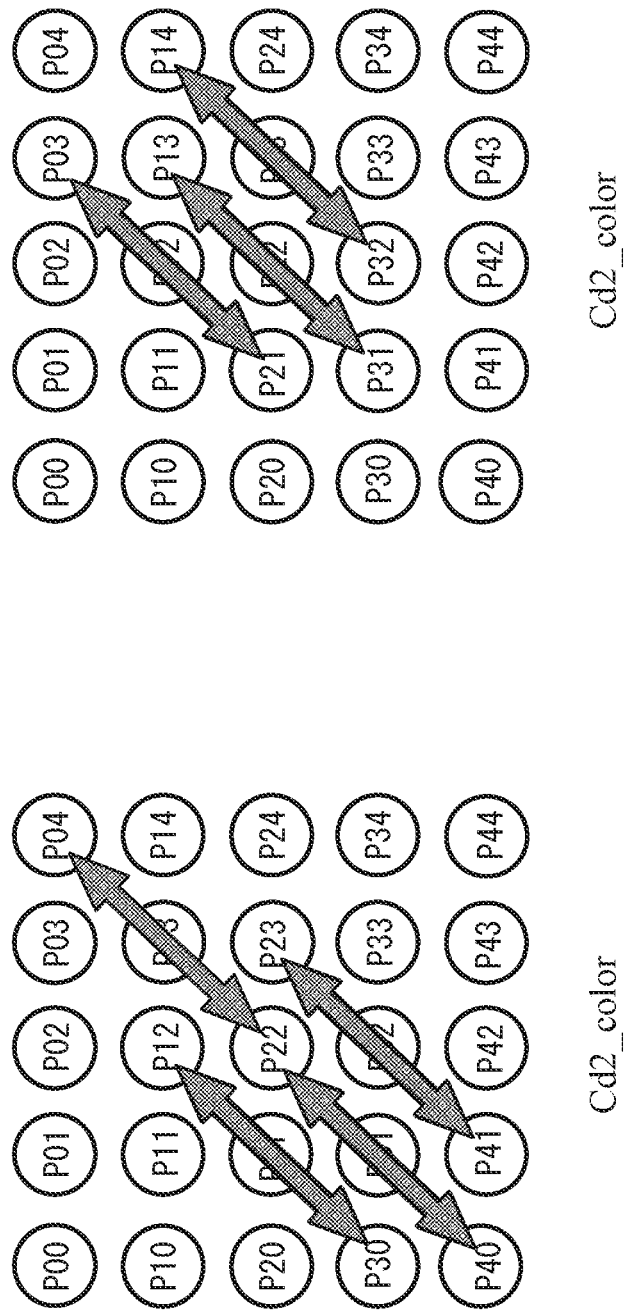
FIG. 13 is a diagram describing a process for calculating a second diagonal direction correlation value Cd2_color intended for a color image area.

FIG. 13 is a diagram describing the process for calculating the second diagonal direction correlation value Cd2_color for a color image area. FIG. 13 shows a matrix area of 5×5 pixels including a central pixel P22 as the center. In the figure, two pixels pointed by each of the two-headed arrows are pixels to be used for subtraction.

As shown in FIG. 13, the color correlation value calculation unit 2 calculates a difference in absolute value between the pixel values of adjacent pixels with the same color in the second diagonal direction, and calculates the average (weighted average) of the calculated absolute value differences. More specifically, the color correlation value calculation unit 2 calculates the second diagonal direction correlation value Cd2_color for a color image area through the processing corresponding to the formulae below.

sum=abs(P04−P22)+abs(P22−P40)+abs(P13−P31)×
2+abs(P12−P30)+abs(P14−P32)+abs(P03−
P21)+abs(P23−P41)

Cd2_color=sum/8

In the above formula, abs(P13−P31) is multiplied by a coefficient of 2. This multiplication is for weighting in accordance with the distance from the central pixel (the distance on the image). The coefficient for the multiplication (weighting coefficient) should not be limited to the above value, but may be another value.

The four color correlation values calculated by the color correlation value calculation unit 2 through the above processing, which are (A1) the vertical direction correlation value Cv_color for a color image area, (A2) the horizontal direction correlation value Ch_color for a color image area, (A3) the first diagonal direction correlation value Cd1_color for a color image area, and (A4) the second diagonal direction correlation value Cd2_color for a color image area, are output to the pixel interpolation method determination unit 5.

1.2.4 Calculating Correlation Values for Grayscale Image Area

The process for calculating the correlation values for a grayscale image area will now be described.

For a target pixel in the image D1 (processing target pixel) output from the signal correction unit 1, the grayscale correlation value calculation unit 4 calculates the four correlation values intended for a grayscale image area described below.

(B1) a vertical direction correlation value Cv_gray for a grayscale image
(B2) a horizontal direction correlation value Ch_gray for a grayscale image
(B3) a first diagonal direction correlation value Cd1_gray for a grayscale image
(B4) a second diagonal direction correlation value Cd2_gray for a grayscale image The process for calculating the correlation values (B1) to (B4) for a grayscale image area will now be described.

(B1) Vertical Direction Correlation Value Cv_Gray for Grayscale Image

The process for calculating the vertical direction correlation value Cv_gray for a grayscale image will now be described with reference to FIG. 14.

Figure 14:
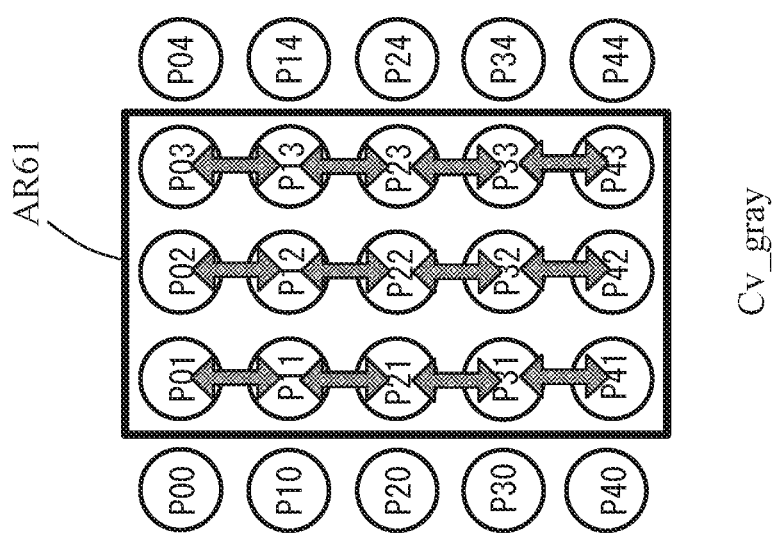
FIG. 14 is a diagram describing a process for calculating a vertical direction correlation value Cv_gray intended for a grayscale image area.

FIG. 14 is a diagram describing the process for calculating the vertical direction correlation value Cv_gray for a grayscale image area. FIG. 14 shows a matrix area of 5×5 pixels including a central pixel P22 as the center. In the figure, two pixels pointed by each of the two-headed arrows are pixels to be used for subtraction.

As shown in FIG. 14, the grayscale correlation value calculation unit 4 calculates a difference in absolute value between the pixel values of vertically adjacent pixels included in an area AR61 consisting of pixels P01 to P03, P11 to P13, P21 to P23, P31 to P33, and P41 to P43. The grayscale correlation value calculation unit 4 calculates the average of the calculated absolute value differences. More specifically, the grayscale correlation value calculation unit 4 calculates the vertical direction correlation value Cv_gray for a grayscale image area through the processing corresponding to the formulae below.

$$\text{sum}=\text{abs}(P02-P12)+\text{abs}(P12-P22)+\text{abs}(P22-P32)+\\ \text{abs}(P32-P42)+\text{abs}(P01-P11)+\text{abs}(P11-P21)+\\ \text{abs}(P21-P31)+\text{abs}(P31-P41)+\text{abs}(P03-P13)+\\ \text{abs}(P13-P23)+\text{abs}(P23-P33)+\text{abs}(P33-P43)$$

$$Cv\_gray=\text{sum}/6$$

(B2) Horizontal Direction Correlation Value Ch_Gray for Grayscale Image

The process for calculating the horizontal direction correlation value Ch_gray for a grayscale image will now be described with reference to FIG. 15.

Figure 15:
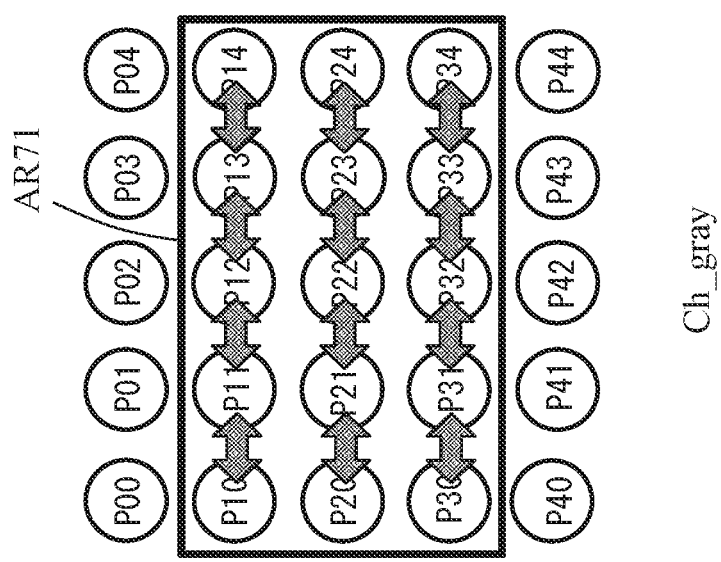
FIG. 15 is a diagram describing a process for calculating a horizontal direction correlation value Ch_gray intended for a grayscale image area.

FIG. 15 is a diagram describing the process for calculating the horizontal direction correlation value Ch_gray for a grayscale image area. FIG. 15 shows a matrix area of 5×5 pixels including a central pixel P22 as the center. In the figure, two pixels pointed by each of the two-headed arrows are pixels to be used for subtraction.

As shown in FIG. 15, the grayscale correlation value calculation unit 4 calculates a difference in absolute value between the pixel values of horizontally adjacent pixels included in an area AR71 consisting of pixels P10 to P14, P20 to P24, and P30 to P34.

The grayscale correlation value calculation unit 4 calculates the average of the calculated absolute value differences. More specifically, the grayscale correlation value calculation unit 4 calculates the horizontal direction correlation value Ch_gray for a grayscale image area through the processing corresponding to the formulae below.

$$\text{sum}=\text{abs}(P20-P21)+\text{abs}(P21-P22)+\text{abs}(P22-P23)+\\ \text{abs}(P23-P24)+\text{abs}(P10-P11)+\text{abs}(P11-P12)+\\ \text{abs}(P12-P13)+\text{abs}(P13-P14)+\text{abs}(P30-P31)+\\ \text{abs}(P31-P32)+\text{abs}(P32-P33)+\text{abs}(P33-P34)$$

$$Ch\_gray=\text{sum}/6$$

(B3) First Diagonal Direction Correlation Value Cd1_Gray for Grayscale Image

The process for calculating the first diagonal direction correlation value Cd1_gray for a grayscale image will now be described with reference to FIG. 16.

Figure 16:
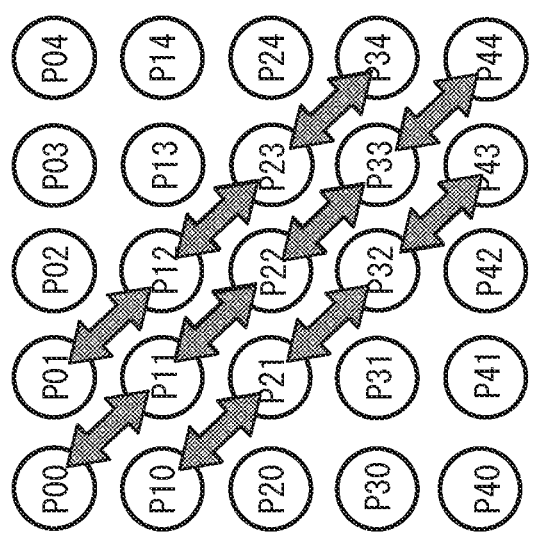
FIG. 16 is a diagram describing a process for calculating a first diagonal direction correlation value Cd1_gray intended for a grayscale image area.

FIG. 16 is a diagram describing the process for calculating the first diagonal direction correlation value Cd1_gray for a grayscale image area. FIG. 16 shows a matrix area of 5×5 pixels including a central pixel P22 as the center. In the figure, two pixels pointed by each of the two-headed arrows are pixels to be used for subtraction.

As shown in FIG. 16, the grayscale correlation value calculation unit 4 calculates a difference in absolute value between the pixel values of adjacent pixels in the first diagonal direction. The grayscale correlation value calculation unit 4 calculates the average of the calculated absolute value differences. More specifically, the grayscale correlation value calculation unit 4 calculates the first diagonal direction correlation value Cd1_gray for a grayscale image area through the processing corresponding to the formulae below.

$$\text{sum}=\text{abs}(P00-P11)+\text{abs}(P11-P22)+\text{abs}(P22-P33)+\\ \text{abs}(P33-P44)+\text{abs}(P10-P21)+\text{abs}(P21-P32)+\\ \text{abs}(P32-P43)+\text{abs}(P01-P12)+\text{abs}(P12-P23)+\\ \text{abs}(P23-P34)$$

$$Cd1\_gray=\text{sum}/5$$

(B4) Second Diagonal Direction Correlation Value Cd2_Gray for Grayscale Image

The process for calculating the second diagonal direction correlation value Cd2_gray for a grayscale image will now be described with reference to FIG. 17.

Figure 17:
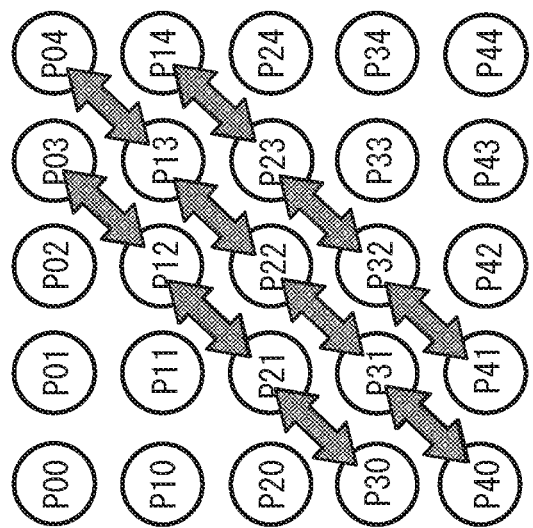
FIG. 17 is a diagram describing a process for calculating a second diagonal direction correlation value Cd2_gray intended for a grayscale image area.

FIG. 17 is a diagram describing the process for calculating the second diagonal direction correlation value Cd2_gray for a grayscale image area. FIG. 17 shows a matrix area of 5×5 pixels including a central pixel P22 as the center. In the figure, two pixels pointed by each of the two-headed arrows are pixels to be used for subtraction.

As shown in FIG. 17, the grayscale correlation value calculation unit 4 calculates a difference in absolute value between the pixel values of adjacent pixels in the second diagonal direction. The grayscale correlation value calculation unit 4 calculates the average of the calculated absolute value differences. More specifically, the grayscale correlation value calculation unit 4 calculates the second diagonal direction correlation value Cd2_gray for a grayscale image area through the processing corresponding to the formulae below.

$$\text{sum} = \text{abs}(P04-P13) + \text{abs}(P13-P22) + \text{abs}(P22-P31) + \\ \text{abs}(P31-P40) + \text{abs}(P03-P12) + \text{abs}(P12-P21) + \\ \text{abs}(P21-P30) + \text{abs}(P14-P23) + \text{abs}(P23-P32) + \\ \text{abs}(P32-P41)$$

$$Cd2\_gray = \text{sum}/5$$

The process shown in FIG. 14 (the process for calculating the vertical direction correlation value for a grayscale image area) and the process shown in FIG. 15 (the process for calculating the horizontal direction correlation value for a grayscale image area) differ from the process shown in FIG. 16 (the process for calculating the first diagonal direction correlation value for a grayscale image area) and the process shown in FIG. 17 (the process for calculating the second diagonal direction correlation value for a grayscale image area) in the distance between the pixels to be used for subtraction. The above calculations do not include multiplication by coefficients to correct the differing distances between pixels because such differences are not very large. Alternatively, the above process (the process for calculating the grayscale image area correlation value) may include weighting of the pixel difference values in accordance with the distances between pixels (e.g., the pixel difference values may be multiplied by the square root of 2).

The correlation values for a grayscale image area are calculated using the same scale as the correlation values for a color image area to allow easy comparison between the correlation values. More specifically, the processes shown in FIGS. 14 to 17 use the distance between adjacent pixels for the distance between pixels to be processed. Thus, the formulae used in calculating the correlation values for a grayscale image area include the multiplication of each pixel difference by 2 to adjust the scale to the scale used in calculating the correlation values for a color image area. The formulae for calculating the correlation values for a grayscale image area thus include the final value of multiplication (1/6 and 1/5) that is twice the inverse of the cumulative number. However, the correlation direction in a grayscale image area is determined using only correlation values for a grayscale image area. Thus, this determination may not need such scale adjustment.

The correlation values for a grayscale image area (Cv_gray, Ch_gray, Cd1_gray, and Cd2_gray) calculated by the grayscale correlation value calculation unit 4 as described above are output to the pixel interpolation method determination unit 5.

1.2.5 Processing Performed by Interpolation Method Determination Unit 5

Selecting Correlation Determination Method and Pixel Interpolation Method

The pixel interpolation method determination unit 5 selects a correlation determination method and a pixel interpolation method for each pixel based on the relationship between the saturation evaluation coefficient KL calculated by the saturation evaluation value calculation unit 3 and the thresholds TH1 and TH2 (TH1≤TH2).

More specifically, selecting the correlation determination method refers to selecting from (1) determining the correlation direction using the correlation values for a grayscale image area, (2) determining the correlation direction using the correlation values for a color image area, or (3) determining the correlation direction using the correlation values selected based on combinations of the grayscale image area correlation values and the color image area correlation values.

Selecting the pixel interpolation method refers to selecting either a pixel interpolation method intended for a grayscale image area or a pixel interpolation method intended for a color image area.

Figure 18:
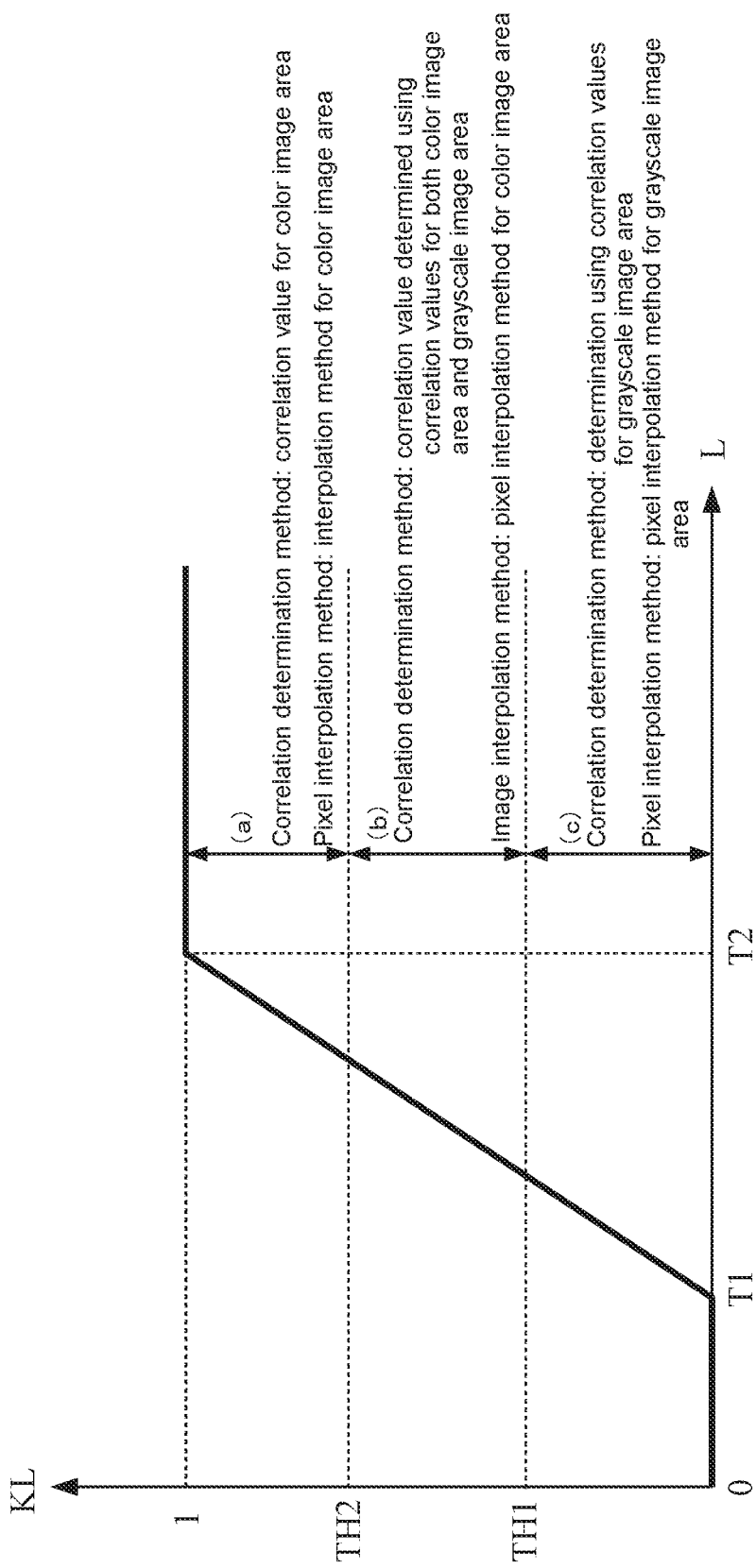
FIG. 18 shows combinations of correlation determination methods and pixel interpolation methods to be selected based on the relationship between a saturation evaluation coefficient KL and thresholds TH1 and TH2.

FIG. 18 shows combinations of correlation determination methods and pixel interpolation methods to be selected based on the relationship between the saturation evaluation coefficient KL and the thresholds TH1 and TH2. As shown in FIG. 18, the correlation determination methods and the pixel interpolation methods are specifically classified into combinations (a) to (c) described below.

When $KL > TH2$ \hfill (a)

Correlation Determination Method: The correlation direction is determined by using the correlation values for a color image area. Pixel Interpolation Method: The pixel interpolation method intended for a color image area is used.

When $TH1 < KL \leq TH2$ \hfill (b)

Correlation Determination Method: The correlation direction is determined by using the correlation values selected based on combinations of the correlation values for a color image area and the correlation values for a grayscale image area.

Pixel Interpolation Method: The pixel interpolation method intended for a color image area is used.

When $KL \leq TH1$ \hfill (c)

Correlation Determination Method: The correlation direction is determined by using the correlation values for a grayscale image area.

Pixel Interpolation Method: The pixel interpolation method intended for a grayscale image area is used.

Information about the pixel interpolation method determined for each pixel is output from the pixel interpolation method determination unit 5 to the interpolation unit 6.

1.2.5.1 Process for Determining Correlation Direction

Selecting Correlation Values for Determination

The pixel interpolation method determination unit 5 selects the correlation values Cv, Ch, Cd1, and Cd2 for determination based on (1) color image area correlation values Cv_color, Ch_color, Cd1_color, and Cd2_color in four directions, which are calculated by the color correlation value calculation unit 2, and (2) grayscale image area correlation values Cv_gray, Ch_gray, Cd1_gray, and Cd2_gray in four directions, which are calculated by the grayscale correlation value calculation unit 4. The correlation values for determination are used to determine the correlation direction of a target pixel (processing target pixel) (the correlation direction to be referenced in pixel interpolation processing).

(a) Determination Correlation Values when KL>TH2

The pixel interpolation method determination unit 5 uses the correlation values intended for a color image area as the correlation values Cv, Ch, Cd1, and Cd2 for determination. More specifically, the pixel interpolation method determination unit 5 uses the values as described below.

$Cv = Cv\_color$ $Ch = Ch\_color$ $Cd1 = Cd1\_color$ $Cd2 = Cd2\_color$ (c) Determination Correlation Values when KL≤TH1

The pixel interpolation method determination unit 5 uses the correlation values intended for a grayscale image area as the correlation values Cv, Ch, Cd1, and Cd2 for determination. More specifically, the pixel interpolation method determination unit 5 uses the values as described below.

$$Cv = Cv\_gray$$

$$Ch = Ch\_gray$$

$$Cd1 = Cd1\_gray$$

$$Cd2 = Cd2\_gray$$

(b) Determination Correlation Values when TH1<KL≤TH2

In this case, the pixel interpolation method determination unit 5 uses the correlation values intended for a grayscale image area and the correlation values intended for a color image area in combination to determine the correlation values Cv, Ch, Cd1, and Cd2 for determination. This method for determining the correlation values will now be described with reference to the flowcharts of FIGS. 19 and 20.

Figure 19:
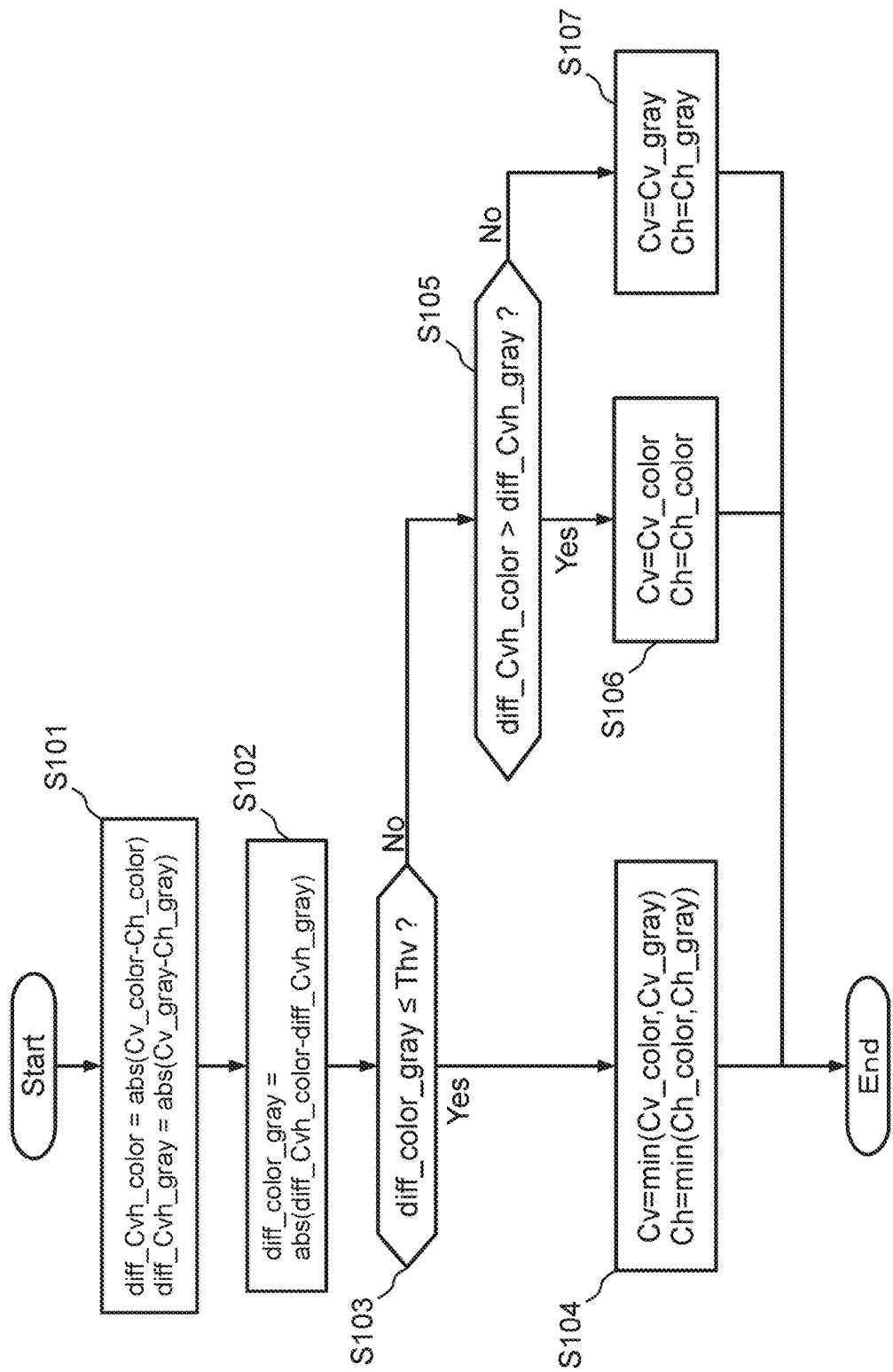
FIG. 19 is a flowchart of a method for calculating correlation values Cv and Ch used for determination.

The method for determining the determination correlation values Cv and Ch will first be described with reference to the flowchart of FIG. 19.

S101:

In step S101, the pixel interpolation method determination unit 5 calculates an absolute value diff_Cvh_color of a difference between the correlation values Cv_color and Ch_color intended for a color image area with the formula below.

$$\text{diff\_}Cvh\_color = \text{abs}(Cv\_color - Ch\_color)$$

The pixel interpolation method determination unit 5 further calculates an absolute value diff_Cvh_gray of a difference between the correlation values Cv_gray and Ch_gray intended for a grayscale image area with the formula below.

$$\text{diff\_}Cvh\_gray = \text{abs}(Cv\_gray - Ch\_gray)$$

S102:

In step S102, the pixel interpolation method determination unit 5 calculates an absolute value diff_color_gray of a difference between the difference absolute value diff_Cvh_color and the difference absolute value diff_Cvh_gray with the formula below.

$$\text{diff\_color\_gray} = \text{abs}(\text{diff\_}Cvh\_color - \text{diff\_}Cvh\_gray)$$

S103:

In step S103, the pixel interpolation method determination unit 5 compares the difference absolute value diff_color_gray calculated in step S102 with the threshold Thv. When diff_color_gray≤Thv, the pixel interpolation method determination unit 5 advances the processing to step S104. In any other cases, the pixel interpolation method determination unit 5 advances the processing to step S105.

S104:

In step S104, the pixel interpolation method determination unit 5 obtains the determination correlation values Cv and Ch through the processing corresponding to the formulae below.

$$Cv = \min(Cv\_color, Cv\_gray)$$

$$Ch = \min(Ch\_color, Ch\_gray)$$

In these formulae, min( ) is a function that returns a minimum value of the elements.

S105 to S107.

In step S105, the pixel interpolation method determination unit 5 determines whether the difference absolute value diff_Cvh_color is greater than the difference absolute value diff_Cvh_gray.

When diff_Cvh_color>diff_Cvh_gray, the pixel interpolation method determination unit 5 sets Cv=Cv_color and Ch=Ch_color (step S106).

In any cases other than when diff_Cvh_color>diff_Cvh_gray, the pixel interpolation method determination unit 5 sets Cv=Cv_gray and Ch=Ch_gray (step S107).

Through the above processing, the pixel interpolation method determination unit 5 selects (determines) the determination correlation values Cv and Ch.

When the difference absolute value diff_color_gray is equal to or less than the threshold THv in the above processing, the difference between the difference absolute value diff_Cvh_color and the difference absolute value diff_Cvh_gray is small. This condition may be satisfied when no strong correlation is detected in the vertical direction and the horizontal direction.

In this case, the pixel interpolation method determination unit 5 compares the correlation values intended for a grayscale image area and intended for a color image area for each of the vertical direction and the horizontal direction, and selects the smaller correlation value or specifically selects the value indicating a higher correlation (step S104).

When the difference absolute value diff_color_gray is greater than the threshold THv in the above processing, the difference between the difference absolute value diff_Cvh_color and the difference absolute value diff_Cvh_gray is large.

This condition may be satisfied when a strong correlation is detected in either the vertical direction or the horizontal direction.

In this case, the pixel interpolation method determination unit 5 compares the difference absolute value diff_Cvh_color and the difference absolute value diff_Cvh_gray, and selects the correlation value with a greater difference absolute value (steps S105 to S107).

Figure 20:
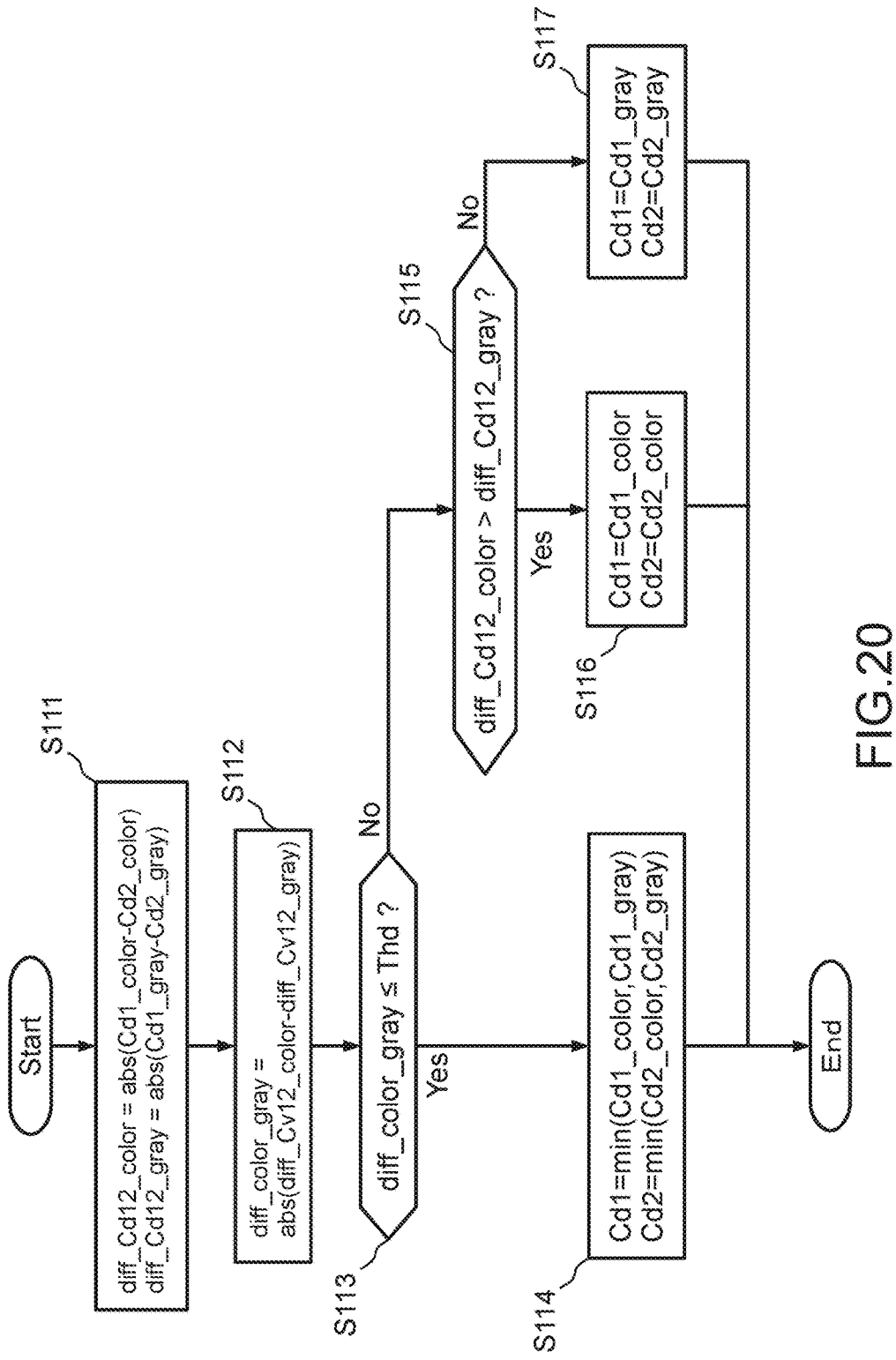
FIG. 20 is a flowchart of a method for calculating correlation values Cd1 and Cd2 used for determination.

The method for determining the determination correlation values Cd1 and Cd2 will now be described with reference to the flowchart of FIG. 20.

S111:

In step S111, the pixel interpolation method determination unit 5 calculates the difference absolute value diff_Cd12_color between the correlation values Cd1_color and Cd2_color for a color image area with the formula below.

$$\text{diff\_}Cd12\_color = \text{abs}(Cd1\_color - Cd2\_color)$$

The pixel interpolation method determination unit 5 further calculates an absolute value diff_Cd12_gray of a difference between the correlation values Cd1_gray and Cd2_gray for a grayscale image area with the formula below.

$$\text{diff\_}Cd12\_gray = \text{abs}(Cd1\_gray - Cd2\_gray)$$

S112:

In step S112, the pixel interpolation method determination unit 5 calculates an absolute value diff_color_gray of a difference between the difference absolute value diff_Cd12_color and the difference absolute value diff_Cd12_gray with the formula below.

$$\text{diff\_color\_gray} = \text{abs}(\text{diff\_Cd12\_color} - \text{diff\_Cd12\_gray})$$

S113:

In step S113, the pixel interpolation method determination unit 5 compares the difference absolute value diff_color_gray calculated in step S112 with the threshold Thd. When diff_color_gray≤Thd, the pixel interpolation method determination unit 5 advances the processing to step S114. In any other cases, the pixel interpolation method determination unit 5 advances the processing to step S115.

S114:

In step S114, the pixel interpolation method determination unit 5 obtains the determination correlation values Cd1 and Cd2 through the processing corresponding to the formulae below.

$$Cd1 = \min(Cd1\_color, Cd1\_gray)$$

$$Cd2 = \min(Cd2\_color, Cd2\_gray)$$

In these formulae, min( ) is a function that returns a minimum value of the elements.

S115 to S117:

In step S115, the pixel interpolation method determination unit 5 compares the difference absolute value diff_Cd12_color with the difference absolute value diff_Cd12_gray. When diff_Cd12_color>diff_Cd12_gray, the pixel interpolation method determination unit 5 sets Cd1 and Cd2 to satisfy the following: Cd1=Cd1_color and Cd2=Cd2_color (step S116). In any cases other than when diff_Cd12_color>diff_Cd12_gray, the pixel interpolation method determination unit 5 sets Cd1 and Cd2 to satisfy the following: Cd1=Cd1_gray and Cd2=Cd2_gray (step S117).

Through the above processing, the pixel interpolation method determination unit 5 selects (determines) the determination correlation values Cd1 and Cd2.

When the difference absolute value diff_color_gray is equal to or less than the threshold Thd in the above processing, the difference between the difference absolute value diff_Cd12_color and the difference absolute value diff_Cd12_gray is small.

This condition may be satisfied when no strong correlation is detected in the first diagonal direction and the second diagonal direction.

In this case, the pixel interpolation method determination unit 5 compares the correlation values intended for a grayscale image area and the correlation values intended for a color image area for each of the first diagonal direction and the second diagonal direction, and selects the smaller correlation value or specifically selects the value indicating a higher correlation (step S114).

When the difference absolute value diff_color_gray is greater than the threshold Thd in the above processing, the difference between the difference absolute value diff_Cd12_color and the difference absolute value diff_Cd12_gray is large. This condition may be satisfied when a strong correlation is detected in either the first diagonal direction or the second diagonal direction.

In this case, the pixel interpolation method determination unit 5 compares the difference absolute value diff_Cd12_color with the difference absolute value diff_Cd12_gray, and selects the correlation value with a greater difference absolute value (steps S115 to S117).

Through the above processing, the pixel interpolation method determination unit 5 uses the correlation values intended for a grayscale image area and the correlation values intended for a color image area in combination to determine the determination correlation values Cv, Ch, Cd1, and Cd2 (the determination correlation values when TH1<KL≤TH2).

Through the above calculations, the pixel interpolation method determination unit 5 selects (determines) the determination correlation values Cv, Ch, Cd1, and Cd2 in each of the above cases (a), (b), and (c).

As described above, the correlation determination methods and the pixel interpolation methods are classified into three patterns based on the relationship between the evaluation coefficient KL and the thresholds TH1 and TH2. Unlike a method using one threshold to determine a grayscale image area (image area with low saturation) and a color image area (image area with high saturation), this method using the two thresholds TH1 and TH2 reduces sudden changes of the pixel interpolation processing method in a border area between a grayscale image area and a color image area. This effectively reduces perceived strangeness that may occur in an image area around the border between a grayscale image area and a color image area in an image that has undergone pixel interpolation processing.

An image area around the border between a grayscale image area and a color image area contains RGB components with substantially equal values, which may vary only slightly. The correlations are thus determined by focusing on such small variations between the R, G, and B components. The calculation of correlation values thus uses pixels arranged nearest possible to one another without differentiating the R, G, and B components. Alternatively, the calculation may focus on any variations between the R, G, and B components to calculate the correlation values by differentiating the R, G, and B components. These two approaches are used in combination to select optimum correlation values. This improves the accuracy of determination of the correlation direction. In contrast, pixel interpolation neglecting variations between the RGB components and assuming the image as a grayscale image area may cause false colors. To prevent this, the imaging apparatus 1000 performs pixel interpolation processing intended for a color image area.

For convenience of processing, the present embodiment uses the saturation evaluation coefficient KL, which is obtained by normalizing the saturation evaluation value L, and compares the saturation evaluation coefficient KL with the thresholds TH1 and TH2 to determine whether the image area is a grayscale image area or a color image area. The embodiment simply needs comparing between the saturation evaluation value L and the two thresholds to determine whether the image area is a grayscale image area or a color image area.

Process for Determining Correlation Direction for Each Pixel

Figure 21:
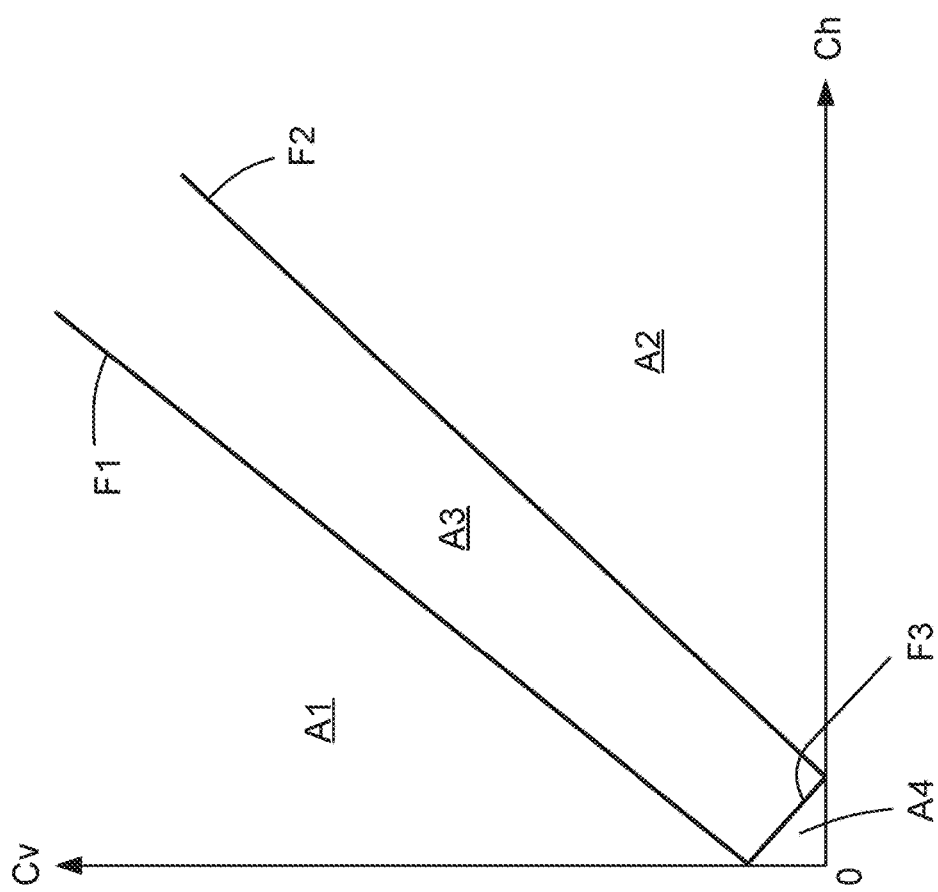
FIG. 21 is a relationship diagram determining the direction of correlation based on the correlation values Cv and Ch used for determination.
Figure 22:
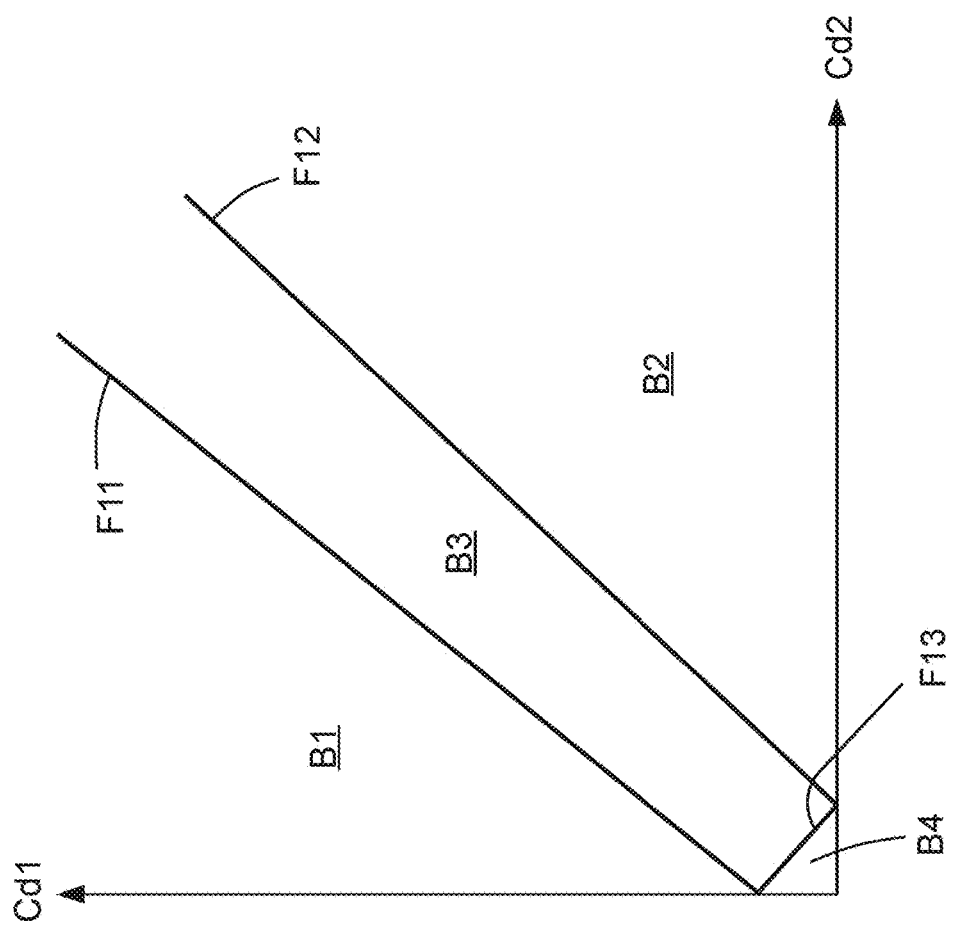
FIG. 22 is a relationship diagram determining the direction of correlation based on the correlation values Cd1 and Cd2 used for determination.

The pixel interpolation method determination unit 5 determines the correlation direction for each pixel using the determination correlation values Cv, Ch, Cd1, and Cd2 calculated through the above processing based on the relationship diagram of FIG. 21 or FIG. 22.

FIG. 21 is a diagram showing the relationship between the determination correlation values Ch and Cv and the areas A1 to A4 for determining the correlation direction. In FIG. 21, the horizontal axis (X axis) indicates the determination correlation value Ch, and the vertical axis (Y axis) indicates the determination correlation value Cv. As shown in FIG. 21, the correlation direction determination areas A1 to A4 are defined by straight lines F1 to F3. The correlation direction determination area A1 is defined by the Y axis and the straight line F1. The correlation direction determination area A2 is defined by the X axis and the straight line F2. The correlation direction determination area A3 is defined by the straight lines F1, F2, and F3. The correlation direction determination area A4 is defined by the X axis, the Y axis, and the straight line F3.

FIG. 22 is a diagram showing the relationship between the determination correlation values Cd1 and Cd2 and the areas B1 to B4 for determining the correlation direction. In FIG. 22, the horizontal axis (X axis) indicates the determination correlation value Cd2, and the vertical axis (Y axis) indicates the determination correlation value Cd1. As shown in FIG. 22, the correlation direction determination areas B1 to B4 are defined by straight lines F11 to F13. The correlation direction determination area B1 is defined by the Y axis and the straight line F11. The correlation direction determination area B2 is defined by the X axis and the straight line F12. The correlation direction determination area B3 is defined by the straight lines F11, F12, and F13. The correlation direction determination area B4 is defined by the X axis, the Y axis, and the straight line F13.

The pixel interpolation method determination unit 5 determines the correlation direction for each pixel using the determination correlation values Cv, Ch, Cd1, and Cd2 calculated through the above processing based on the relationship diagram of FIG. 21 or FIG. 22 through the processing (1) and (2) described below.

(1) The pixel interpolation method determination unit 5 compares the four determination correlation values Cv, Ch, Cd1, and Cd2 for each pixel. When the determination correlation value Cv or the determination correlation value Ch is a minimum value among the four values, or in other words when Cv=min(Cv, Ch, Cd1, Cd2) or Ch=min(Cv, Ch, Cd1, Cd2), the pixel interpolation method determination unit determines the correlation direction based on the relationship diagram of FIG. 21.

More specifically, when the point corresponding to the determination correlation value (coordinate point (Ch, Cv)) is included in the area A1, the pixel interpolation method determination unit 5 determines the correlation direction of the target pixel as the horizontal direction.

When the point corresponding to the determination correlation value (coordinate point (Ch, Cv)) is included in the area A2, the pixel interpolation method determination unit 5 determines the correlation direction of the target pixel as the vertical direction.

When the point corresponding to the determination correlation value (coordinate point (Ch, Cv)) is included in the area A3, the pixel interpolation method determination unit 5 determines that the target pixel has correlation in none of the directions.

When the point corresponding to the determination correlation value (coordinate point (Ch, Cv)) is included in the area A4, the pixel interpolation method determination unit 5 determines that the target pixel has high correlation in both of the vertical and horizontal directions.

(2) The pixel interpolation method determination unit 5 compares the four determination correlation values Cv, Ch, Cd1, and Cd2 for each pixel. When the determination correlation value Cd1 or the determination correlation value Cd2 is a minimum value of the four values, or in other words when Cd1=min(Cv, Ch, Cd1, Cd2) or when Cd2=min(Cv, Ch, Cd1, Cd2), the pixel interpolation method determination unit 5 determines the correlation direction based on the relationship diagram of FIG. 22.

When the point corresponding to the determination correlation value (coordinate point (Cd2, Cd1)) is included in the area B1, the pixel interpolation method determination unit 5 determines the correlation direction of the target pixel as the second diagonal direction (d2 direction).

When the point corresponding to the determination correlation value (coordinate point (Cd2, Cd1)) is included in the area B2, the pixel interpolation method determination unit 5 determines the correlation direction of the target pixel as the first diagonal direction (d1 direction).

When the point corresponding to the determination correlation value (coordinate point (Cd2, Cd1)) is included in the area B3, the pixel interpolation method determination unit 5 determines that the target pixel has correlation in none of the directions.

When the point corresponding to the determination correlation value (coordinate point (Cd2, Cd1)) is included in the area B4, the pixel interpolation method determination unit 5 determines that the target pixel has high correlation in both of the vertical and horizontal directions.

As described above, the determination result of the correlation direction for each pixel (information Co_Dir about the correlation direction) is output from the pixel interpolation method determination unit 5 to the interpolation unit 6 and the correction processing unit 7.

Information P_Mthd about the pixel interpolation method determined for each pixel (the pixel interpolation method intended for a color image area or the pixel interpolation method intended for a grayscale image area) is also output from the pixel interpolation method determination unit 5 to the interpolation unit 6.

The above relationship diagram is a mere example, and may be a relationship diagram having areas defined by other straight lines.

1.2.6 Processing by Interpolation Unit 6

The interpolation unit 6 performs interpolation for a color image and interpolation for a grayscale image based on (1) the result of determination about a correlation direction and (2) a pixel interpolation method, which are determined for each pixel by the pixel interpolation method determination unit 5; (A) in the interpolation for a color image, the interpolation unit 6 performs pixel interpolation, for each pixel, on the image D_raw output from the signal processing unit C2, and (B) in the interpolation for a grayscale image, the interpolation unit 6 performs pixel interpolation, for each pixel, on the image D1 output from the signal correction unit 1.

1.2.6.1 Pixel Interpolation for Grayscale Image Area

When the pixel interpolation method for a target processing pixel, which is determined by the pixel interpolation method determination unit 5, is the "pixel interpolation for a grayscale image area", the grayscale image interpolation unit 62 of the interpolation unit 6 performs pixel interpolation using pixels provided in a correlation direction determined by the pixel interpolation method determination unit 5 regardless of what color component the target processing pixel has. A case in which the grayscale image interpolation unit 62 performs pixel interpolation using the "pixel interpolation for a grayscale image area" will now be described in detail.

Area A1: Horizontal Direction Pixel Interpolation (Grayscale Image Area)

When the pixel interpolation method for the target pixel determined by the pixel interpolation method determination unit 5 is the pixel interpolation method intended for a grayscale image area and the correlation direction for the target pixel determined by the pixel interpolation method determination unit 5 is the horizontal direction, the grayscale image interpolation unit 62 performs the pixel interpolation processing for the target pixel through the processing corresponding to the formula below.

$$Sout=(P21+2\times P22+P23)/4$$

The grayscale image interpolation unit 62 sets the value of each color component that is not contained in the target pixel as Sout. When, for example, the target pixel P22 is a Ye-pixel, Cy(P22)=G(P22)=Mg(P22)=Sout, where Cy(P22) is the value of the Cy-component, G(P22) is the value of the G-component, and Mg(P22) is the value of the Mg-component for the target pixel.

Area A2: Vertical Direction Pixel Interpolation (Grayscale Image Area)

When the pixel interpolation method for the target pixel determined by the pixel interpolation method determination unit 5 is the pixel interpolation method intended for a grayscale image area and the correlation direction for the target pixel determined by the pixel interpolation method determination unit 5 is the vertical direction, the grayscale image interpolation unit 62 performs the pixel interpolation processing for the target pixel through the processing corresponding to the formula below.

$$Sout=(P12+2\times P22+P32)/4$$

The grayscale image interpolation unit 62 sets the value of each color component that is not contained in the target pixel as Sout. When, for example, the target pixel P22 is a Ye-pixel, Cy(P22)=G(P22)=Mg(P22)=Sout, where Cy(P22) is the value of the Cy-component, G(P22) is the value of the G-component, and Mg(P22) is the value of the Mg-component for the target pixel.

Area B2: First Diagonal Direction Pixel Interpolation (Grayscale Image Area)

When the pixel interpolation method for the target pixel determined by the pixel interpolation method determination unit 5 is the pixel interpolation method intended for a grayscale image area and the correlation direction for the target pixel determined by the pixel interpolation method determination unit 5 is the first diagonal direction, the grayscale image interpolation unit 62 performs the pixel interpolation processing for the target pixel through the processing corresponding to the formula below.

$$Sout=(P11+2\times P22+P33)/4$$

The grayscale image interpolation unit 62 sets the value of each color component that is not contained in the target pixel as Sout. When, for example, the target pixel P22 is a Ye-pixel, Cy(P22)=G(P22)=Mg(P22)=Sout, where Cy(P22) is the value of the Cy-component, G(P22) is the value of the G-component, and Mg(P22) is the value of the Mg-component for the target pixel.

Area B1: Second Diagonal Direction Pixel Interpolation (Grayscale Image Area)

When the pixel interpolation method for the target pixel determined by the pixel interpolation method determination unit 5 is the pixel interpolation method intended for a grayscale image area and the correlation direction for the target pixel determined by the pixel interpolation method determination unit 5 is the second diagonal direction, the grayscale image interpolation unit 62 performs the pixel interpolation processing for the target pixel through the processing corresponding to the formula below.

$$Sout=(P13+2\times P22+P31)/4$$

The grayscale image interpolation unit 62 sets the value of each color component that is not contained in the target pixel as Sout. When, for example, the target pixel P22 is a Ye-pixel, Cy(P22)=G(P22)=Mg(P22)=Sout, where Cy(P22) is the value of the Cy-component, G(P22) is the value of the G-component, and Mg(P22) is the value of the Mg-component for the target pixel.

Areas A3 and B3: Median Interpolation (Grayscale Image Area)

When the pixel interpolation method for the target pixel determined by the pixel interpolation method determination unit 5 is the pixel interpolation method intended for a grayscale image area and the target pixel is determined by the pixel interpolation method determination unit 5 to have correlation in none of the directions, the grayscale image interpolation unit 62 performs the pixel interpolation processing for the target pixel through the processing corresponding to the formula below.

$$Sout=P22$$

The grayscale image interpolation unit 62 sets the value of each color component that is not contained in the target pixel as Sout. When, for example, the target pixel P22 is a Ye-pixel, Cy(P22)=G(P22)=Mg(P22)=Sout, where Cy(P22) is the value of the Cy-component, G(P22) is the value of the G-component, and Mg(P22) is the value of the Mg-component for the target pixel.

Areas A4 and B4: Average Interpolation (Grayscale Image Area)

When the pixel interpolation method for the target pixel determined by the pixel interpolation method determination unit 5 is the pixel interpolation method intended for a grayscale image area and the target pixel is determined by the pixel interpolation method determination unit 5 to have high correlation in both of the vertical and horizontal directions, the grayscale image interpolation unit 62 performs the pixel interpolation processing for the target pixel through the processing corresponding to the formula below.

$$Sout=(P11+P12+P13+P21+P22+P23+P31+P32+P33)/9$$

The grayscale image interpolation unit 62 sets the value of each color component that is not contained in the target pixel as Sout. When, for example, the target pixel P22 is a Ye-pixel, Cy(P22)=G(P22)=Mg(P22)=Sout, where Cy(P22) is the value of the Cy-component, G(P22) is the value of the G-component, and Mg(P22) is the value of the Mg-component for the target pixel.

The image signal obtained through the above-described interpolation for a grayscale image is output from the grayscale image interpolation unit 62 to the signal inverse correction unit 63.

Signal Inverse Correction Processing

The signal inverse correction unit 63 subjects the image signal output from the grayscale image interpolation unit 62 to processing inverse to the correction processing that the signal correction unit 1 has performed.

More specifically, the signal inverse correction unit 63 performs processing that corresponds to the following equations $$Yeout=Yein/Gain\_sig\_Ye$$

$$Cyout=Cyin/Gain\_sig\_Cy$$

$$Gout=Gin/Gain\_sig\_G$$

$$Mgout=Mgin/Gain\_sig\_Mg$$

where Yein1, Cyin1, Gin1, and Mgin1 respectively denotes a Ye-component pixel signal, a Cy-component pixel signal, a G-component pixel signal, and a Mg-component pixel signal, which compose the image signal output from the grayscale image interpolation unit 62.

Note that each of gain values of Gain_sig_Ye, Gain_sig_Cy, Gain_sig_G, and Gain_sig_Mg is the same as the corresponding gain for correction used in the signal correction processing in the signal correction unit 1.

The above processing enables the individual signal levels of the pixel signals of the image signal after the interpolation for a grayscale image to be approximately equal to the corresponding signal levels of the pixel signals of the image signal before the signal correction processing in the signal correction unit 1.

The image signal resulting from the above-described signal inverse correction processing by the signal inverse correction unit 63 is output to the selection unit 64.

1.2.6.2 Pixel Interpolation Processing for Color Image Area

When the pixel interpolation method for the target pixel determined by the pixel interpolation method determination unit 5 is the pixel interpolation method intended for a color image area, the color image interpolation unit 61 of the interpolation unit 6 performs pixel interpolation processing by using a pixel located in the correlation direction determined by the pixel interpolation method determination unit 5. The specific processing for the pixel interpolation will now be described.

Horizontal Direction Pixel Interpolation (Color Image Area)

When the pixel interpolation method for the target pixel determined by the pixel interpolation method determination unit 5 is the pixel interpolation method intended for a color image area and the correlation direction for the target pixel determined by the pixel interpolation method determination unit 5 is the horizontal direction, the color image interpolation unit 61 performs the pixel interpolation processing for the target pixel through the processing corresponding to the formula below. After the pixel interpolation processing, the target pixel will have the pixel value Yeout for its Ye-component, the pixel value Cyout for its Cy-component, the pixel value Gout for its G-component, and the pixel value Mgout for its Mg-component.

H-Ye: When the Target Pixel is Ye-Pixel

When the target pixel is a Ye-pixel, the color image interpolation unit 61 of the interpolation unit 6 obtains the values Yeout, Cyout, Gout, and Mgout through the processing described below.

Yeout

The color image interpolation unit 61 sets the pixel value Yeout of the Ye-component as the pixel value P22 of the target pixel. In other words, the color image interpolation unit 61 sets the value as Yeout=P22.

Cyout

The color image interpolation unit 61 performs the processing described below to obtain the pixel value Cyout of the Cy-component. The process for obtaining (calculating) the pixel value Cyout of the Cy-component will now be described with reference to FIG. 23.

Figure 23:
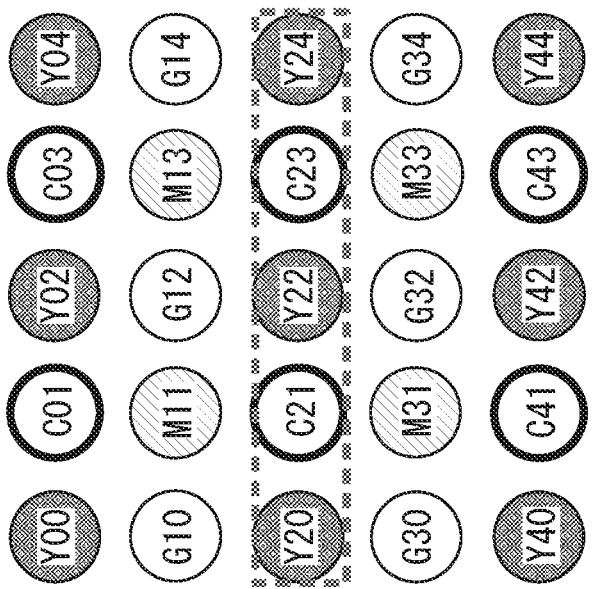
FIG. 23 is a diagram describing pixel interpolation in the horizontal direction (for a color image area) for an image area including a Ye-pixel in the center.

FIG. 23 shows a matrix area of 5×5 pixels including a Ye-pixel as its central pixel (target pixel). In FIG. 23, the symbols Y, C, G, and M are numbered with their first digit indicating the row number of the pixel in the matrix area, and their second digit indicating the column number of the pixel in the matrix area. In other words, FIG. 23 shows a matrix area of pixel array consisting of 25 pixels P00 to P44 including a target pixel P22, in which the central pixel P22 (Y22) is a yellow component pixel (corresponding to an area AR1 consisting of 5×5 pixels in FIG. 4). The other figures also show the pixel arrays in the same manner as described above. The symbols P, Y, C, G, and M in the embodiment and in the formulae therein may each represent the pixel value. For example, P11 represents the pixel at the first row and the first column, and also indicates the pixel value of the pixel at the first row and the first column.

The color image interpolation unit 61 obtains the Cy-component pixel value Cyout using the five pixels P20 to P24 arranged in the horizontal direction with the target pixel P22 (Ye-pixel) in the center through the processing corresponding to the formulae below.

$$t0=(P21+P23)/2$$

$$t1=(P20-2\times P22+P24)\times \text{gain}0$$

$$Cyout=t0-t1$$

The meaning of the above processing will now be explained.

The pixel Y22 (Ye-pixel P22) has a low-frequency component Y22L written below.

$$Y22L=(Y20+6\times Y22+Y24)/8.$$

Thus, the high-frequency component Y22H of the pixel Y22 is determined as written below.

$$Y22H=Y22-Y22L=-(Y20-2\times Y22+Y24)/8$$

The low-frequency component C22L of the cyan component value C22 of the pixel P22 is as written below.

$$C22L=(C21+2\times C22+C23)/4$$

Thus, the high-frequency component C22H of the cyan component value C22 is determined as written below.

$$C22H=C22-C22L=C22/2-(C21+C23)/4$$

When each color component for the pixel P22 is assumed to have substantially the same high-frequency component, Y22H≈C22H, and thus $C22/2-(C21+C23)/4\approx -(Y20-2\times Y22+Y24)/8$. This formula is solved for C22 as written below.

$$C22=(C21+C23)/2-(Y20-2\times Y22+Y24)/4$$

In this formula, the term (Y20−2×Y22+Y24) is a Laplacian component value (second order differential component value) in the horizontal direction.

The cyan component value C22 of the pixel P22 can be calculated by subtracting the Laplacian component value multiplied by ¼ from the average of the values C21 and C23.

The color image interpolation unit 61 obtains the Cy-component pixel value Cyout using the formulae below.

$$t0=(P21+P23)/2$$

$$t1=(P20-2\times P22+P24)\times \text{gain}0$$

$$Cyout=t0-t1$$

When gain0 is ¼, t1 is a Laplacian component value.

The color image interpolation unit 61 can adjust the value gain0 to adjust the Laplacian component value, thereby allowing for adjusting the amount of high-frequency component of the pixel value Cyout. For example, the color image interpolation unit 61 may adjust the value gain0 (adjust the Laplacian component value) in accordance with the optical characteristics of the imaging unit C1 (e.g., the characteristics of the optical filters included in the imaging unit C1) to perform pixel interpolation processing with a higher quality.

Gout

The color image interpolation unit 61 performs the processing described below to obtain the pixel value Gout of the G-component. The process for obtaining (calculating) the pixel value Gout of the G-component will now be described with reference to FIG. 24.

Figure 24:
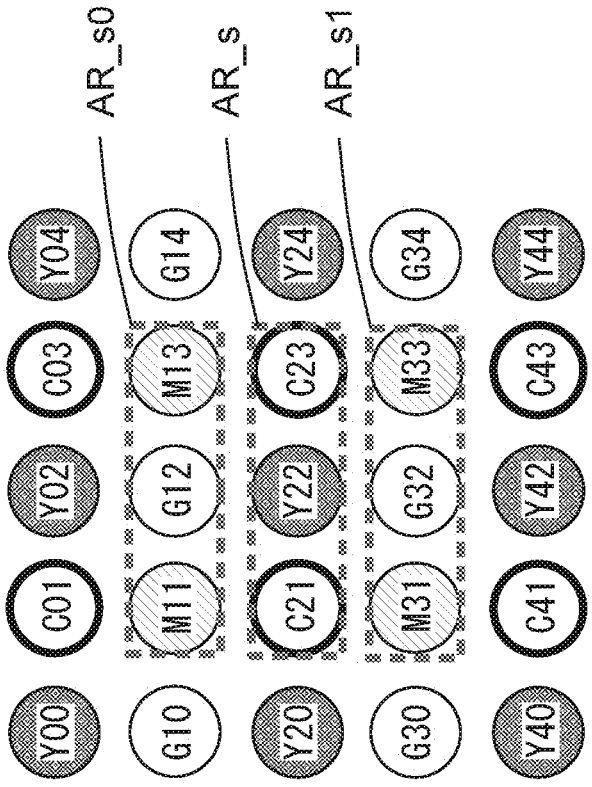
FIG. 24 is a diagram describing pixel interpolation in the horizontal direction (for a color image area) for an image area including a Ye-pixel in the center.

FIG. 24 shows a matrix area of 5×5 pixels including a Ye-pixel as its central pixel (target pixel) as in FIG. 23.

The color image interpolation unit 61 obtains the Mg+2G-component value s0 (=R+2G+B-component value s0) of the pixel P12 using the pixels P11 to P13 included in the area AR_s0 shown in FIG. 24 through the processing corresponding to the formula below.

Note that since Mg=R+B is satisfied, Mg+2G=(R+B)+2G=R+2G+B is satisfied.

$$s0 = kk1 \times P12 + kk2 \times \{(P11+P13)/2\} + ofs1$$

Assuming that kk1=2, kk2=1, and ofs1=0, the following formula is satisfied.

$$s0 = 2 \times P12 + (P11+P13)/2.$$

The pixel P12 is a G-component pixel, the pixels P11 and P13 are Mg-component pixels, and thus the above formula is considered to be for calculating the Mg+2G-component value (=R+2G+B-component value) of the pixel P12.

The color image interpolation unit 61 also obtains the Ye–Cy-component value s (=R+2G+B-component value s) of the pixel P22 using the pixels P21 to P23 included in the area AR_s shown in FIG. 24 through the processing corresponding to the formula below.

Note that since Ye=R+G and Cy=B+G are satisfied, Ye+Cy=(R+G)+(B+G)=R+2G+B is satisfied.

$$s = kk3 \times P22 + kk4 \times \{(P21+P23)/2\} + ofs2$$

Assuming that kk3=1, kk4=1, and ofs2=0, the following formula is satisfied.

$$s0 = P22 + (P21+P23)/2.$$

The pixel P22 is a Ye-component pixel, the pixels P21 and P23 are Cy-component pixels, and thus the above formula is considered to be for calculating the Ye+Cy-component value (=R+2G+B-component value) of the pixel P22.

The color image interpolation unit 61 also obtains the Mg+2G-component value s1 (=R+2G+B-component value s1) of the pixel P32 using the pixels P31 to P33 included in the area AR_s1 shown in FIG. 24 through the processing corresponding to the formula below.

Note that since Mg=R+B is satisfied, Mg+2G=(R+B)+2G=R+2G+B is satisfied.

$$s0 = kk5 \times P32 + kk6 \times \{(P31+P33)/2\}/+ofs3$$

Assuming that kk5=1, kk6=1, and ofs3=0, the following formula is satisfied.

$$s0 = 2 \times P32 + (P31+P33)/2$$

The pixel P32 is a G-component pixel, the pixels P31 and P33 are Mg-component pixels, and thus the above formula is considered to be for calculating the Mg+2G-component value (=R+2G+B-component value) of the pixel P32.

As described above, the color image interpolation unit 61 sets the coefficients kk1 to kk6, the offset values ofs1 to ofs3 using pixels located in the horizontal direction, the pixels having high correlation, such that the pixels are converted so as to have component values defined in the same color space, thereby obtaining the component value s0 of the pixel P12, the component value s of the pixel P22, and the component value s1 of the pixel P32, which are defined in the same color space (in the above, R+2G+B component values s0, s, and s1).

Through processing corresponding to the following formulas, the component values (in the above, R+2G+B component values) s0, s, and s1 of the pixels P12, P22, and P32, which are defined in the same color space, may be adjusted with values for adjustment, and the adjusted values may be set as the component values (in the above, R+2G+B component values) s0, s, and s1 of the pixels P12, P22, and P32, which are defined in the same color space.

$$s0 = s0/gs$$

$$s = s/gs$$

$$s1 = s1/gs$$

In the above, the coefficients kk1 to kk6 and the offset values ofs1 to ofs3 are set such that the pixels are converted so as to have R+2G+B component values s0, s, and s1. However, the present invention should not be limited to this case; through any other color space conversion, the values s0, s, s1 may be obtained such that the pixels are converted so as to have component values defined in any other color space.

In other words, the color image interpolation unit 61 sets the coefficients kk1 to kk6 and the offset values ofs1 to ofs3 using pixels located in the horizontal direction, the pixels having high correlation, such that the pixels are converted so as to have component values defined in the same color space, in consideration of a pattern of color filters, thereby allowing for obtaining component values s0, s, and s1, which are the same as those of pixels P12, P22, and P32 defined in the color space, regardless of how a pattern of color filters is.

The color image interpolation unit 61 obtains the pixel value Gout of the G-component through the processing corresponding to the formulae below.

$$t0 = (P12+P32)/2$$

$$t1 = (s0 - 2 \times s + s1) \times gain1$$

$$Gout = t0 - t1$$

The meaning of the above processing will now be explained. For ease of explanation, a case in which the pixel value of the G-pixel 22 will be obtained when the pixel values of the pixels W21, W22, W23, G21, and G23 are known will now be described.

The W-pixel 22 has a low-frequency component W22L written below.

$$W22L = (W21 + 2 \times W22 + W23)/4.$$

Thus, the high-frequency component W22H of the W-pixel W22 is determined as written below.

$$W22H = W22 - W22L = -(W21 - 2 \times W22 + W23)/4.$$

The low-frequency component G22L of the green component value G22 of the pixel P22 is as written below.

$$G22L = (G21 + 2 \times G22 + G23)/4$$

Thus, the high-frequency component G22H of the G-pixel G22 is determined as written below.

$$G22H = G22 - G22L = G22/2 - (G21+G23)/4$$

When each color component for the pixel P22 is assumed to have substantially the same high-frequency component, W22H≈G22H, and thus $G22/2 - (G21+G23)/4 \approx -(W21 - 2 \times W22 + W23)/4$.

This formula is solved for G22 as written below.

$$G22=(G21+G23)/2-(W21-2\times W22+W23)/2$$

In this formula, the term (W20−2×W22+W24) is a Laplacian component value (second order differential component value) in the horizontal direction.

The green component value G22 of the pixel P22 can be calculated by subtracting the Laplacian component value multiplied by ½ from the average of the values G21 and G23.

Based on the same concept, the color image interpolation unit 61 obtains the pixel value Gout of the G-component from the values G12, G32, s0, s, and s1.

More specifically, the color image interpolation unit 61 obtains the pixel value Gout of the G-component with the formulae below.

$$t0=(G12+G32)/2$$

$$t1=(s0-2\times s+s1)\times \text{gain2}$$

$$\text{Gout}=t0-t1$$

When gain2 is ½, t1 is a Laplacian component value.

The color image interpolation unit 61 can adjust the value gain2 to adjust the Laplacian component value and thus to adjust the amount of high-frequency component in the pixel value Gout. For example, the color image interpolation unit 61 may adjust the value gain2 (adjust the Laplacian component value) in accordance with the optical characteristics of the imaging unit C1 (e.g., the characteristics of the optical filters included in the imaging unit C1) to perform pixel interpolation processing with a higher quality.

Mgout

The color image interpolation unit 61 performs the processing described below to obtain the pixel value Mgout of the Mg-component. The process for obtaining (calculating) the pixel value Mgout of the Mg-component will now be described with reference to FIG. 25.

Figure 25:
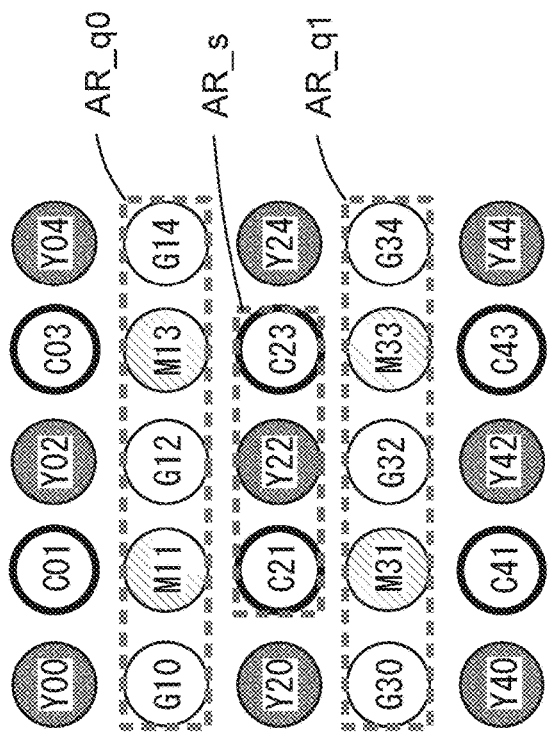
FIG. 25 is a diagram describing pixel interpolation in the horizontal direction (for a color image area) for an image area including a Ye-pixel in the center.

FIG. 25 shows a matrix area of 5×5 pixels including a Ye-pixel as its central pixel (target pixel) as in FIG. 23.

The color image interpolation unit 61 obtains the Mg-component pixel value q0 of the pixel P12 using the pixels P10 to P14 included in the area AR_q0 shown in FIG. 25 through the processing corresponding to the formula below.

$$q0=(P11+P13)/2-(P10-2\times P12+P14)\times \text{gain3}$$

The term (P10−2×P12+P14) is a Laplacian component value, and gain3 is a gain for adjusting the Laplacian component value.

The color image interpolation unit 61 obtains the Mg-component pixel value q1 of the pixel P32 using the pixels P30 to P34 included in the area AR_q1 shown in FIG. 25 through the processing corresponding to the formula below.

$$q1=(P31+P33)/2-(P30-2\times P32+P34)\times \text{gain4}$$

The term (P30−2×P32+P34) is a Laplacian component value, and gain4 is a gain for adjusting the Laplacian component value.

The color image interpolation unit 61 obtains the Mg-component pixel value Mgout of the pixel P22 through the processing corresponding to the formula below.

$$\text{Mgout}=(q0+q1)/2-(s0-2\times s+s1)\times \text{gain5}$$

The term (s0−2×s+s1) is a Laplacian component value, and gain5 is a gain for adjusting the Laplacian component value.

More specifically, the color image interpolation unit 61 obtains the Mg-component value Mgout of the pixel P22 using the Mg-component value q0 of the pixel P12, the Mg-component value q1 of the pixel P32, the R+2G+B-component value s0 of the pixel P12, the R+2G+B-component value s of the pixel P22, and the R+2G+B-component value s1 of the pixel P32, which are obtained based on their high correlations in the horizontal direction. The color image interpolation unit 61 can thus obtain an interpolated pixel value with high accuracy (the Mg-component value Mgout of the pixel P22) using high correlations in the horizontal direction.

For a target pixel having a color component other than a yellow color component, performing processing similar to the above-described processing achieves pixel interpolation with high accuracy.

Vertical Direction Pixel Interpolation (Color Image Area)

When the pixel interpolation method for the target pixel determined by the pixel interpolation method determination unit 5 is the pixel interpolation method intended for a color image area and the correlation direction for the target pixel determined by the pixel interpolation method determination unit 5 is the vertical direction, the color image interpolation unit 61 performs the pixel interpolation processing for the target pixel through the processing corresponding to the formula below. After the pixel interpolation processing, the target pixel will have the pixel value Yeout for its Ye-component, the pixel value Cyout for its Cy-component, the pixel value Gout for its G-component, and the pixel value Mgout for its Mg-component.

V−Ye: When the Target Pixel is Ye-Pixel

When the target pixel is a Ye-pixel, the color image interpolation unit 61 obtains the values Yeout, Cyout, Gout, and Mgout through the processing described below.

Yeout

The color image interpolation unit 61 sets the pixel value Yeout of the Ye-component as the pixel value P22 of the target pixel. In other words, the color image interpolation unit 61 sets the value as Yeout=P22.

Gout

The color image interpolation unit 61 performs the processing described below to obtain the pixel value Gout of the G-component. The process for obtaining (calculating) the pixel value Gout of the G-component will now be described with reference to FIG. 26.

Figure 26:
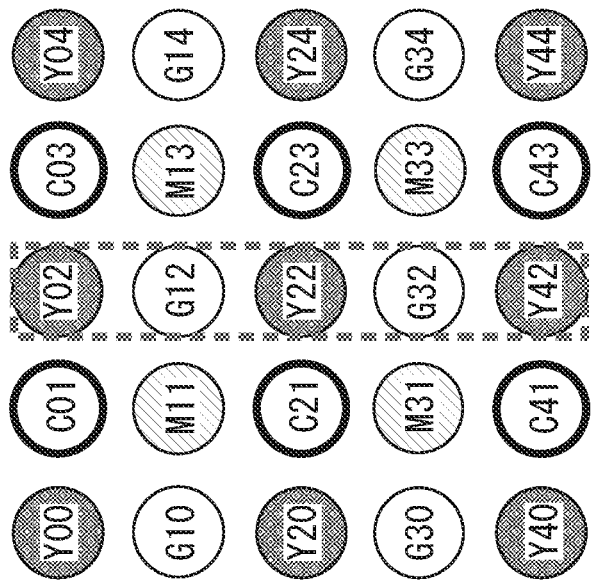
FIG. 26 is a diagram describing pixel interpolation in the vertical direction (for a color image area) for an image area including a Ye-pixel in the center.

FIG. 26 shows a matrix area of 5×5 pixels including a Ye-pixel as its central pixel (target pixel).

The color image interpolation unit 61 obtains the G-component pixel value Gout of the pixel P22 using the five pixels P02, P12, P22, P32, and P42 through the processing described below.

$$\text{Gout}=(P12+P32)/2-(P02-2\times P22+P42)\times \text{gain20}$$

The term (R02−2×R22+R42) is a Laplacian component value, and gain20 is a gain for adjusting the Laplacian component value.

Cyout

The color image interpolation unit 61 obtains the Cy-component pixel value Cyout of the pixel P22 through the processing described below.

Figure 27:
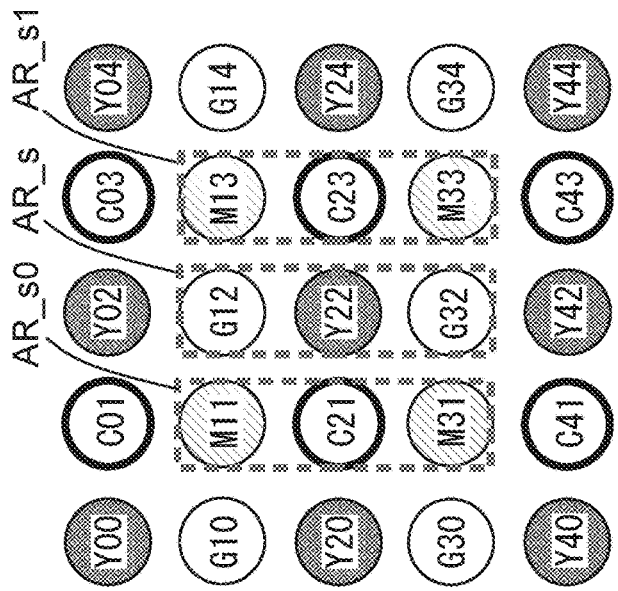
FIG. 27 is a diagram describing pixel interpolation in the vertical direction (for a color image area) for an image area including a Ye-pixel in the center.

The color image interpolation unit 61 obtains the Mg−Cy-component value s0 (=R−G-component value s0) of the pixel P21 using the pixels P11, P21, and P31 included in the area AR_s0 shown in FIG. 27 through the processing corresponding to the formula below.

Note that since Cy=B+G is satisfied, Mg−Cy=(R+B)−(B+G)=R−G is satisfied.

$$s0=kv1\times P21+kv2\{(P11+P31)/2\}+\text{ofsv1}$$

Assuming that kv1=−1, kv2=1, and ofsv1=0, the following formula is satisfied.

$$s0=-P21(P11+P31)/2$$

The pixel P21 is a Cy-component pixel, the pixels P11 and P31 are Mg-component pixels, and thus the above formula is considered to be for calculating the Mg−Cy-component value (=R−G-component value) of the pixel P21.

The color image interpolation unit 61 also obtains the Ye−2G-component value s (=R−G-component value s) of the pixel P22 using the pixels P12, P22, and P32 included in the area AR_s shown in FIG. 27 through the processing corresponding to the formula below.

Note that since Ye=R+B is satisfied, Ye−2G=(R+B)−2G=R−G is satisfied.

$$s=kv3 \times P22+kv4\times\{(P12+P32)/2\}+ofsv2$$

Assuming that kv3=1, kv4=−2, and ofsv2=0, the following formula is satisfied.

$$s=P22-2\times(P12+P32)/2$$

The pixel P22 is a Ye-component pixel, the pixels P12 and P32 are G-component pixels, and thus the above formula is considered to be for calculating the Ye−2G-component value (=R−G-component value) of the pixel P22.

The color image interpolation unit 61 also obtains the Mg−Cy-component value s1 (=R−G-component value s1) of the pixel P23 using the pixels P13, P23, and P33 included in the area AR_s1 shown in FIG. 27 through the processing corresponding to the formula below.

Note that since Mg=R+B and Cy=B+G are satisfied, Mg−Cy=(R+B)−(B+G)=R−G is satisfied.

$$s1=kv5\times P23+kv6\{(P13+P33)/2\}+ofsv3$$

Assuming that kv5=−1, kv6=1, and ofsv3=0, the following formula is satisfied.

$$s1=-P23+(P13+P33)/2$$

The pixel P23 is a Cy-component pixel, the pixels P13 and P33 are Mg-component pixels, and thus the above formula is considered to be for calculating the Mg−Cy-component value (=R−G-component value) of the pixel P23.

As described above, the color image interpolation unit 61 sets the coefficients kv1 to kv6, the offset values ofsv1 to ofsv3 using pixels located in the vertical direction, the pixels having high correlation, such that the pixels are converted so as to have component values defined in the same color space, thereby obtaining the component value s0 of the pixel P21, the component value s of the pixel P22, and the component value s1 of the pixel P23, which are defined in the same color space (in the above, R−G-component values s0, s, and s1).

Through processing corresponding to the following formulas, the component values (in the above, R−G component values) s0, s, and s1 of the pixels P21, P22, and P23, which are defined in the same color space, may be adjusted with values for adjustment, and the adjusted values may be set as the component values (in the above, R−G component values) s0, s, and s1 of the pixels P21, P22, and P23, which are defined in the same color space.

$$s0=s0/gvs$$

$$s=s/gvs$$

$$s1=s1/gvs$$

In the above, the coefficients kv1 to kv6 and the offset values ofsv1 to ofsv3 are set such that the pixels are converted so as to have R−G component values s0, s, and s1. However, the present invention should not be limited to this case; through any other color space conversion, the values s0, s, s1 may be obtained such that the pixels are converted so as to have component values defined in any other color space.

In other words, the color image interpolation unit 61 sets the coefficients kv1 to kv6 and the offset values ofsv1 to ofsv3 using pixels located in the vertical direction, the pixels having high correlation, such that the pixels are converted so as to have component values defined in the same color space, in consideration of a pattern of color filters, thereby allowing for obtaining the component value s0 of the pixel P21, the component value s of the pixel P22, and the component value s1 of the pixel P23, which are defined in the same color space, regardless of how a pattern of color filters is. The Mg−Cy-component value s0 (=R−G-component value s0) of the pixel P21, the Ye−2G-component value s (=R−G-component value s) of the pixel P22, and the Mg−Cy-component value s1 (=R−G-component value s1) of the pixel P32 are calculated through processing corresponding to the following formulas.

$$s0=-P21+(P11+P31)/2$$

$$s=P22-2\times(P12+P32)/2$$

$$s1=-P23+(P13+P33)/2$$

The color image interpolation unit 61 obtains R-component value Rout of the pixel P22 through processing corresponding to the following formula.

$$Rout=(R21+R23)/2-(s0-2\times s+s1)\times gain21$$

The term (s0−2×s+s1) is a Laplacian component value, and gain21 is a gain for adjusting the Laplacian component value.

Mgout

The color image interpolation unit 61 performs the processing described below to obtain the pixel value Mgout of the Mg-component. The process for obtaining (calculating) the pixel value Mgout of the Mg-component will now be described with reference to FIG. 28.

Figure 28:
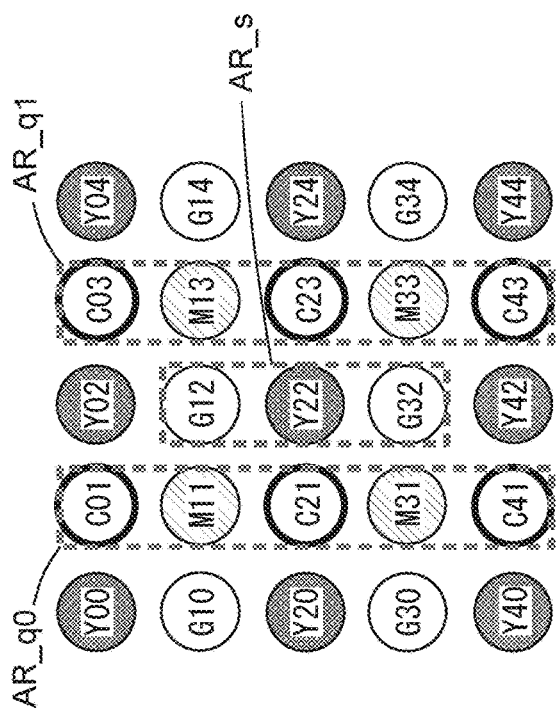
FIG. 28 is a diagram describing pixel interpolation in the vertical direction (for a color image area) for an image area including a Ye-pixel in the center.

Similar to FIG. 26, FIG. 28 shows a matrix area of 5×5 pixels including a Ye-pixel as its central pixel (target pixel).

The color image interpolation unit 61 obtains the Mg-component value q0 of P21 using the pixels P01 to P41 included in the area AR_q0 shown in FIG. 28 through the processing described below.

$$q0=(P11+P31)/2-(P01-2\times P21+P41)\times gainv3$$

The term (P01−2×P21+P41) is a Laplacian component value, and gainv3 is a gain for adjusting the Laplacian component value.

The color image interpolation unit 61 obtains the Mg-component value q1 of P23 using the pixels P03 to P43 included in the area AR_q1 shown in FIG. 28 through the processing described below.

$$q1=(P13+P33)/2-(P03-2\times P23+P43)\times gainv4$$

The term (P03−2×P23+P43) is a Laplacian component value, and gainv4 is a gain for adjusting the Laplacian component value.

The color image interpolation unit 61 then obtains the Mg-component value Mgout of the pixel P22 through the processing described below.

$$Mgout=(q0+q1)/2-(s0-2\times s+s1)\times gainv5$$

The term (s0−2×s+s1) is a Laplacian component value, and gainv5 is a gain for adjusting the Laplacian component value.

More specifically, the color image interpolation unit 61 obtains the Mg-component value Mgout of the pixel P22 using the Mg-component value q0 of the pixel P21, the Mg-component value q1 of the pixel P23, the R–G-component value s0 of the pixel P21, the R–G-component value s of the pixel P22, and the R–G-component value s1 of the pixel P23, which are obtained based on their high correlations in the vertical direction. The color image interpolation unit 61 can thus obtain an interpolated pixel value with high accuracy (the Mg-component value Mgout of the pixel P22) using high correlations in the vertical direction.

For a target pixel having a color component other than a yellow color component, performing processing similar to the above-described processing achieves pixel interpolation with high accuracy.

First Diagonal Direction Pixel Interpolation (Color Image Area)

When the pixel interpolation method for the target pixel determined by the pixel interpolation method determination unit 5 is the pixel interpolation method intended for a color image area and the correlation direction for the target pixel determined by the pixel interpolation method determination unit 5 is the first diagonal direction, the color image interpolation unit 61 performs the pixel interpolation processing for the target pixel through the processing corresponding to the formula below. After the pixel interpolation processing, the target pixel will have the pixel value Yeout for its Ye-component, the pixel value Cyout for its Cy-component, the pixel value Gout for its G-component, and the pixel value Mgout for its Mg-component.

D1-Ye: When the Target Pixel is Ye-Pixel

When the target pixel is a Ye-pixel, the color image interpolation unit 61 obtains the values Yeout, Cyout, Gout, and Mgout through the processing described below.

Yeout

The color image interpolation unit 61 sets the pixel value Yeout of the Ye-component as the pixel value P22 of the target pixel. In other words, the color image interpolation unit 61 sets the value as Yeout=P22.

Mgout

The color image interpolation unit 61 performs the processing described below to obtain the pixel value Mgout of the Mg-component. The process for obtaining (calculating) the pixel value Mgout of the Mg-component will now be described with reference to FIG. 29.

Figure 29:
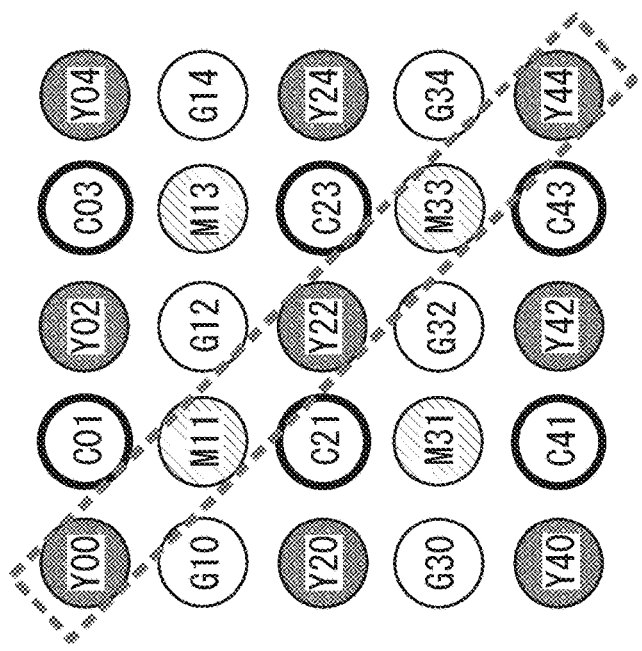
FIG. 29 is a diagram describing pixel interpolation in the first diagonal direction (for a color image area) for an image area including a Ye-pixel in the center.

FIG. 29 shows a matrix area of 5×5 pixels including a G-pixel as its central pixel (target pixel).

The color image interpolation unit 61 obtains the Mg-component pixel value Mgout of the pixel P22 using the five pixels P00, P11, P22, P33, and P44 through the processing described below.

$$Mgout=(P11+P33)/2-(P00-2\times P22+P44)\times gain40$$

The term (P00−2×P22+P44) is a Laplacian component value, and gain40 is a gain for adjusting the Laplacian component value.

Gout

The color image interpolation unit 61 obtains the G-component pixel value Gout of the pixel P22 through the processing described below.

Figure 30:
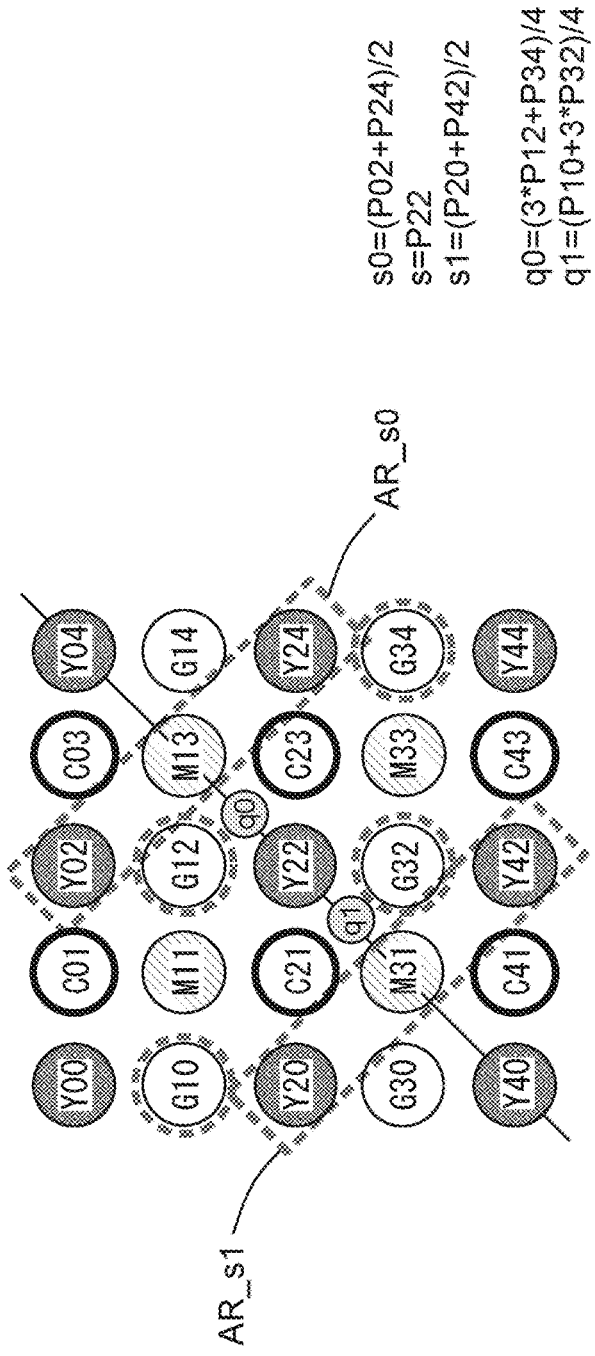
FIG. 30 is a diagram describing pixel interpolation in the first diagonal direction (for a color image area) for an image area including a Ye-pixel in the center.

As shown in FIG. 30, the color image interpolation unit 61 calculates the Ye-component value s0 of the pixel P13, the Ye-component value s of the pixel P22, and the Ye-component value s1 of the pixel P31 through the processing corresponding to the formulas below.

$$s0=(P02+P24)/2$$

$$s=P22$$

$$s1=(P20+P42)/2$$

The color image interpolation unit 61 obtains the G-component q0 of the midpoint between the pixels P13 and P22 and the G-component q1 of the midpoint between the pixels P22 and P31 as shown in FIG. 30 through the processing (internal division processing) corresponding to the formulas below.

$$q0=(3\times P12+P34)/4$$

$$q1=(P10+3\times P32)/4$$

The color image interpolation unit 61 then obtains the G-component Gout of the pixel P22 through the processing corresponding to the formulas below.

$$Gout=(q0+q1)/2-(s0-2\times s+s1)\times gain41$$

The term (s0−2×s+s1) is a Laplacian component value, and gain41 is a gain for adjusting the Laplacian component value.

In this manner, the color image interpolation unit 61 obtains the G-component value Gout of the pixel P22 using (1) the same color components (in the above case, Ye-component value) s0, s, and s1, which are obtained based on their high correlations in the first diagonal direction, and (2) the same color components (in the above case, G-component value) q0 and q1, which are obtained based on their high correlations in the first diagonal direction. The color image interpolation unit 61 can thus obtain an interpolated pixel value with high accuracy (the G-component value Gout of the pixel P22) using high correlations in the first diagonal direction.

Cyout

Figure 31:
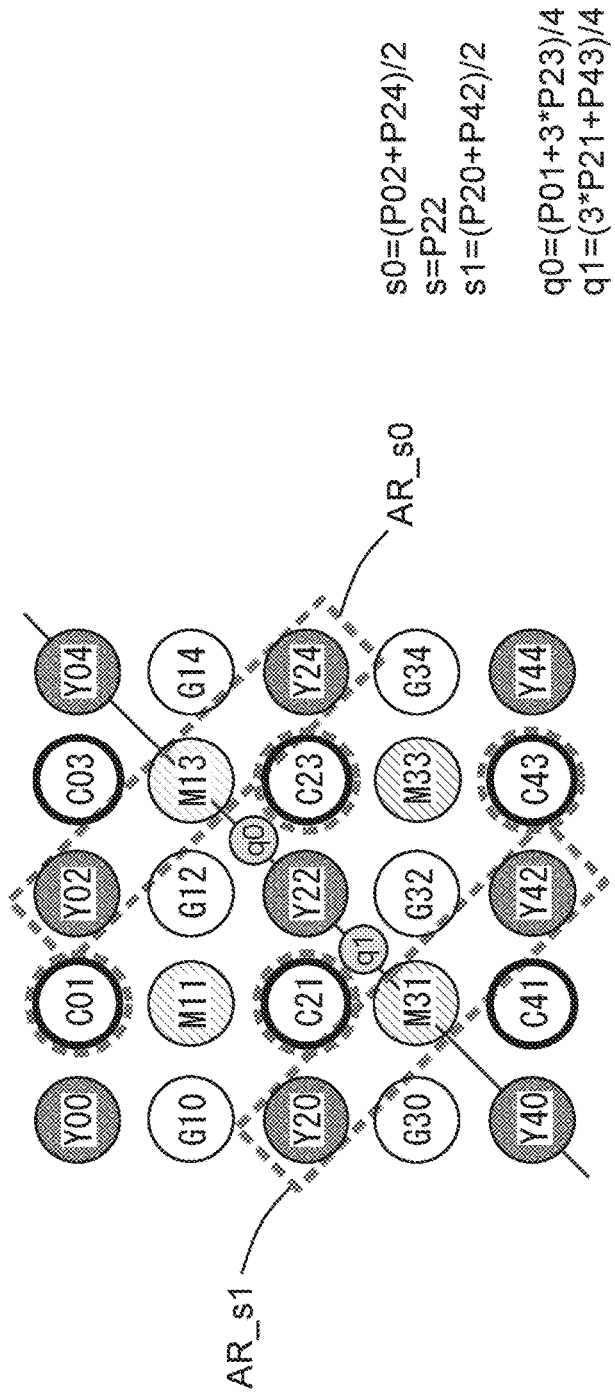
FIG. 31 is a diagram describing pixel interpolation in the first diagonal direction (for a color image area) for an image area including a Ye-pixel in the center.

As shown in FIG. 31, the color image interpolation unit 61 calculates the Ye-component value s0 of the pixel P13, the Ye-component value s of the pixel P22, and the Ye-component value s1 of the pixel P31 through the processing corresponding to the formulas below.

$$s0=(P02+P24)/2$$

$$s=P22$$

$$s1=(P20+P42)/2$$

The color image interpolation unit 61 also obtains the Cy-component q0 of the midpoint between the pixels P13 and P22 and the Cy-component q1 of the midpoint between the pixels P22 and P31 as shown in FIG. 31 through the processing (internal division processing) corresponding to the formulas below.

$$q0=(P01+3\times P23)/4$$

$$q1=(3\times P21+P43)/4$$

The color image interpolation unit 61 then obtains the Cy-component Cyout of the pixel P22 through the processing corresponding to the formulas below.

$$Cyout=(q0+q1)/2-(s0-2\times s+s1)\times gain42$$

The term (s0−2×s+s1) is a Laplacian component value, and gain42 is a gain for adjusting the Laplacian component value.

In this manner, the color image interpolation unit 61 obtains the Cy-component value Cyout of the pixel P22 using (1) the same color components (in the above case, Ye-component value) s0, s, and s1, which are obtained based on their high correlations in the first diagonal direction, and (2) the same color components (in the above case, Cy-component value) q0 and q1, which are obtained based on their high correlations in the first diagonal direction. The color image interpolation unit 61 can thus obtain an interpolated pixel value with high accuracy (the Cy-component value Cyout of the pixel P22) using high correlations in the first diagonal direction.

For a target pixel having a color component other than a yellow color component, performing processing similar to the above-described processing achieves pixel interpolation with high accuracy.

Second Diagonal Direction Pixel Interpolation (Color Image Area)

When the pixel interpolation method for the target pixel determined by the pixel interpolation method determination unit 5 is the pixel interpolation method intended for a color image area and the correlation direction for the target pixel determined by the pixel interpolation method determination unit 5 is the second diagonal direction, the color image interpolation unit 61 performs the pixel interpolation processing for the target pixel through the processing corresponding to the formula below. After the pixel interpolation processing, the target pixel will have the pixel value Yeout for its Ye-component, the pixel value Cyout for its Cy-component, the pixel value Gout for its G-component, and the pixel value Mgout for its Mg-component.

D2-Ye: When the Target Pixel is Ye-Pixel

When the target pixel is a Ye-pixel, the color image interpolation unit 61 obtains the values Yeout, Cyout, Gout, and Mgout through the processing described below.

Yeout

The color image interpolation unit 61 sets the pixel value Yeout of the Ye-component as the pixel value P22 of the target pixel. In other words, the color image interpolation unit 61 sets the value as Yeout=P22.

Mgout

The color image interpolation unit 61 performs the processing described below to obtain the pixel value Mgout of the Mg-component.

The process for obtaining (calculating) the pixel value Mgout of the Mg-component will now be described with reference to FIG. 32.

Figure 32:
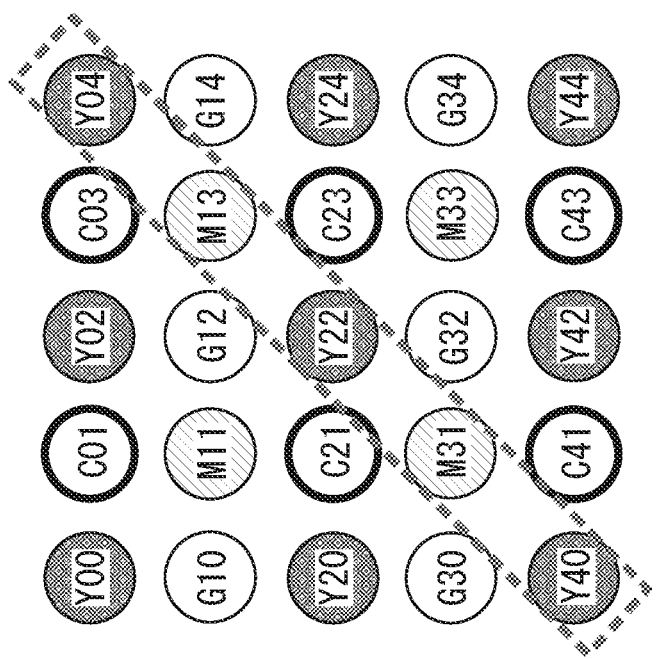
FIG. 32 is a diagram describing pixel interpolation in the second diagonal direction (for a color image area) for an image area including a Ye-pixel in the center.

FIG. 32 shows a matrix area of 5×5 pixels including a G-pixel as its central pixel (target pixel).

The color image interpolation unit 61 obtains the Mg-component pixel value Mgout of the pixel P22 using the five pixels P04, P13, P22, P31, and P40 through the processing described below.

$$Mgout=(P13+P31)/2-(P04-2\times P22+P40)\times gain50$$

The term (P04−2×P22+P40) is a Laplacian component value, and gain50 is a gain for adjusting the Laplacian component value.

Gout

The color image interpolation unit 61 obtains the G-component pixel value Gout of the pixel P22 through the processing described below.

Figure 33:
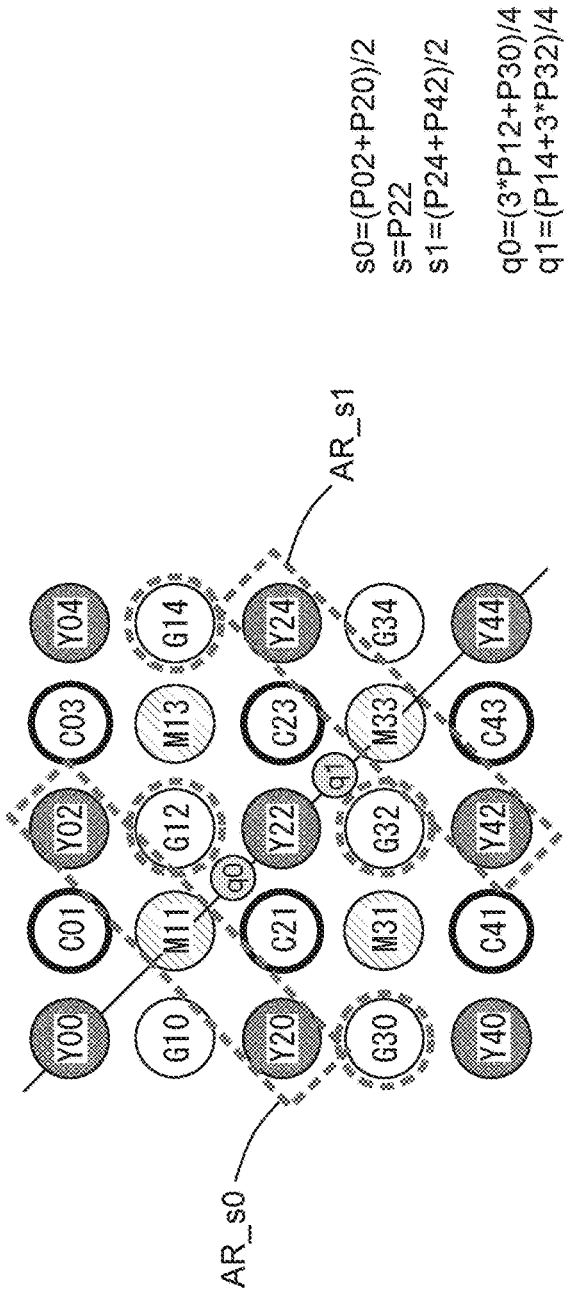
FIG. 33 is a diagram describing pixel interpolation in the second diagonal direction (for a color image area) for an image area including a Ye-pixel in the center.

As shown in FIG. 33, the color image interpolation unit 61 calculates the Ye-component value s0 of the pixel P11, the Ye-component value s of the pixel P22, and the Ye-component value s1 of the pixel P33 through the processing corresponding to the formulas below.

$$s0=(P02+P20)/2$$

$$s=P22$$

$$s1=(P24+P42)/2$$

The color image interpolation unit 61 obtains the G-component q0 of the midpoint between the pixels P11 and P22 and the G-component q1 of the midpoint between the pixels P22 and P33 as shown in FIG. 33 through the processing (internal division processing) corresponding to the formulas below.

$$q0=(3\times P12+P30)/4$$

$$q1=(P14+3\times P32)/4$$

The color image interpolation unit 61 then obtains the G-component Gout of the pixel P22 through the processing corresponding to the formulas below.

$$Gout=(q0+q1)/2-(s0-2\times s+s1)\times gain51$$

The term (s0−2×s+s1) is a Laplacian component value, and gain51 is a gain for adjusting the Laplacian component value.

In this manner, the color image interpolation unit 61 obtains the G-component value Gout of the pixel P22 using (1) the same color components (in the above case, Ye-component value) s0, s, and s1, which are obtained based on their high correlations in the second diagonal direction, and (2) the same color components (in the above case, G-component value) q0 and q1, which are obtained based on their high correlations in the second diagonal direction. The color image interpolation unit 61 can thus obtain an interpolated pixel value with high accuracy (the G-component value Gout of the pixel P22) using high correlations in the second diagonal direction.

Cyout

Figure 34:
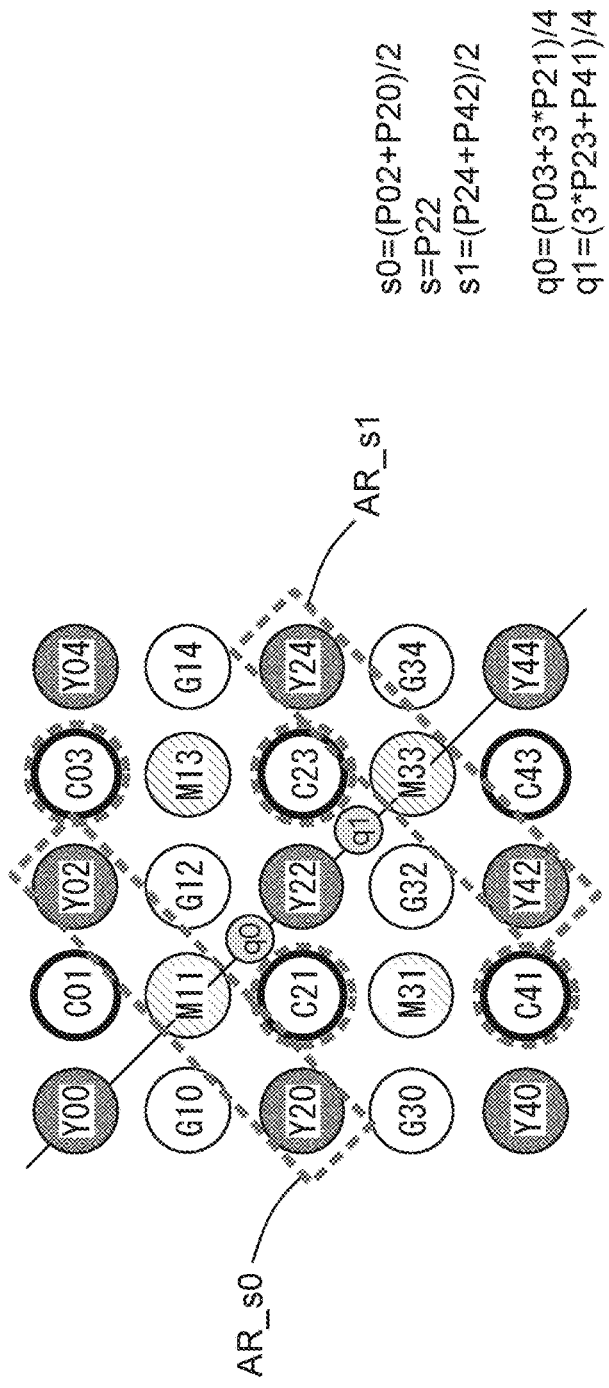
FIG. 34 is a diagram describing pixel interpolation in the second diagonal direction (for a color image area) for an image area including a Ye-pixel in the center.

As shown in FIG. 34, the color image interpolation unit 61 calculates the Ye-component value s0 of the pixel P11, the Ye-component value s of the pixel P22, and the Ye-component value s1 of the pixel P33 through the processing corresponding to the formulas below.

$$s0=(P02+P20)/2$$

$$s=P22$$

$$s1=(P24+P42)/2$$

The color image interpolation unit 61 also obtains the Cy-component q0 of the midpoint between the pixels P11 and P22 and the Cy-component q1 of the midpoint between the pixels P22 and P33 as shown in FIG. 34 through the processing (internal division processing) corresponding to the formulas below.

$$q0=(P03+3\times P21)/4$$

$$q1=(3\times P23+P41)/4$$

The color image interpolation unit 61 then obtains the Cy-component Cyout of the pixel P22 through the processing corresponding to the formulas below.

$$Cyout=(q0+q1)/2-(s0-2\times s+s1)\times gain52$$

The term (s0−2×s+s1) is a Laplacian component value, and gain52 is a gain for adjusting the Laplacian component value.

In this manner, the color image interpolation unit 61 obtains the Cy-component value Cyout of the pixel P22 using (1) the same color components (in the above case, Ye-component value) s0, s, and s1, which are obtained based on their high correlations in the second diagonal direction, and (2) the same color components (in the above case, Cy-component value) q0 and q1, which are obtained based on their high correlations in the second diagonal direction. The color image interpolation unit 61 can thus obtain an interpolated pixel value with high accuracy (the Cy-component value Cyout of the pixel P22) using high correlations in the second diagonal direction.

For a target pixel having a color component other than a yellow color component, performing processing similar to the above-described processing achieves pixel interpolation with high accuracy.

Median Interpolation (Color Image Area)

When the pixel interpolation method for the target pixel determined by the pixel interpolation method determination unit 5 is the pixel interpolation method for a color image area and the target pixel is determined by the pixel interpolation method determination unit 5 to have correlation in none of the directions, the color image interpolation unit 61 performs the pixel interpolation processing for the target pixel through the processing corresponding to the formula below.

After the pixel interpolation processing, the target pixel will have the pixel value Yeout for its Ye-component, the pixel value Cyout for its Cy-component, the pixel value Gout for its G-component, and the pixel value Mgout for its Mg-component.

M–Ye: When the Target Pixel is Ye-Pixel

When the target pixel is a Ye-pixel, the color image interpolation unit 61 obtains the values Yeout, Cyout, Gout, and Mgout through the processing described below.

$$Gout=medium(P12,P32,(P10+P30+P12+P32)/4,(P12+P32+P14+P34)/4)$$

$$Cyout=medium(P21,P23,(P01+P03+P21+P23)/4,(P21+P23+P41+P43)/4)$$

$$Yeout=P22$$

$$Mgout=medium(P11,P13,P31,P33)$$

In these formulas, medium( ) is a function that returns a median value. The function medium( ) returns the average of the two values in the middle in numerical order when the number of elements is an even number.

For a target pixel having a color component other than a yellow color component, performing processing similar to the above-described processing achieves median interpolation with high accuracy.

Average Interpolation (Color Image Area)

When the pixel interpolation method for the target pixel determined by the pixel interpolation method determination unit 5 is the pixel interpolation method intended for a color image area and the target pixel is determined by the pixel interpolation method determination unit 5 to have high correlation in both of the vertical and horizontal directions, the color image interpolation unit 61 performs the pixel interpolation processing for the target pixel through the processing corresponding to the formulas below.

Ave–Ye: When the Target Pixel is Ye-Pixel

When the target pixel is a Ye-pixel, the color image interpolation unit 61 obtains the values Yeout, Cyout, Gout, and Mgout through the processing described below.

$$Gout=(P12+P32)/2$$

$$Cyout=(P21+P23)/2$$

$$Yeout=P22$$

$$Mgout=(P11+P13+P31+P33)/4$$

For a target pixel having a color component other than a yellow color component, performing processing similar to the above-described processing achieves average interpolation for color image areas with high accuracy.

Through the above processing, the color image interpolation unit 61 obtains the values Yeout, Cyout, Gout, and Mgout for each pixel. An image formed using the values Yeout, Cyout, Gout, and Mgout (image signals having the four color component values for each pixel, or the Ye-component value, the Mg-component value, the G-component value, and the Cy-component value) is output to the selection unit 64.

The selection unit 64 selects either the image signal output from the signal inverse correction unit 63 or the image signal output from the color image interpolation unit 61 based on information Co_Dir about the correlation direction and information P_Mthd about the pixel interpolation method, which are output from the pixel interpolation method determination unit 5. The selected image signal is output to the correction processing unit 7 as an image signal D2.

For example, when the correlation direction is the vertical direction and the pixel interpolation method is the pixel interpolation method intended for a color image area, an image signal obtained by performing the pixel interpolation method intended for a color image area with the correlation direction be set to the vertical direction is selected by the selection unit 64, and then is output to the correction processing unit 7.

Note that the interpolation unit 6 may be configured such that an image signal is output from the interpolation unit 6 to the correction processing unit 7; the image signal is obtained by a pixel interpolation method determined by information P_Mthd about the pixel interpolation method, which is output from the pixel interpolation method determination unit 5, using a correlation direction determined by information Co_Dir about the correlation direction, which is output from the pixel interpolation method determination unit 5. In other words, the configuration of the interpolation unit 6 should not be limited to the configuration shown in FIG. 1; it may be other configurations.

Alternatively, the interpolation unit 6 may be configured such that only pixel interpolation is performed that is determined by information Co_Dir about the correlation direction and the information P_Mthd about the pixel interpolation method, which are output from the pixel interpolation method determination unit 5.

1.2.7: Processing in the Correction Processing Unit 7

Next, processing in the correction processing unit 7 will be described.

The first matrix transformation unit 71 of the correction processing unit 7 performs matrix transformation processing on the input image signal D3 to convert the input image signal D2 into an image signal in the RGB color space.

More specifically, assuming that color1, color2, color3 and color 4 are respectively a first color component pixel signal, a second color component pixel signal, a third color component pixel signal and fourth color component pixel signal of the image signal, the first matrix transformation unit 71 obtains R-component pixel signal, G-component pixel signal, and B-component pixel signal through processing corresponding to the following formula.

Formula 3

$$\begin{pmatrix} R \\ G \\ B \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \end{pmatrix} \begin{pmatrix} color1 \\ color2 \\ color3 \\ color4 \end{pmatrix} + \begin{pmatrix} \text{offset\_R} \\ \text{offset\_G} \\ \text{offset\_B} \end{pmatrix} \quad (3)$$

Note that a11 to a34 are elements of the transformation matrix for performing color space conversion, and offset_R, offset_G, and, offset_B are offset values.

In this embodiment, color 1 to color 4 are set as follows:

color1=Ye color2=Cy color3=G color4=Mg

Thus, the elements a11 to a34 of the transformation matrix are determined to convert the Ye-Cy-G-Mg color space to the RGB color space.

The first matrix transformation unit 71 determines the transformation matrix in accordance with colors of a four-color array filter, thereby obtaining an R-component pixel signal, a G-component pixel signal, and a B-component pixel signal regardless of how a pattern of the four-color array filter is.

An image signal formed by the R-component pixel signal, the G-component pixel signal and the B-component pixel signal, which are obtained through the above processing, is transmitted, as an image signal D3, from the first matrix transformation unit 71 to the color space processing unit 72 and the saturation obtaining unit 73.

When the image signal includes W-common pixel signal (White-color pixel signal), the first matrix transformation unit 71 transmits the input W-component pixel signal to the color space processing unit 72.

The color space processing unit 72 converts the image signal D3 of RGB color space (or WRGB color space) output from the first matrix transformation unit 71 to an image signal D4 of YCbCr color space.

Processing in the color space processing unit 72 will now be described in detail.

The luminance signal obtaining unit 721 of the color space processing unit 72, as shown in FIG. 3A, receives the R-component pixel signal, the G-component pixel signal, and the B-component pixel signal, which are output from the first matrix transformation unit 71. The luminance signal obtaining unit 721 then obtains a luminance signal Y0 through processing corresponding to the following formula.

Y0=0.299×R+0.587×G+0.114×B

Note that R, G and B are an R-color component value, a G-color component value and a B-color component value of the target pixel, respectively.

The selection signal generation unit 722 generates a selection signal from information about the correlation direction and information about the pixel interpolation method for each pixel, which are output from the pixel interpolation method determination unit 5. More specifically, the selection signal is generated as described below. Although not shown in FIG. 3A, it is assumed that information about a color component of the target pixel (pixel to be processed) is input to the selection signal generation unit 722.

When the four-color array filter contains a W-component color filter, the selection signal generation unit 722 and the luminance signal output unit 723 performs the following processing.

(1) When the target pixel is a pixel other than a W pixel, the correlation direction is either the first diagonal direction or the second diagonal direction, and the target pixel is adjacent to a W pixel in the first diagonal direction or the second diagonal direction, the selection signal generation unit 722 outputs a selection signal that indicates selecting the W signal to the luminance signal output unit 723. Conversely, when the correlation direction is a direction other than directions in the above, the selection signal generation unit 722 outputs a selection signal that indicates selecting the Y0 signal to the luminance signal output unit 723.

(2) When the target pixel is a pixel other than a W pixel, the correlation direction is the vertical direction, and the target pixel is adjacent to a W pixel in the vertical direction, the selection signal generation unit 722 outputs a selection signal that indicates selecting the W signal to the luminance signal output unit 723. Conversely, when the correlation direction is a direction other than directions in the above, the selection signal generation unit 722 outputs a selection signal that indicates selecting the Y0 signal to the luminance signal output unit 723.

(3) When the target pixel is a pixel other than a W pixel, the correlation direction is the horizontal direction, and the target pixel is adjacent to a W pixel in the horizontal direction, the selection signal generation unit 722 outputs a selection signal that indicates selecting the W signal to the luminance signal output unit 723. Conversely, when the correlation direction is a direction other than directions in the above, the selection signal generation unit 722 outputs a selection signal that indicates selecting the Y0 signal to the luminance signal output unit 723.

(4) When the target pixel is a W pixel, the selection signal generation unit 722 always outputs a selection signal that indicates selecting the W signal to the luminance signal output unit 723.

(5) When it is determined that the target pixel has correlation in none of the directions (when the median interpolation is performed for the pixel interpolation processing), the selection signal is set to be a signal indicating that the average value of the W signal and the Y0 signal is output from the luminance signal output unit.

As described above, the luminance signal output unit 723 generates a Y signal (Y-component signal) from the W signal (W-component signal) and the Y0 signal (Y0-component signal) in accordance with the selection signal generated by the selection signal generation unit 722, and then outputs the generated Y signal (Y-component signal) to the second matrix transformation unit 75.

As described above, the color space processing unit 72 sets, to the Y-component signal (Y-component pixel signal), W-component signal when the four-color array filter contains a W-component color filter, and the W-component value of the target pixel is obtained from a W pixel. In other cases, the color space processing unit 72 sets, to the Y-component signal (Y-component pixel signal), the luminance signal Y0 obtained by converting the R-component value, the G-component value and the B-component value. Thus, the color space processing unit 72 can obtain the accurate luminance signal component (Y-component pixel signal).

In addition, the color space processing unit 72 obtains Cb-component signal (Cb-component pixel signal) and Cr-component signal (Cr-component pixel signal) from Y signal (Y-component signal), R-component signal (R-component pixel signal), and B-component signal (B-component pixel signal), using the subtracters 724 and 726, and the gain adjusters 725 and 727. The Cb-component pixel signal and Cr-component pixel signal are obtained from the accurate Y-component pixel signal, thus making the Cb-component pixel signal and Cr-component pixel signal accurate.

Note that the color space processing unit 72 may be structured as shown in FIG. 3B. In this case, the R-component pixel signals, the G-component pixel signal and the B-component pixel signal, which are output from the first matrix transformation unit 71, are input to the color space conversion unit 721A. The color space conversion unit 721A then obtains the luminance component pixel signal Y0, the Cb-component pixel signal, and Cr-component pixel signal through processing (RGB–YCbCr color space conversion processing) corresponding to the following formulas.

$$Y0 = 0.299 \times R + 0.587 \times G + 0.114 \times B$$

$$Cr = 0.500 \times R - 0.419 \times G - 0.081 \times B$$

$$Cb = -0.169 \times R - 0.332 \times G + 0.500 \times B$$

The luminance component pixel signal Y0 obtained through the above-described processing is output from the color space conversion unit 721A to the luminance signal output unit 723, and then is subjected to processing similar to the above-described processing in the luminance signal output unit 723. In addition, the Cb-component pixel signal obtained through the above-described processing are output from the color space conversion unit 721A to the color difference correction unit 74.

The saturation obtaining unit 73 obtains a saturation value S from the R-component pixel signal, the G-component pixel signal and the B-component pixel signal, which are included in the image signal D3 output from the first matrix transformation unit 71.

More specifically, the saturation obtaining unit 73 obtains a saturation value S, for each pixel, from the R-component pixel signal, the G-component pixel signal and the B-component pixel signal through processing for converting the RGB color space to the HSV color space (H: Hue, S: Saturation, V: Value).

The saturation value S (saturation signal S) obtained by the saturation obtaining unit 73 for each pixel is output to the color difference correction unit 74.

The color difference correction unit 74 performs color difference correction processing on the Cb-component pixel signal and the Cr-component pixel signal, which are output from the color space processing unit 72, based on the saturation value S output from the saturation obtaining unit 73.

More specifically, the color difference correction unit 74 compares the saturation value S with a threshold THs.

(1) If S>THs is satisfied, the color difference correction unit 74 sets the Cb-component pixel signal Cb' and the Cr-component pixel signal Cr' as Cb'=Cb and Cr'=Cr, and then outputs the Cb-component pixel signal Cb' and the Cr-component pixel signal Cr' to the second matrix transformation unit 75.

(2) If S≤THs is satisfied, the color difference correction unit 74 sets the Cb-component pixel signal Cb' and the Cr-component pixel signal Cr' as Cb'=ks×Cb and Cr'=ks×Cr (0≤ks≤1) and then outputs the Cb-component pixel signal Cb' and the Cr-component pixel signal Cr' to the second matrix transformation unit 75.

In this case (in a case when S≤THs), the color difference correction unit 74 may set the Cb-component pixel signal Cb' and the Cr-component pixel signal Cr' as Cb'=0 and Cr'=0 (may set the Cb-component value and the Cr-component value to "0" (signal with no color)), and then may output the Cb-component pixel signal Cb' and the Cr-component pixel signal Cr' to the second matrix transformation unit 75.

Alternatively, (if a S≤THs) in the above case (in a case when S≤THs), the color difference correction unit 74 may set the Cb-component pixel signal Cb' and the Cr-component pixel signal Cr' as Cb'=f(Cb) and Cr'=f(Cr), and then may output the Cb-component pixel signal Cb' and the Cr-component pixel signal Cr' to the second matrix transformation unit 75. Note that the function f (x) may be any function that reduces the level of the input signal x.

As described above, the color difference correction unit 74, based on the highly accurate saturation value S obtained by using the image signal D3 after accurate pixel interpolation processing, performs the correction of the color difference component pixel signals, thereby reducing side effects, such as false color occurrence, appropriately.

The pixel interpolation processing unit 100 performs calculation of the saturation evaluation value, calculation of the grayscale correlation value, and interpolation for a grayscale image, using the image signal D1 subjected to the correction of the signal level in the signal correction unit 1. Further, in the interpolation for a color image, the pixel interpolation processing unit 100 performs pixel interpolation using a Laplacian component in consideration of the correlation direction, thus achieving highly accurate interpolation.

In other words, the pixel interpolation processing unit 100 can perform highly accurate pixel interpolation processing as described above, and thus obtain the image signal D2 after highly accurate pixel interpolation.

The saturation obtaining unit 73 then calculates a saturation value S using the image signal D2 after the high pixel interpolation processing, thereby allowing the saturation value S to be obtained with high accuracy. Further, through the correction processing of the color difference signals as described above based on such a highly accurate saturation value S by the color difference correction unit 74, the color component of the target pixel is appropriately reduced when the target pixel is likely to be included in the grayscale image area. This appropriately prevents side effects, such as false colors, from occurring.

The color difference component signals Cb' and Cr' obtained through the color difference correction processing as described above is output to the second matrix transformation unit 75.

The second matrix transformation unit 75 subjects the Y-component pixel signal output from the color space processing unit 72 and the corrected Cb-component pixel signal output from the color difference correction unit 74 to processing for converting the YCbCr color space into the RGB color space. In other words, the second matrix transformation unit 75 performs processing that converts a signal in the YCbCr color space into a signal in the RGB color space.

The signal Dout including the R-component pixel signal, the G-component pixel signal, and the B-component pixel signal obtained through the above-described color space conversion is output from the second matrix transformation unit 75.

As described above, in the imaging apparatus 1000, the signal correction unit 1 corrects the level of the signal in consideration of a pattern of the four-color filter, and then calculates a saturation evaluation value and a grayscale correlation value using the corrected image signal D1. In the imaging apparatus 1000, the pixel interpolation method determination unit 5 determines a correlation direction and a pixel interpolation method using the four color correlation values Cx_color obtained through the color correlation value calculation processing, the four grayscale correlation values Cx_gray, and the saturation evaluation coefficient KL. In the imaging apparatus 1000, the interpolation unit 6 performs, with the determined correlation direction and the determined pixel interpolation method, either the pixel interpolation for the color image or the pixel interpolation for the grayscale image using a Laplacian component in consideration of the correlation direction. The pixel interpolation using the Laplacian component performs color space conversion, depending on a pattern of the four-color filter of the imaging unit C1, in appropriate consideration of the ratio of change in the correlation direction to obtain color component values which are defined in the same color space. This achieves highly accurate pixel interpretation regardless of how a pattern of the four-color filter is.

As described above, the imaging apparatus 1000 obtains the image signal D2 processed through the highly accurate pixel interpretation regardless of how a pattern of the four-color filter of the imaging unit C1 is.

Furthermore, the imaging apparatus 1000 obtains the highly accurate saturation value S using the image signal D2 processed through the highly accurate pixel interpolation, and then corrects the color difference pixel signal of the image signal of the YCbCr color space, which is obtained from the image signal processed through the highly accurate pixel interpretation. This appropriately prevents side effects, such as false colors, from occurring.

As described above, the imaging apparatus 1000 appropriately performs pixel interpretation regardless of how a pattern of the four-color filter of the imaging unit C1 is.

Second Embodiment

A second embodiment will now be described.

The components in the present embodiment that are the same as the components described in the above embodiment will be given the same reference numerals as those components and will not be described in detail.

Figure 35:
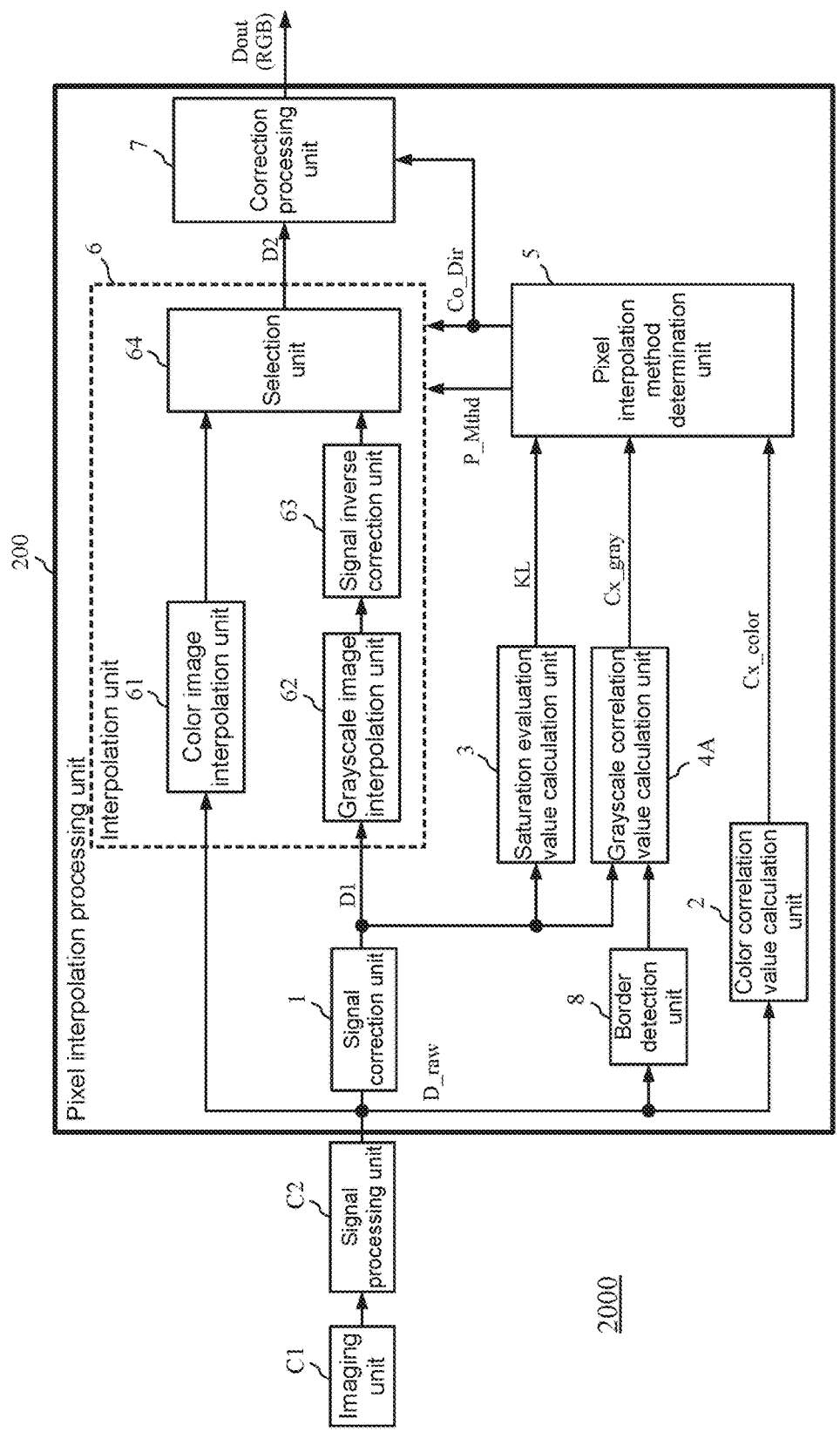
FIG. 35 is a schematic diagram of an imaging apparatus 2000 according to a second embodiment.

FIG. 35 is a schematic diagram of an imaging apparatus 2000 according to the second embodiment.

The imaging apparatus 2000 includes a pixel interpretation processing unit 200 replacing the pixel interpretation processing unit 100 of the imaging apparatus 1000 of the first embodiment.

The pixel interpolation processing unit 200 includes a grayscale correlation value calculation unit 4A replacing the grayscale correlation value calculation unit 4 of the pixel interpretation processing unit 100, and furthermore adds a border detection unit 8 to the pixel interpretation processing unit 100.

The border detection unit 8 receives an image signal D_raw (image D_raw) and detects a border region between a grayscale image area and a color image area in the input image D_raw. The border detection unit 8 then outputs information about the detected border region between the grayscale image area and the color image area to the grayscale correlation value calculation unit 4A.

The grayscale correlation value calculation unit 4A receives the image signal D1 output from the signal correction unit 1 and the information about the detected border region between the grayscale image area and the color image area, which is output from the border detection unit 8.

2.1 Calculating Correlation Values for Grayscale Image Area

Processing for calculating a correlation value for a grayscale image area performed by the grayscale correlation value calculation unit 4A will now be described.

For a target pixel in the image D1 (processing target pixel) output from the signal correction unit 1, the grayscale correlation value calculation unit 4A calculates the four correlation values intended for a grayscale image area described below.

(B1) a vertical direction correlation value Cv_gray for a grayscale image (B2) a horizontal direction correlation value Ch_gray for a grayscale image (B3) a first diagonal direction correlation value Cd1_gray for a grayscale image (B4) a second diagonal direction correlation value Cd2_gray for a grayscale image The process for calculating the correlation values (B1) to (B4) for a grayscale image area will now be described.

(B1) Vertical Direction Correlation Value Cv_gray for Grayscale Image

The process for calculating the vertical direction correlation value Cv_gray for a grayscale image will now be described with reference to FIG. 36.

Figure 36:
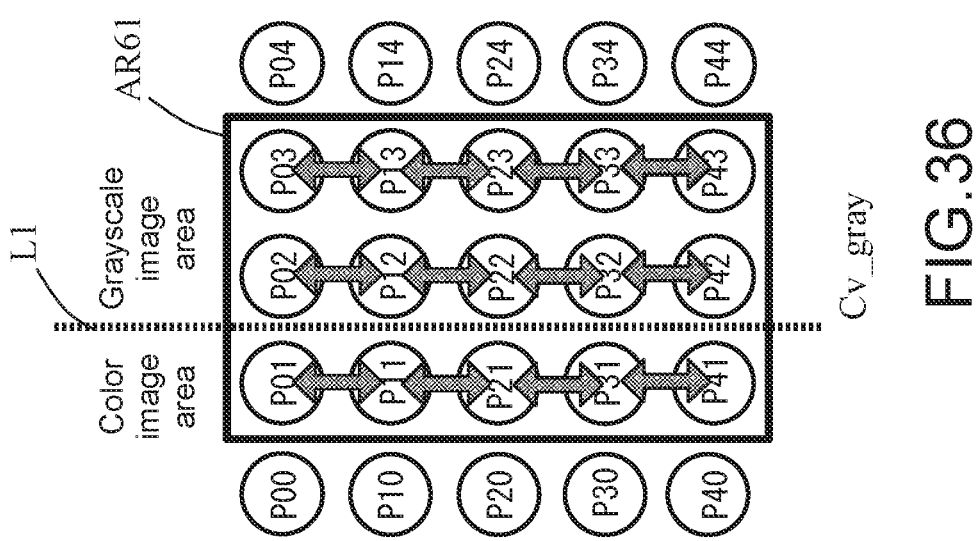
FIG. 36 is a diagram describing a process for calculating a vertical direction correlation value Cv_gray intended for a grayscale image area.

FIG. 36 is a diagram describing the process for calculating the vertical direction correlation value Cv_gray for a grayscale image area.

FIG. 36 shows a matrix area of 5×5 pixels including a central pixel P22 as the center In the figure, two pixels pointed by each of the two-headed arrows are pixels to be used for subtraction.

As shown in FIG. 36, the grayscale correlation value calculation unit 4A calculates a difference in absolute value between the pixel values of vertically adjacent pixels included in an area AR61 consisting of pixels P01 to P03, P11 to P13, P21 to P23, P31 to P33, and P41 to P43. The grayscale correlation value calculation unit 4A calculates the average of the calculated absolute value differences. More specifically, the grayscale correlation value calculation unit 4A calculates the vertical direction correlation value Cv_gray for a grayscale image area through the processing corresponding to the formulae below.

$$\text{sum}=\{\text{abs}(P02-P12)+\text{abs}(P12-P22)+\text{abs}(P22-P32)+\text{abs}(P32-P42)\}\times gv+\text{abs}(P01-P11)+\text{abs}(P11-P21)+\text{abs}(P21-P31)+\text{abs}(P31-P41)+\text{abs}(P03-P13)+\text{abs}(P13-P23)+\text{abs}(P23-P33)+\text{abs}(P33-P43)$$

$$Cv\_gray=\text{sum}/(4+gv\times 2)$$

In other words, the grayscale correlation value calculation unit 4A can adjust the weights of the column in the center of the area AR61 using the gain value gv. For example, in a case, as shown in FIG. 36, when an image area on the left side to the dotted line L1 is a color image area, and an image area on the right side to the dotted line L1 is a grayscale image area, the grayscale correlation value calculation unit 4A determines, based on the information about the border region between the color image area and the grayscale image area output from the border detection unit 8, that the border region between the color image area and the grayscale image area is an area corresponding to the dotted line L1, and then sets gv as gv=2 to increase the ratio (weight) of the difference values derived from the pixels located in the center column of the area AR61. This enables the evaluation with the importance of the center column of the area AR61 increased in the process for calculating a grayscale correlation value, thus enhancing the accuracy of the evaluation of the correlation value in the border region between the color image area and the grayscale image area and its vicinity. This appropriately prevents the side effects, such as false colors, from occurring in the border region between the color image area and the grayscale image area and its vicinity.

(B2) Horizontal Direction Correlation Value Ch_Gray for Grayscale Image

The process for calculating the horizontal direction correlation value Ch_gray for a grayscale image will now be described with reference to FIG. 37.

Figure 37:
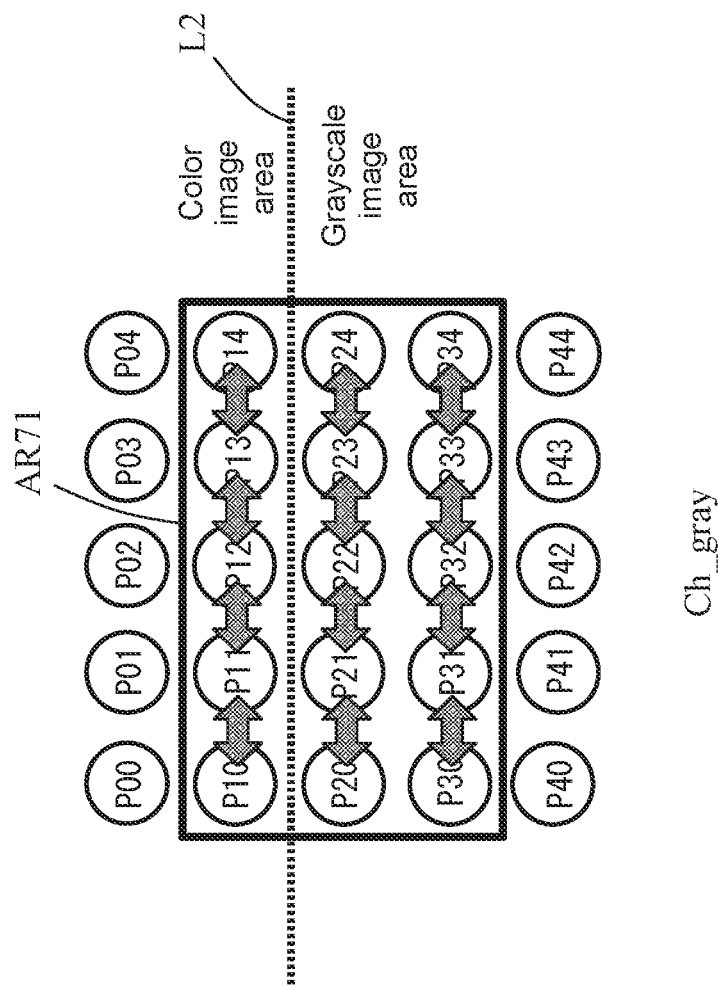
FIG. 37 is a diagram describing a process for calculating a horizontal direction correlation value Ch_gray intended for a grayscale image area.

FIG. 37 is a diagram describing the process for calculating the horizontal direction correlation value Ch_gray for a grayscale image area. FIG. 37 shows a matrix area of 5×5 pixels including a central pixel P22 as the center. In the figure, two pixels pointed by each of the two-headed arrows are pixels to be used for subtraction.

As shown in FIG. 37, the grayscale correlation value calculation unit 4A calculates a difference in absolute value between the pixel values of horizontally adjacent pixels included in an area AR71 consisting of pixels P10 to P14, P20 to P24, and P30 to P34.

The grayscale correlation value calculation unit 4A calculates the average of the calculated absolute value differences. More specifically, the grayscale correlation value calculation unit 4A calculates the horizontal direction correlation value Ch_gray for a grayscale image area through the processing corresponding to the formulae below.

$$\text{sum}=\{\text{abs}(P20-P21)+\text{abs}(P21-P22)+\text{abs}(P22-P23)+\\\text{abs}(P23-P24)\}\times gh+\text{abs}(P10-P11)+\text{abs}(P11-\\P12)+\text{abs}(P12-P13)+\text{abs}(P13-P14)+\text{abs}(P30-\\P31)+\text{abs}(P31-P32)+\text{abs}(P32-P33)+\text{abs}(P33-\\P34)$$

$$Ch\_gray=\text{sum}/(4+gh\times2)$$

In other words, the grayscale correlation value calculation unit 4A can adjust the weights of the row in the center of the area AR71 using the gain value gh. For example, in a case, as shown in FIG. 37, when an image area on the upper side to the dotted line L2 is a color image area, and an image area on the lower side to the dotted line L2 is a grayscale image area, the grayscale correlation value calculation unit 4A determines, based on the information about the border region between the color image area and the grayscale image area output from the border detection unit 8, that the border region between the color image area and the grayscale image area is an area corresponding to the dotted line L2, and then sets gh as gh=2 to increase the ratio (weight) of the difference values derived from the pixels located in the center row of the area AR71. This enables the evaluation with the importance of the center row of the area AR71 increased in the process for calculating a grayscale correlation value, thus enhancing the accuracy of the evaluation of the correlation value in the border region between the color image area and the grayscale image area and its vicinity. This appropriately prevents the side effects, such as false colors, from occurring in the border region between the color image area and the grayscale image area and its vicinity.

(B3) First Diagonal Direction Correlation Value Cd1_gray for Grayscale Image

The process for calculating the first diagonal direction correlation value Cd1_gray for a grayscale image will now be described with reference to FIG. 38.

Figure 38:
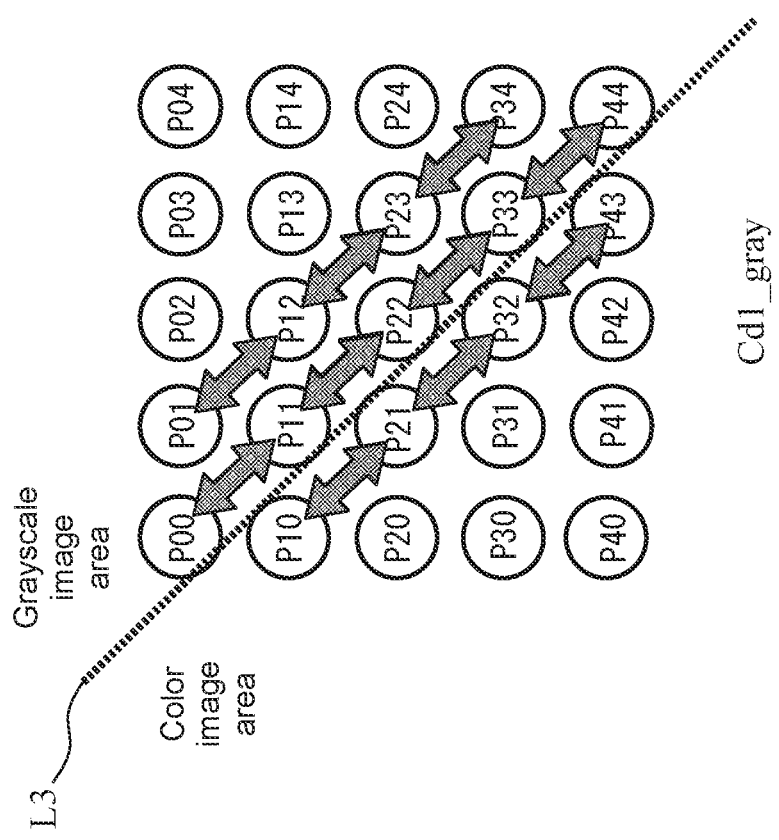
FIG. 38 is a diagram describing the process for calculating the horizontal direction correlation value Cd1_gray for a grayscale image area.

FIG. 38 is a diagram describing the process for calculating the first diagonal direction correlation value Cd1_gray for a grayscale image area. FIG. 38 shows a matrix area of 5×5 pixels including a central pixel P22 as the center. In the figure, two pixels pointed by each of the two-headed arrows are pixels to be used for subtraction.

As shown in FIG. 38, the grayscale correlation value calculation unit 4A calculates a difference in absolute value between the pixel values of adjacent pixels in the first diagonal direction. The grayscale correlation value calculation unit 4A calculates the average of the calculated absolute value differences. More specifically, the grayscale correlation value calculation unit 4A calculates the first diagonal direction correlation value Cd1_gray for a grayscale image area through the processing corresponding to the formulae below.

$$\text{sum}=\{\text{abs}(P00-P11)+\text{abs}(P11-P22)+\text{abs}(P22-P33)+\\\text{abs}(P33-P44)\}\times gd1+\text{abs}(P10-P21)+\text{abs}(P21-\\P32)+\text{abs}(P32-P43)+\text{abs}(P01-P12)+\text{abs}(P12-\\P23)+\text{abs}(P23-P34)$$

$$Cd1\_gray=\text{sum}/(3+gd1\times2)$$

In other words, the grayscale correlation value calculation unit 4A can adjust the weights of the center line (line extending from P00 to P44 in FIG. 38) using the gain value gd1. For example, in a case, as shown in FIG. 38, when an image area on the left side to the dotted line L3 is a color image area, and an image area on the right side to the dotted line L3 is a grayscale image area, the grayscale correlation value calculation unit 4A determines, based on the information about the border region between the color image area and the grayscale image area output from the border detection unit 8, that the border region between the color image area and the grayscale image area is an area corresponding to the dotted line L3, and then sets gd1 as gd1=1.5 to increase the ratio (weight) of the difference values derived from the pixels located along the center line (the line extending from P00 to P44 in FIG. 38). This enables the evaluation with the importance of the values derived from pixels located along the center line increased in the process for calculating a grayscale correlation value, thus enhancing the accuracy of the evaluation of the correlation value in the border region between the color image area and the grayscale image area and its vicinity. This appropriately prevents the side effects, such as false colors, from occurring in the border region between the color image area and the grayscale image area and its vicinity.

(B4) Second Diagonal Direction Correlation Value Cd2_gray for Grayscale Image

The process for calculating the second diagonal direction correlation value Cd2_gray for a grayscale image will now be described with reference to FIG. 39.

Figure 39:
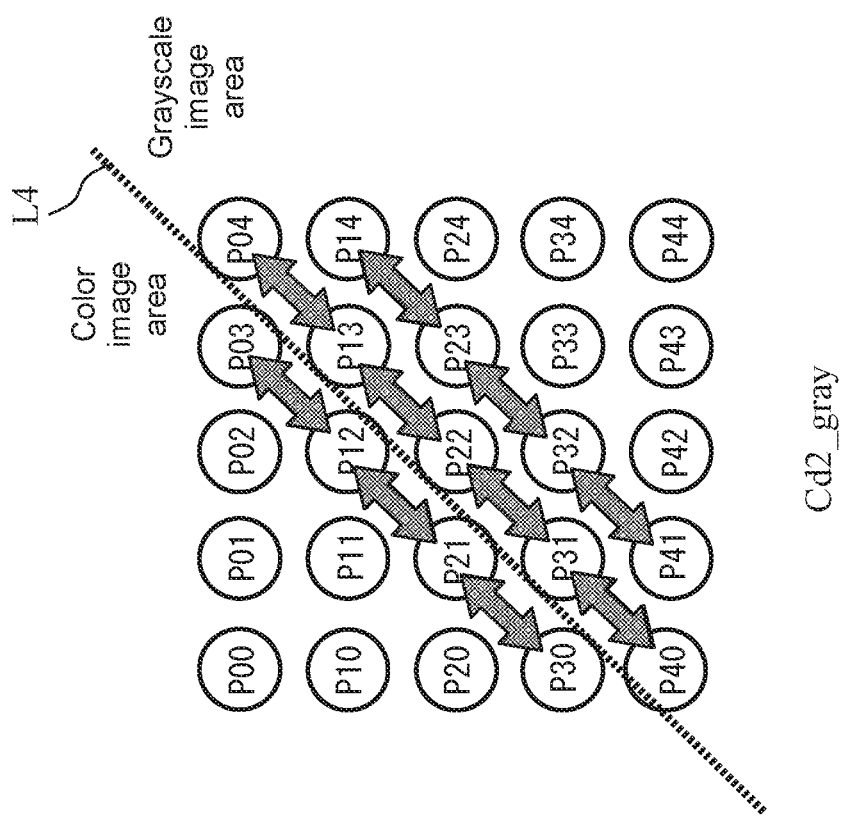
FIG. 39 is a diagram describing the process for calculating the horizontal direction correlation value Cd1_gray for a grayscale image area.

FIG. 39 is a diagram describing the process for calculating the second diagonal direction correlation value Cd2_gray for a grayscale image area. FIG. 39 shows a matrix area of 5×5 pixels including a central pixel P22 as the center. In the figure, two pixels pointed by each of the two-headed arrows are pixels to be used for subtraction.

As shown in FIG. 39, the grayscale correlation value calculation unit 4A calculates a difference in absolute value between the pixel values of adjacent pixels in the second diagonal direction. The grayscale correlation value calculation unit 4A calculates the average of the calculated absolute value differences. More specifically, the grayscale correlation value calculation unit 4A calculates the second diagonal direction correlation value Cd2_gray for a grayscale image area through the processing corresponding to the formulae below.

sum=abs(P04−P13)+abs(P13−P22)+abs(P22−P31)+
abs(P31−P40))×gd2+abs(P03−P12)+abs(P12−
P21)+abs(P21−P30)+abs(P14−P23)+abs(P23−
P32)+abs(P32−P41)

Cd2_gray=sum/(3+gd2×2)

In other words, the grayscale correlation value calculation unit 4A can adjust the weights of the center line (line extending from P04 to P40 in FIG. 39) using the gain value gd2. For example, in a case, as shown in FIG. 39, when an image area on the left side to the dotted line L4 is a color image area, and an image area on the right side to the dotted line L4 is a grayscale image area, the grayscale correlation value calculation unit 4A determines, based on the information about the border region between the color image area and the grayscale image area output from the border detection unit 8, that the border region between the color image area and the grayscale image area is an area corresponding to the dotted line L4, and then sets gd2 as gd2=1.5 to increase the ratio (weight) of the difference values derived from the pixels located along the center line (the line extending from P04 to P40 in FIG. 39). This enables the evaluation with the importance of the values derived from pixels located along the center line increased in the process for calculating a grayscale correlation value, thus enhancing the accuracy of the evaluation of the correlation value in the border region between the color image area and the grayscale image area and its vicinity. This appropriately prevents the side effects, such as false colors, from occurring in the border region between the color image area and the grayscale image area and its vicinity.

The correlation values (Cv_gray, Ch_gray, Cd1_gray, and Cd2_gray) for a grayscale image obtained by the grayscale correlation value calculation unit 4A as described above is output to the pixel interpolation method determination unit 5.

As described above, in the imaging apparatus 2000 of the second embodiment, the grayscale correlation value calculation unit 4A can adjust the contribution degrees (weights) of correlation estimation values derived from the pixels located along the center line based on the information about the border between the color image area and the grayscale image area, which is obtained by the border detection unit 8. Thus, the imaging apparatus 2000 appropriately prevents false color phenomena, which often occur in the border region between the color image area and the grayscale image area, from occurring.

Note that false color phenomena are likely to occur in the border region in the vertical direction or the horizontal direction between the color image area and the grayscale image area. Accordingly, it is preferable that the adjustment value gv for calculating the vertical direction correlation value Cv_gray for a grayscale image area, the adjustment value gh for calculating the horizontal direction correlation value Ch_gray for a grayscale image area, the adjustment value gd1 for calculating the first diagonal direction correlation value Cd1_gray for a grayscale image area, and the adjustment value gd2 for calculating the second diagonal direction correlation value Cd2_gray for a grayscale image area are set to a value greater than two.

As described above, the imaging apparatus 2000, like the first embodiment, appropriately performs pixel interpretation regardless of how a pattern of the four-color filter of the imaging unit C1 is. Furthermore, the imaging apparatus 2000 appropriately prevents false colors from occurring in the border region between the color image area and the grayscale image area.

Other Embodiments

Although the above embodiment describes the pixel interpolation processing that may use calculations with real numbers, the pixel interpolation processing may use calculations with integers. The pixel interpolation processing may include gain adjustment or clipping as needed when using limited predetermined numbers of bits or performing the processing within predetermined dynamic ranges.

All or part of the processes performed by the functional blocks described in the above embodiment may be implemented using programs.

All or part of the processes performed by the functional blocks described in the above embodiment may be implemented by a central processing unit (CPU) in a computer. All or part of the processes performed by the functional blocks described in the above embodiment may be implemented by a central processing unit (CPU) in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware. When the imaging apparatus of the above embodiment is implemented by hardware, the apparatus needs timing adjustment for its processes. For ease of explanation, the timing adjustment associated with various signals used in an actual hardware design is not described in detail in the above embodiment.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a wireless or wired communication line, or a network such as the Internet.

The term "unit" herein may include "circuitry," which may be partly or entirely implemented by using either hardware or software, or both hardware and software. The specific structures of the present invention should not be limited to the above embodiment, and may be changed and modified variously without departing from the scope and the spirit of the invention.

REFERENCE SIGNS LIST 1000, 2000 imaging apparatus
C1 imaging unit
C2 signal processing unit
100 pixel interpolation processing unit (pixel interpolation apparatus)

1 signal correction unit
2 color correlation value calculation unit
3 saturation evaluation value calculation unit
4 grayscale correlation value calculation unit
5 pixel interpolation method determination unit
6 interpolation unit
61 color image interpolation unit
62 grayscale image interpolation unit
63 signal inverse correction unit
64 selection unit
7 correction processing unit
71 first matrix transformation unit
72 color space processing unit
73 saturation obtaining unit
74 color difference correction unit
75 second matrix transformation unit

The invention claimed is:

1. A pixel interpolation apparatus for performing pixel interpolation on an image signal obtained by imaging circuitry including a color filter having a first color filter, a second color filter, a third color filter, and a fourth color filter arranged in a predetermined pattern, the image signal including a first-color pixel signal obtained via the first color filter, a second-color pixel signal obtained via the second color filter, a third-color pixel signal obtained via the third color filter, and a fourth-color pixel signal obtained via the fourth color filter, the pixel interpolation apparatus comprising:

signal correction circuitry configured to correct a signal level of each of the first-color pixel signal, the second-color pixel signal, the third-color pixel signal, and the fourth-color pixel signal in accordance with its corresponding color filter and to output an image signal including the first-color pixel signal, the second-color pixel signal, the third-color pixel signal, and the fourth-color pixel signal which have been corrected, as a first image signal;

saturation evaluation value calculation circuitry configured to evaluate saturation of an image area in an image formed by the first image signal, based on the first image signal output from the signal correction circuitry, and to obtain a saturation evaluation value of the image area;

grayscale correlation value calculation circuitry configured to obtain correlation degrees of a plurality of pairs of two directions orthogonal to each other in the image formed by the first image signal, using data of those pixels that are located in an image area including and surrounding a target pixel which is being processed, as a grayscale correlation degree;

color correlation value calculation circuitry configured to obtain, as a color correlation degree, correlation degrees of a plurality of pairs of two directions orthogonal to each other in the image formed by the image signal including the first-color pixel signal, the second-color pixel signal, the third-color pixel signal, and the fourth-color pixel signal, using data of pixels that are located in an image area including and surrounding the target pixel and that have the same color;

pixel interpolation method determination circuitry configured to determine a pixel interpolation method for the target pixel, based on the saturation evaluation value obtained by the saturation evaluation value calculation circuitry, the grayscale correlation degree obtained by the grayscale correlation value calculation circuitry, and the color correlation degree obtained by the color correlation value calculation circuitry;

interpolation circuitry configured to perform pixel interpolation on the target pixel by the pixel interpolation method determined by the pixel interpolation method determination circuitry to obtain a second image signal that is a signal provided after the pixel interpolation; and correction processing circuitry configured to perform color space conversion on the second image signal obtained by the interpolation circuitry in accordance with an arrangement pattern of the color filter to obtain an output image signal.

2. The pixel interpolation apparatus according to claim 1, wherein the interpolation circuitry includes:

color-image interpolation circuitry configured to perform color-image pixel interpolation processing on the image formed by the image signal including the first-color pixel signal, the second-color pixel signal, the third-color pixel signal and the fourth-color pixel signal when the pixel interpolation method determination circuitry determines to perform pixel interpolation by a color-image pixel interpolation method;

grayscale-image interpolation circuitry configured to perform grayscale-image pixel interpolation processing on the image formed by the first image signal output from the signal correction circuitry when the pixel interpolation method determination circuitry determines to perform pixel interpolation by a grayscale-image pixel interpolation method;

signal inverse correction circuitry configured to perform inverse correction of signal level on the image signal on which the grayscale-image interpolation circuitry has performed the grayscale-image pixel interpolation processing such that a signal level which is corrected by the signal correction circuitry is substantially equal to a signal level provided before being corrected; and selection circuitry configured to (1) obtain an image signal which has been processed by the color-image interpolation circuitry as the second image signal when the pixel interpolation method determination circuitry determines to perform pixel interpolation processing by the color-image pixel interpolation method, (2) obtain an image signal which has been processed by the signal inverse correction circuitry as the second image signal when the pixel interpolation method determination circuitry determines to perform pixel interpolation processing by the grayscale-image pixel interpolation method, and (3) output the obtained second image signal to the correction processing circuitry.

3. The pixel interpolation apparatus according to claim 1, wherein the correction processing circuitry includes:

first matrix transformation circuitry configured to perform color space conversion on the second image signal obtained by the interpolation circuitry in accordance with an arrangement pattern of the color filter to obtain an image signal in an RGB color space;

color-space processing circuitry configured to convert the image signal in an RGB color space, which is obtained by the first matrix transformation circuitry, into an image signal in a YCbCr color space;

saturation obtaining circuitry configured to obtain a saturation signal from the image signal in an RGB color space, which is obtained by the first matrix transformation circuitry;

color difference correction circuitry configured to perform correction processing on a Cb-color component signal and a Cr-color component signal in the image signal in a YCbCr color space, which is obtained by the color-space processing circuitry, based on the saturation signal obtained by the saturation obtaining circuitry; and second matrix transformation circuitry configured to perform color space conversion on a Y component signal in the image signal in a YCbCr color space, which is obtained by the color-space processing circuitry, and on the Cb-color component signal and the Cr-color component signal, which are corrected by the color difference correction circuitry, to obtain an image signal in an RGB color space.

4. The pixel interpolation apparatus according to claim 1, further comprising border detection circuitry configured to detect a border between a color-image area and a grayscale-image area in the image formed by the image signal including the first-color pixel signal, the second-color pixel signal, the third-color pixel signal, and the fourth-color pixel signal, wherein when the border between the color-image area and the grayscale-image area, which is detected by the border detection circuitry, is included in an image area for grayscale correlation degree calculation, the grayscale correlation value calculation circuitry assigns greater weights upon pixels, which are disposed on a line parallel to a correlation direction in which the grayscale correlation degree calculation is to be performed and are included in a central area of the image area for the grayscale correlation degree calculation, to obtain the grayscale correlation degree while enhancing effectiveness of the pixels in the grayscale correlation degree calculation.

5. The pixel interpolation apparatus according to claim 1, wherein, in a case where a direction having a high correlation has been detected based on the degree of correlation, the interpolation circuitry (1) obtains, when a color component pixel with a color identical to a color of a first-color component pixel targeted for pixel interpolation and a second-color component pixel are located in the direction having the high correlation in the image, a change ratio in the direction having the high correlation as a first change ratio by using a pixel value of the second-color component pixel, obtains a pixel value of a first-color component pixel of the target pixel based on a first-color component pixel located in the direction having the high correlation and the obtained first change ratio, and performs pixel interpolation processing on the target pixel, and (2) obtains, when a color component pixel with a color identical to a color of a color component pixel targeted for pixel interpolation is not located in the direction having the high correlation in the image, a color component pixel value with the identical color by performing color space conversion in the direction orthogonal to the direction having the high correlation, obtains, as a second change ratio, a change ratio in a direction orthogonal to the direction having the high correlation of the obtained color component pixel resulting from the color space conversion, and performs pixel interpolation processing on the target pixel based on the obtained second change ratio.

6. The pixel interpolation apparatus according to claim 5, wherein the interpolation circuitry calculates the second change ratio of the color component pixel value having the identical hue obtained by performing color space conversion based on a Laplacian component value of the color component pixel value.

7. The pixel interpolation apparatus according to claim 6, wherein when a color component pixel with a color identical to a color of a color component pixel targeted for pixel interpolation is not located in the direction having the high correlation, the interpolation circuitry obtains a first color component value Pout of the target pixel by using the formula below:

$$Pout=(P1+P2)/2-Lap \times gain,$$

where, in the direction orthogonal to the correlation direction, pos1 is a position of the target pixel, pos0 and pos2 are positions across the target pixel, P1 is a first-color component pixel value at the position pos0, P2 is a first-color component pixel value at the position pos2, Lap is a Laplacian component value calculated from a pixel value of a color component pixel other than a first-color component pixel calculated from the positions pos0, pos1, and pos2, and gain is a gain for adjusting the Laplacian component value.

8. The pixel interpolation apparatus according to claim 1, wherein the interpolation circuitry interpolates a pixel value with the first color component of the target pixel by subtracting a Laplacian component value calculated from pixel values of a plurality of pixels with the second color component arranged in a correlation direction having a high degree of correlation determined by the pixel interpolation method determination circuitry from an average of pixel values of two pixels with the first color component that are adjacent across the target pixel in the correlation direction.

9. The pixel interpolation apparatus according to claim 8, wherein the interpolation circuitry interpolates the pixel value with the first color component of the target pixel by subjecting the Laplacian component value to gain adjustment, and subtracting the Laplacian component value that has undergone the gain adjustment from the average of the pixel values of the two pixels with the first color component that are adjacent across the target pixel.

10. The pixel interpolation apparatus according to claim 1, wherein the grayscale correlation value calculation circuitry obtains a correlation degree in a horizontal direction, a correlation degree in a vertical direction, a correlation degree in a first diagonal direction, and a correlation degree in a second diagonal direction orthogonal to the first diagonal direction in the image, and the color correlation value calculation circuitry obtains a correlation degree in a horizontal direction, a correlation degree in a vertical direction, a correlation degree in a first diagonal direction, and a correlation degree in a second diagonal direction orthogonal to the first diagonal direction in the image.

11. The pixel interpolation apparatus according to claim 1, wherein the saturation evaluation value calculation circuitry evaluates saturation of an image area of five pixels by five pixels, which includes the target pixel at its center, to obtain a saturation evaluation value of the image area, the grayscale correlation value calculation circuitry obtains the grayscale correlation degree in an image area of five pixels by five pixels, which includes the target pixel at its center, and the color correlation value calculation circuitry obtains the color correlation degree in an image area of five pixels by five pixels, which includes the target pixel at its center.

12. The pixel interpolation apparatus according to claim 11, wherein the saturation evaluation value calculation circuitry performs processing corresponding to a formula below to obtain two color component difference values color_diff0 and color_diff1

$$\begin{pmatrix} color\_diff0 \\ color\_diff1 \end{pmatrix} = \begin{pmatrix} k01 & k02 & k03 & k04 \\ k11 & k12 & k13 & k14 \end{pmatrix} \begin{pmatrix} p00\_color1 \\ p01\_color2 \\ p10\_color3 \\ p11\_color4 \end{pmatrix} + \begin{pmatrix} offset0 \\ offset1 \end{pmatrix} \quad (c/12)$$

where p00_color1 is an average of pixel values of first-color component pixels included in the image area of five pixels by five pixels, which includes the target pixel at its center, p01_color2 is an average of pixel values of second-color component pixels included in the image area of five pixels by five pixels, which includes the target pixel at its center, p10_color3 is an average of pixel values of third-color component pixels included in the image area of five pixels by five pixels, which includes the target pixel at its center, p11_color4 is an average of pixel values of fourth-color component pixels included in the image area of five pixels by five pixels, which includes the target pixel at its center, k01, k02, k03, k04, k11, k12, k13, and k14 are coefficients for obtaining a predetermined color difference value, and color_diff0 and color_diff1 are offset values, wherein the saturation evaluation value calculation circuitry performs processing corresponding to a formula of "diff_ave_color=abs(color_diff0)+abs(color_diff1)" where abs(x) is a function that returns an absolute value of "x", thereby obtaining an average color component difference evaluation value diff_ave_color, and wherein the saturation evaluation value calculation circuitry obtains the saturation evaluation value of the image area using the obtained average color component difference evaluation value diff_ave_color.

13. The pixel interpolation apparatus according to claim 12, wherein the saturation evaluation value calculation circuitry (1) obtains an overall evaluation value g1_color based on a difference between the target pixel and each of eight pixels adjacently located in the vertical direction, horizontal direction, and the diagonal direction to the target pixel in an image area of five pixels by five pixels, which includes the target pixel at its center, (2) selects a plurality of pairs of two pixels vertically adjacent to each other in an image area of five pixels by five pixels, which includes the target pixel at its center, calculates a difference between two pixel values of the selected pixels for each of the plurality of pairs of two pixels, and obtains a vertical direction evaluation value v_color based on the calculated differences using the selected pixels for each of the plurality of pairs of two pixels, (3) selects a plurality of pairs of two pixels horizontally adjacent to each other in an image area of five pixels by five pixels, which includes the target pixel at its center, calculates a difference between two pixel values of the selected pixels for each of the plurality of pairs of two pixels, and obtains a horizontal direction evaluation value h_color based on the calculated differences using the selected pixels for each of the plurality of pairs of two pixels, (4) selects a plurality of pairs of two pixels adjacent to each other in the first diagonal direction in an image area of five pixels by five pixels, which includes the target pixel at its center, calculates a difference between two pixel values of the selected pixels for each of the plurality of pairs of two pixels, and obtains a first diagonal direction evaluation value d1_color based on the calculated differences using the selected pixels for each of the plurality of pairs of two pixels, (5) selects a plurality of pairs of two pixels adjacent to each other in the second diagonal direction in an image area of five pixels by five pixels, which includes the target pixel at its center, calculates a difference between two pixel values of the selected pixels for each of the plurality of pairs of two pixels, and obtains a second diagonal direction evaluation value d2_color based on the calculated differences using the selected pixels for each of the plurality of pairs of two pixels, and obtains the saturation evaluation value of the image area based on at least one of the average color component difference evaluation value diff_ave_color, the overall evaluation value g1_color, the vertical direction evaluation value v_color, the horizontal direction evaluation value h_color, the first diagonal direction evaluation value d1_color, and the second diagonal direction evaluation value d2_color.

14. An imaging apparatus, comprising:

an imaging circuitry having a color filter with four different colors arranged in a predetermined pattern, the imaging circuitry being configured to obtain an image signal from subject light; and the pixel interpolation apparatus according to claim 1 configured to perform pixel interpolation processing on the image signal.

15. A non-transitory computer-readable storage medium including a program stored therein, which when executed by a pixel interpolation apparatus, causes the pixel interpolation apparatus to perform a pixel interpolation processing method for performing pixel interpolation on an image signal obtained by an imaging circuitry including a color filter having a first color filter, a second color filter, a third color filter, and a fourth color filter arranged in a predetermined pattern, the image signal including a first-color pixel signal obtained via the first color filter, a second-color pixel signal obtained via the second color filter, a third-color pixel signal obtained via the third color filter, and a fourth-color pixel signal obtained via the fourth color filter, the pixel interpolation processing method comprising:

correcting a signal level of each of the first-color pixel signal, the second-color pixel signal, the third-color pixel signal, and the fourth-color pixel signal in accordance with its corresponding color filter and to output an image signal including the first-color pixel signal, the second-color pixel signal, the third-color pixel signal, and the fourth-color pixel signal which have been corrected, as a first image signal;

evaluating saturation of an image area in an image formed by the first image signal, based on the first image signal output by the signal correction step, and obtaining a saturation evaluation value of the image area;

obtaining correlation degrees of a plurality of pairs of two directions orthogonal to each other in the image formed by the first image signal, using data of those pixels that are located in an image area including and surrounding a target pixel which is being processed, as a grayscale correlation degree;

obtaining, as a color correlation degree, correlation degrees of a plurality of pairs of two directions orthogonal to each other in the image formed by the image signal including the first-color pixel signal, the second-color pixel signal, the third-color pixel signal, and the fourth-color pixel signal, using data of pixels that are located in an image area including and surrounding the target pixel and that have the same color;

determining a pixel interpolation method for the target pixel, based on the saturation evaluation value obtained by the saturation evaluation value calculation step, the grayscale correlation degree obtained by the grayscale correlation value calculation step, and the color correlation degree obtained by the color correlation value calculation step;

performing pixel interpolation on the target pixel by the pixel interpolation method determined by the pixel interpolation method determination step to obtain a second image signal that is a signal provided after the pixel interpolation; and performing color space conversion on the second image signal obtained by the step of performing pixel interpolation in accordance with an arrangement pattern of the color filter to obtain an output image signal.

16. An integrated circuit for performing pixel interpolation on an image signal obtained by imaging circuitry including a color filter of a first color filter, a second color filter, a third color filter, and a fourth color filter arranged in a predetermined pattern, the image signal including a first-color pixel signal obtained via the first color filter, a second-color pixel signal obtained via the second color filter, a third-color pixel signal obtained via the third color filter, and a fourth-color pixel signal obtained via the fourth color filter, the integrated circuit comprising:

signal correction circuitry configured to correct a signal level of each of the first-color pixel signal, the second-color pixel signal, the third-color pixel signal, and the fourth-color pixel signal in accordance with its corresponding color filter and to output an image signal including the first-color pixel signal, the second-color pixel signal, the third-color pixel signal, and the fourth-color pixel signal which have been corrected, as a first image signal;

saturation evaluation value calculation circuitry configured to evaluate saturation of an image area in an image formed by the first image signal, based on the first image signal output from the signal correction circuitry, and to obtain a saturation evaluation value of the image area;

grayscale correlation value calculation circuitry configured to obtain correlation degrees of a plurality of pairs of two directions orthogonal to each other in the image formed by the first image signal, using data of those pixels that are located in an image area including and surrounding a target pixel which is being processed, as a grayscale correlation degree;

color correlation value calculation circuitry configured to obtain, as a color correlation degree, correlation degrees of a plurality of pairs of two directions orthogonal to each other in the image formed by the image signal including the first-color pixel signal, the second-color pixel signal, the third-color pixel signal, and the fourth-color pixel signal, using data of pixels that are located in an image area including and surrounding the target pixel and that have the same color;

pixel interpolation method determination circuitry configured to determine a pixel interpolation method for the target pixel, based on the saturation evaluation value obtained by the saturation evaluation value calculation circuitry, the grayscale correlation degree obtained by the grayscale correlation value calculation circuitry, and the color correlation degree obtained by the color correlation value calculation circuitry;

interpolation circuitry configured to perform pixel interpolation on the target pixel by the pixel interpolation method determined by the pixel interpolation method determination circuitry to obtain a second image signal that is a signal provided after the pixel interpolation; and correction processing circuitry configured to perform color space conversion on the second image signal obtained by the interpolation circuitry in accordance with an arrangement pattern of the color filter to obtain an output image signal.

* * * * *